United States Patent
Pugh et al.

(10) Patent No.: US 10,325,294 B2
(45) Date of Patent: Jun. 18, 2019

(54) SYSTEM AND METHOD FOR NOTIFYING CUSTOMERS OF CHECKOUT QUEUE ACTIVITY

(71) Applicant: Meijer, Inc., Grand Rapids, MI (US)

(72) Inventors: Brian Pugh, Grand Rapids, MI (US); Elmer L. Robinson, Jr., Marne, MI (US); David Scott Pallas, Hudsonville, MI (US); K. Michael Ross, Grand Rapids, MI (US)

(73) Assignee: Meijer, Inc., Grand Rapids, MI (US)

( * ) Notice: Subject to any disclaimer, the term of this patent is extended or adjusted under 35 U.S.C. 154(b) by 617 days.

(21) Appl. No.: 14/965,796

(22) Filed: Dec. 10, 2015

(65) Prior Publication Data

US 2016/0171566 A1    Jun. 16, 2016

Related U.S. Application Data

(60) Provisional application No. 62/090,134, filed on Dec. 10, 2014.

(51) Int. Cl.
*G06Q 20/00* (2012.01)
*G06Q 30/02* (2012.01)

(52) U.S. Cl.
CPC ................. *G06Q 30/0281* (2013.01)

(58) Field of Classification Search
CPC .................................................. G06Q 30/0281
USPC ....................................................... 705/16, 24
See application file for complete search history.

(56) References Cited

U.S. PATENT DOCUMENTS

| | | | | |
|---|---|---|---|---|
| 5,557,513 A | * | 9/1996 | Frey | G06Q 10/0631 705/7.12 |
| 5,915,246 A | * | 6/1999 | Patterson | G06Q 20/1085 705/14.4 |
| 7,558,739 B2 | * | 7/2009 | Thomson | G06Q 10/06311 455/414.1 |
| 9,230,272 B1 | * | 1/2016 | Eramian | H04W 4/029 |
| 9,582,797 B1 | * | 2/2017 | Holmes | G06Q 20/325 |
| 9,894,633 B2 | * | 2/2018 | Hobbs | H04W 4/21 |
| 9,922,483 B2 | * | 3/2018 | Forshaw | G07C 11/00 |
| 2002/0170961 A1 | * | 11/2002 | Dickson | G06K 7/0008 235/383 |

(Continued)

*Primary Examiner* — Rokib Masud
(74) *Attorney, Agent, or Firm* — Barnes & Thornburg LLP

(57) ABSTRACT

A system and method for notifying customers of a retail enterprise of checkout queue activity includes a stored identification code identifying a location in or near a customer entry area to multiple point-of-sale systems grouped together in a brick-and-mortar outlet of the retail enterprise, and customer codes associated in a database with various customers of the retail enterprise, monitoring purchase transaction activity at each of the plurality of point-of-sale systems. An operating state of each of the point-of-sale systems is determined based on the monitored purchase transaction activity thereof. In response to a wirelessly received customer code and identification code, a notification message is wirelessly transmitted to a mobile communication device identified by a matching one of the customer codes in the database if the wirelessly received identification code matches the stored identification code. The notification message includes information identifying the operating state of at least one point-of-sale system.

19 Claims, 18 Drawing Sheets

(56) References Cited

U.S. PATENT DOCUMENTS

| | | | |
|---|---|---|---|
| 2002/0190844 A1* | 12/2002 | Livingston | G08B 5/222 340/7.4 |
| 2003/0018530 A1* | 1/2003 | Walker | G06Q 20/10 705/14.25 |
| 2004/0059614 A1* | 3/2004 | Brown | G06Q 30/0281 705/346 |
| 2004/0093268 A1* | 5/2004 | Ramchandani | G06Q 30/02 705/14.13 |
| 2004/0203633 A1* | 10/2004 | Knauerhase | H04L 29/06 455/414.1 |
| 2005/0189415 A1* | 9/2005 | Fano | G06Q 10/087 235/383 |
| 2008/0261510 A1* | 10/2008 | Lin | G06Q 10/06 455/3.01 |
| 2009/0286559 A1* | 11/2009 | Janas | G06Q 30/02 455/466 |
| 2010/0250381 A1* | 9/2010 | Snyder | A47F 9/04 705/21 |
| 2011/0054780 A1* | 3/2011 | Dhanani | G01C 21/26 701/465 |
| 2011/0213717 A1* | 9/2011 | Prorock | G06Q 20/20 705/304 |
| 2012/0177025 A1* | 7/2012 | Huang | G01S 5/0236 370/342 |
| 2013/0016173 A1* | 1/2013 | Johnson | G07F 19/201 348/14.03 |
| 2013/0096977 A1* | 4/2013 | Finch | G06Q 10/06315 705/7.26 |
| 2013/0103486 A1* | 4/2013 | Hess | G06Q 30/02 705/14.38 |
| 2013/0124410 A1* | 5/2013 | Kay | G06Q 40/02 705/43 |
| 2013/0203439 A1* | 8/2013 | Lifshitz | H04W 64/00 455/456.2 |
| 2014/0052554 A1* | 2/2014 | Abraham | G07G 1/14 705/21 |
| 2014/0236653 A1* | 8/2014 | Farrell | G07G 1/0036 705/7.15 |
| 2014/0283136 A1* | 9/2014 | Dougherty | G01S 5/00 726/29 |
| 2014/0350976 A1* | 11/2014 | Salas Fehlandt | G06Q 10/02 705/5 |
| 2014/0365334 A1* | 12/2014 | Hurewitz | G06Q 30/0613 705/26.41 |
| 2015/0066519 A1* | 3/2015 | Lin | G06Q 50/10 705/1.1 |
| 2015/0073901 A1* | 3/2015 | Arnold | G06Q 30/0255 705/14.53 |
| 2015/0088782 A1* | 3/2015 | Zhang | G06Q 30/0281 705/346 |
| 2015/0127401 A1* | 5/2015 | Hogg | G06Q 30/0281 705/7.15 |
| 2015/0134535 A1* | 5/2015 | Martins | G06Q 10/06311 705/64 |
| 2015/0220914 A1* | 8/2015 | Purves | G06Q 20/36 705/26.8 |
| 2015/0262265 A1* | 9/2015 | Zamer | G06Q 30/0282 705/347 |
| 2015/0332242 A1* | 11/2015 | Perry | G06Q 20/206 705/18 |
| 2015/0332258 A1* | 11/2015 | Kurabi | G06Q 20/401 705/71 |
| 2015/0379434 A1* | 12/2015 | Argue | G06Q 10/02 705/5 |
| 2016/0034981 A1* | 2/2016 | Kluver | G06Q 30/0281 705/21 |
| 2016/0071087 A1* | 3/2016 | Mittal | G06Q 20/325 705/44 |
| 2016/0125366 A1* | 5/2016 | McCaffrey | G06Q 10/20 705/7.19 |
| 2016/0258762 A1* | 9/2016 | Taylor | E01H 5/12 |
| 2016/0292712 A1* | 10/2016 | Tezuka | G06Q 30/02 |
| 2017/0053326 A1* | 2/2017 | SivasankaranNair | G06Q 30/0281 |
| 2017/0116589 A1* | 4/2017 | Krishnaiah | G06Q 20/202 |
| 2017/0154340 A1* | 6/2017 | Ballepu | G06Q 30/016 |
| 2017/0228835 A9* | 8/2017 | Lin | G06Q 50/10 |
| 2017/0303184 A1* | 10/2017 | Todasco | H04W 48/00 |

\* cited by examiner

SYSTEM AND METHOD FOR NOTIFYING CUSTOMERS OF CHECKOUT QUEUE ACTIVITY

CROSS-REFERENCE TO RELATED APPLICATIONS

This patent application claims the benefit of, and priority to, U.S. Provisional Patent Application Ser. No. 62/090,134, filed Dec. 10, 2014, the disclosure of which is expressly incorporated herein by reference.

FIELD OF THE INVENTION

The present invention relates generally to systems and methods for providing information to customers relating to the operation of a brick-and-mortar store in which the customers are shopping, and more specifically to systems and methods for providing information to customers relating to the availability of one or more point-of-sale systems to process items to be purchased by the customers.

BACKGROUND

Retailers of goods and services typically offer such goods and services for purchase via one or more conventional brick-and-mortar retail stores. Such brick-and-mortar stores typically include at least one point-of-sale system, and many brick-and-mortar stores include several point-of-sale systems grouped together in a so-called "checkout" area. The one or more point-of-sale systems may be or include one or more self-checkout point-of-sale systems and/or one or more employee-operated point-of-sale systems. In any case, each such point-of-sale system further typically defines a "checkout queue" or "checkout lane" through which customers pass when making purchases at the point-of-sale system.

When any such point-of-sale system is available to process a purchase transaction, a customer typically advances into the checkout lane or queue of the point-of-sale system and presents one or more items for purchase, and the point-of-sale system is then operated in a conventional manner to process the purchase transaction. When a point-of-sale system is currently busy processing a purchase transaction, customers wishing to conduct a purchase transaction at the point-of-sale system typically wait in the checkout lane or queue for the point-of-sale system to become available to process their purchase transaction. At any one time, the checkout lane or queue of any such point-of-sale system may be open and the point-of-sale system available to process a purchase transaction, or be populated by one or more customers currently conducting a purchase transaction or awaiting availability of the point-of-sale system to conduct a purchase transaction.

SUMMARY

The present invention may comprise one or more of the features recited in the attached claims, and/or one or more of the following features and combinations thereof. In one aspect, a method of notifying customers of a retail enterprise of checkout queue activity may comprise storing an identification code, with a processor in a first database, the identification code identifying a location in or near a customer entry area to a plurality of point-of-sale systems grouped together in a brick-and-mortar outlet of the retail enterprise, associating, with the processor in the first or a second database, each of a plurality of customer codes with a different one of a plurality of customers of the retail enterprise, monitoring, with the processor, purchase transaction activity at each of the plurality of point-of-sale systems, determining, with the processor, an operating state of each of the plurality of point-of-sale systems based on the monitored purchase transaction activity thereof, and in response to a wirelessly received customer code and identification code, identifying with the processor the one of the plurality of customer codes in the first or second database that matches the wirelessly received customer code, comparing, with the processor, the wirelessly received identification code with the identification code stored in the first database, and wirelessly transmitting, under control of the processor, a notification message to a mobile communication device identified by the matching one of the plurality of customer codes if the wirelessly received identification code matches the identification code stored in the first database, the notification message including information identifying the operating state of one or more of the plurality of point-of-sale systems.

In another aspect, a system for notifying customers of a retail enterprise of checkout queue activity may comprise a plurality of point-of-sale systems grouped together in a brick-and-mortar outlet of the retail enterprise, a plurality of wireless signal broadcasting devices located in or near a customer entry area to the plurality of point-of-sale systems, at least one database having stored therein a plurality of device codes each identifying a different one of the plurality of wireless signal broadcasting devices and, and a plurality of customer codes each identifying a different one of a plurality of customers of the retail enterprise and each associated in the at least one database with a mobile communication device, means for monitoring purchase transaction activity at each of the plurality of point-of-sale systems, a processor, and memory having instructions stored therein which, when executed by the processor, cause the processor to determine an operating state of each of the plurality of point-of-sale devices based on the monitored purchase activity thereof and, in response to a wirelessly received customer code and device code, if the wirelessly received device code matches one of the plurality of device codes in the at least one database and the wirelessly received customer code matches one of the plurality of customer codes stored in the at least one database, to wirelessly transmit a notification message to a mobile communication device associated in the at least one database with the matching one of the plurality of customer codes, the notification message including information identifying the operating state of one or more of the plurality of point-of-sale systems.

In yet another aspect, a system for notifying customers of a retail enterprise of checkout queue activity may comprise a plurality of point-of-sale systems grouped together in a brick-and-mortar outlet of the retail enterprise, a plurality of wireless signal broadcasting devices located in or near a customer entry area to the plurality of point-of-sale systems, at least one database having stored therein a plurality of device codes each identifying a different one of the plurality of wireless signal broadcasting devices and, and a plurality of customer codes each identifying a different one of a plurality of customers of the retail enterprise and each associated in the at least one database with a mobile communication device, a plurality of customer traffic monitoring devices each positioned to monitor customer traffic at a different one of the plurality of point-of-sale systems and each configured to produce a customer traffic signal, a processor, and memory having instructions stored therein which, when executed by the processor, cause the processor to estimate a wait time for each of the plurality of point-of-sale systems based on a corresponding one of the plurality of customer traffic signals, each of the plurality of wait times defining an estimated amount of time from the present that the corresponding one of the plurality of point-of-sale systems will be available to conduct a customer purchase transaction, and, in response to a wirelessly received customer code and device code, if the wirelessly received device code matches one of the plurality of device codes in the at least one database and the wirelessly received customer code matches one of the plurality of customer codes stored in the at least one database, to wirelessly transmit a notification message to a mobile communication device associated in the at least one database with the matching one of the plurality of customer codes, the notification message including information identifying one or more of the plurality of wait times.

In yet another aspect, a system for notifying customers of a retail enterprise of checkout queue activity may comprise a plurality of point-of-sale systems grouped together in a brick-and-mortar outlet of the retail enterprise, a plurality of wireless signal broadcasting devices located in or near a customer entry area to the plurality of point-of-sale systems, at least one database having stored therein a plurality of device codes each identifying a different one of the plurality of wireless signal broadcasting devices and, and a plurality of customer codes each identifying a different one of a plurality of customers of the retail enterprise and each associated in the at least one database with a mobile communication device, means for monitoring purchase transaction activity at each of the plurality of point-of-sale systems, and a server including at least one module to determine an operating state of each of the plurality of point-of-sale devices based on the monitored purchase activity thereof and, in response to a wirelessly received customer code and device code, if the wirelessly received device code matches one of the plurality of device codes in the at least one database and the wirelessly received customer code matches one of the plurality of customer codes stored in the at least one database, to wirelessly transmit a notification message to a mobile communication device associated in the at least one database with the matching one of the plurality of customer codes, the notification message including information identifying the operating state of one or more of the plurality of point-of-sale systems.

In a further aspect, a system for notifying customers of a retail enterprise of checkout queue activity may comprise a plurality of point-of-sale systems grouped together in a brick-and-mortar outlet of the retail enterprise, a plurality of wireless signal broadcasting devices located in or near a customer entry area to the plurality of point-of-sale systems, at least one database having stored therein a plurality of device codes each identifying a different one of the plurality of wireless signal broadcasting devices and, and a plurality of customer codes each identifying a different one of a plurality of customers of the retail enterprise and each associated in the at least one database with a mobile communication device, a plurality of customer traffic monitoring devices each positioned to monitor customer traffic at a different one of the plurality of point-of-sale systems and each configured to produce a customer traffic signal, and a server including at least one module to estimate a wait time for each of the plurality of point-of-sale systems based on a corresponding one of the plurality of customer traffic signals, each of the plurality of wait times defining an estimated amount of time from the present that the corresponding one of the plurality of point-of-sale systems will be available to conduct a customer purchase transaction, and, in response to a wirelessly received customer code and device code, if the wirelessly received device code matches one of the plurality of device codes in the at least one database and the wirelessly received customer code matches one of the plurality of customer codes stored in the at least one database, to wirelessly transmit a notification message to a mobile communication device associated in the at least one database with the matching one of the plurality of customer codes, the notification message including information identifying one or more of the plurality of wait times.

In still a further aspect, a non-transitory machine-readable medium may comprise a plurality of instructions which, when executed by at least one processor, result in the at least one processor storing in a first database an identification code identifying a location in or near a customer entry area to a plurality of point-of-sale systems grouped together in a brick-and-mortar outlet of the retail enterprise, associating, in the first or a second database, each of a plurality of customer codes with a different one of a plurality of customers of the retail enterprise, monitoring purchase transaction activity at each of the plurality of point-of-sale systems, determining an operating state of each of the plurality of point-of-sale systems based on the monitored purchase transaction activity thereof, and in response to a wirelessly received customer code and identification code, identifying the one of the plurality of customer codes in the first or second database that matches the wirelessly received customer code the wirelessly received identification code with the identification code stored in the first database, and controlling a communication circuit to wirelessly transmit a notification message to a mobile communication device identified by the matching one of the plurality of customer codes if the wirelessly received identification code matches the identification code stored in the first database, the notification message including information identifying the operating state of one or more of the plurality of point-of-sale systems.

BRIEF DESCRIPTION OF THE DRAWINGS

This disclosure is illustrated by way of example and not by way of limitation in the accompanying figures. Where considered appropriate, reference labels have been repeated among the figures to indicate corresponding or analogous elements.

DETAILED DESCRIPTION OF THE DRAWINGS

Figure 1:
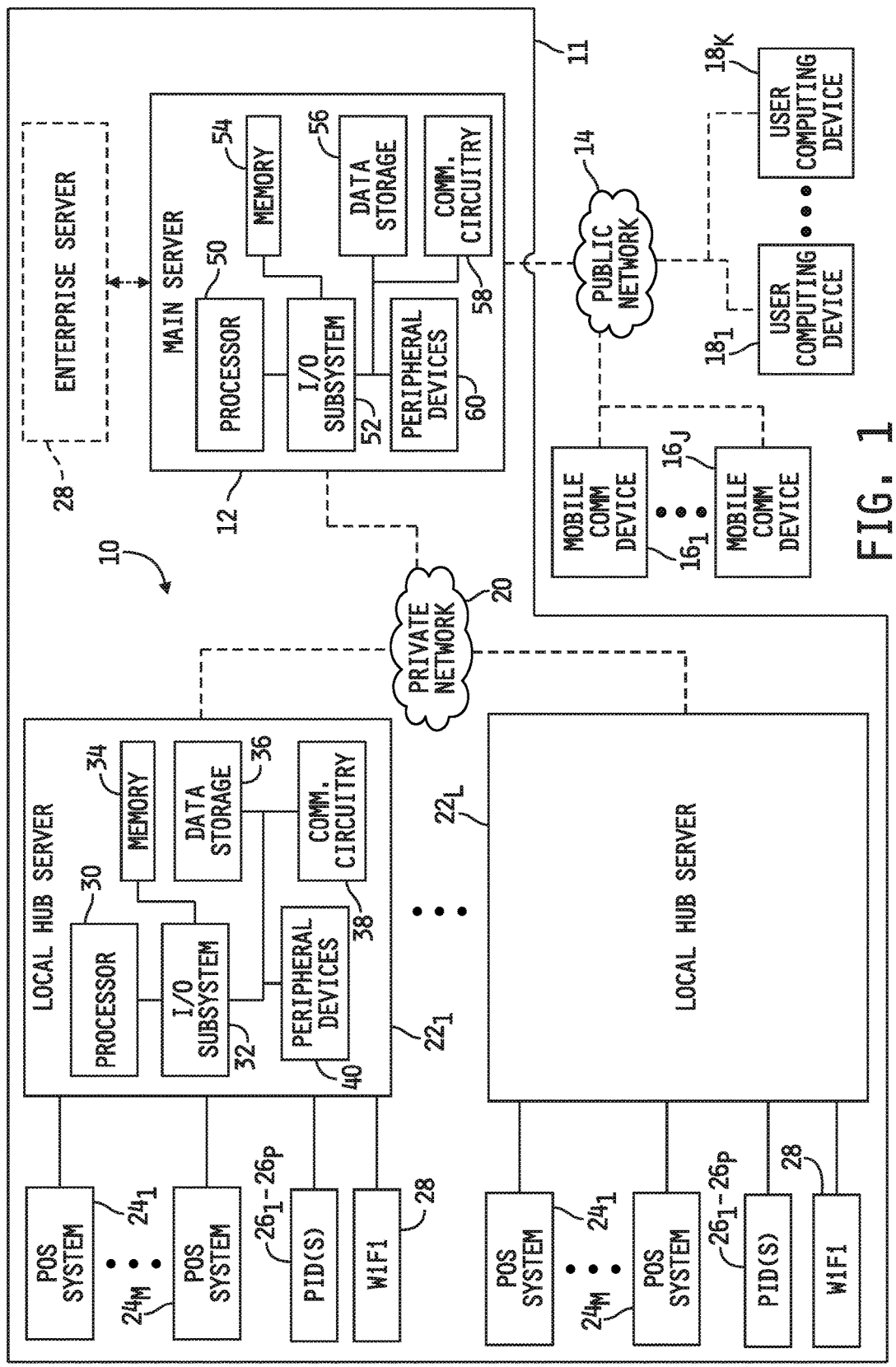
FIG. 1 is a simplified block diagram of an embodiment of a system for notifying customers of checkout queue activity.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure, process, process step or characteristic is described in connection with an embodiment, it is submitted that it is within the knowledge of one skilled in the art to effect such feature, structure, process, process step or characteristic in connection with other embodiments whether or not explicitly described. Further still, it is contemplated that any single feature, structure, process, process step or characteristic disclosed herein may be combined with any one or more other disclosed feature, structure, process, process step or characteristic, whether or not explicitly described, and that no limitations on the types and/or number of such combinations should therefore be inferred.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions stored on one or more machine-readable media, which may be read and executed by one or more processors. A machine-readable medium may be embodied as any device or physical structure for storing or transmitting information in a form readable by a machine (e.g., a computing device). For example, a machine-readable medium may be embodied as any one or combination of read only memory (ROM); random access memory (RAM); magnetic disk storage media; optical storage media; flash memory devices; and others.

Referring now to FIG. 1, a system 10 is shown for system for notifying customers of checkout queue activity. The system 10 includes a retail enterprise 11 having a main server 12 configured to communicate with shoppers via a public network 14, e.g., the Internet, and shoppers may access the public network 14 using any conventional public network accessible electronic device and/or system. In the illustrated embodiment, for example a number, J, of mobile communication devices $16_1$-$16_J$, and a number, K, of user computing devices $18_1$-$18_K$, are shown. Each is configured to communicatively connect to the public network 14, and J and K may each be any positive integer. The retail enterprise 11 may include any number of brick-and-mortar retail outlets each having one or more point-of-sale systems $24_1$-$24_M$, $24_1$-$24_N$ operating therein. The main server 12 is configured to communicate with each such point-of-sale (POS) system $24_1$-$24_M$, $24_1$-$24_N$, each of which operate in a conventional manner to process items to be purchased by shoppers during purchase transactions.

Each of the brick-and-mortar stores may further include at least one conventional WiFi Access Point 28 which may be coupled to the corresponding local hub server 22, or directly to the main server 12 in any one or more of the brick-and-mortar stores not having an associated local hub server 22. Each such WiFi Access Point 28 is illustratively controlled by the main server 12 (or corresponding local hub server 22) in a conventional manner to establish at least one corresponding Internet hotspot within the brick-and-mortar store via which customers (and employees) can access the public network 14, e.g., to access the Internet, using any conventional public network accessible electronic device and/or system, e.g., such as with any of the plurality of mobile communication devices $16_1$-$16_K$.

In some embodiments, the main server 12 illustratively hosts an enterprise member or membership services (EMS) program which includes or otherwise has access to a virtual coupon bank and a customer purchase history database containing purchase histories of one or more customers of the retail enterprise 11. As used herein, the term "enterprise member services program," "enterprise membership services program" and "EMS program" are interchangeable and refer to a shopper or customer service which may offer to customer-members one or more services such as making available to customers one or more virtual discount coupons that may be redeemable by the retail enterprise against the purchase of from the retail enterprise of various goods and/or services and/or tracking and maintaining customer purchase histories in a customer purchase history database accessible by the main server 12. In this regard, the terms "customer membership account" and "EMS account" are likewise interchangeable and refer to a mechanism by which the retail enterprise 11 may make available to customers one or more virtual discount coupons and/or by which a customer's purchase history and information about the customer can be maintained by the main server 12 in a database separately from purchase histories of and information about other customer-members. Further in this regard, the term "EMS identification code" or "EMSID" illustratively refers to at least one collection of letters, symbols and/or numbers that is different for, and therefore unique to, each customer-member of the enterprise membership services program, and which is used to uniquely identify a customer's EMS account within the EMS program. In one embodiment, for example, the EMSID for each customer may include a unique, several-digit access code and a separate and unique, several-digit password, although in other embodiments the EMSID may include more, fewer and/or different codes and/or passwords.

As will be discussed in further detail below, the main server 12 illustratively includes an EMS module that manages and controls a customer-member interface, e.g., a web-based interface, to the EMS program via which customers can access and manage their individual EMS accounts. Illustratively, each customer may access their individual (and private from other customer-members) EMS account, i.e., their individual EMS page(s) within the web-based EMS interface, which may be referred to hereinafter as an "EMS website," by entering that customer's EMSID into a graphic user interface element of the web-based EMS interface. Therein, the customer may access, establish, modify and otherwise manage the customer's EMS account information including, for example, but not limited to, the customer's name, address, email address, communication information (CI), e.g. such as a mobile telephone number or other communication identifier, which identifies one or more customer mobile communication devices $16_1$-$16_J$ for purposes of communicating information between such one or more devices $16_1$-$16_J$ and the main server 12, and the like.

In the embodiment illustrated in FIG. 1, the main server 12 is coupled via a private network 20 to a plurality of local hub servers $22_1$-$22_L$, where L may be any positive integer, and each local hub server $22_1$-$22_L$ is coupled to one or more conventional point-of-sale systems, e.g., $24_1$-$24_M$, $24_1$-$24_N$. Each of the point-of-sale systems $24_1$-$24_M$, $24_1$-$24_N$ is configured to process items selected by customers for purchase and to process payment for such items. Some retail enterprises may include a single brick and mortar outlet, and other larger enterprises may include two or more physically remote brick and mortar outlets. In the latter case, the retail enterprise may include, for example, a main physical location with two or more remote physical locations, and for purposes of this document the two or remote physical locations in such an arrangement are referred to as "hub" locations. In this disclosure, the system 10 will be illustrated and described in the context of such a larger retail enterprise having a main physical location and two or more physical hub locations. In this regard, the main server 12 in the system 10 shown in FIG. 1 will typically be located at a main business location of the retail enterprise, and will be coupled via the network 20 to two or more local hub servers $22_1$-$22_L$, each of which will typically be located at a different one of the two or more hub locations.

Each hub location may include any number of point-of-sale systems coupled to a corresponding local hub server, and in the embodiment illustrated in FIG. 1, for example, the local hub server $22_1$ is communicatively coupled to "M" such point-of-sale systems $24_1$-$24_M$, where M may be any positive integer, and the local hub server $22_K$ is communicatively coupled to "N" such point-of-sale systems $24_1$-$24_N$, where N may be any positive integer and where M may or may not be equal to N. Communicative coupling between the local hub server $22_1$ and the one or more point-of-sale systems $24_1$-$24_M$, and between the local hub server $22_L$ and the one or more point-of-sale systems $22_1$-$22_N$, may be accomplished using any known communication coupling, and communications over any such hardwire and/or wireless coupling may be accomplished using any known communication protocol.

In some alternative embodiments of such a large retail enterprise, one or more of the local hub servers $22_1$-$22_L$ may be omitted, and the main server 12 may be coupled directly, via the network 20, to one or more point-of-sale systems $24_1$-$24_M$, $24_1$-$24_N$, or the main server 12 may be omitted and at least one of the local hub servers $22_1$-$22_L$ may be configured to act as a so-called master server with the remaining local hub servers $22_1$-$22_L$ configured to act as so-called slave servers. In other alternative embodiments in which the retail enterprise includes only a single brick and mortar outlet, the local hub servers $22_1$-$22_L$ may be or include the main server 12 or vice versa. For purposes of the following description, any process disclosed as being controlled by the main server 12 may, in some embodiments, instead be controlled, in whole or in part, by one or more local hub servers $22_1$-$22_L$ and vice versa, and/or may be controlled, in whole or in part, by one of the point-of-sale systems $24_1$-$24_M$, $24_1$-$24_N$ and vice versa.

The local hub server $22_1$ may be embodied as any type of server (e.g., a web server) or similar computing device capable of performing the functions described herein. In the embodiment shown in FIG. 1, the local hub server $22_1$ illustratively includes a processor 30, an I/O subsystem 32, a memory 34, a data storage 36, communication circuitry 38, and one or more peripheral devices 40. It should be appreciated that the local hub server $22_1$ may include other components, sub-components, and devices commonly found in a server and/or computing device, which are not illustrated in FIG. 1 for clarity of the description.

The processor 30 of the local hub server $22_1$ may be embodied as any type of processor capable of executing software/firmware, such as a microprocessor, digital signal processor, microcontroller, or the like. The processor 30 may be a single processor or include multiple processors. The I/O subsystem 32 of the local hub server $22_1$ may be embodied as circuitry and/or components to facilitate input/output operations with the processor 30 and/or other components of the local hub server $22_1$. The processor 30 is communicatively coupled to the I/O subsystem 32.

The memory 34 of the user local hub server 104 may be embodied as or otherwise include one or more conventional volatile and/or non-volatile memory devices. The memory 34 is communicatively coupled to the I/O subsystem 32 via a number of signal paths. Although only a single memory device 34 is illustrated in FIG. 1, the local hub server $22_1$ may include additional memory devices in other embodiments. Various data and software may be stored in the memory 34. The data storage 36 is also communicatively coupled to the I/O subsystem 32 via a number of signal paths, and may be embodied as any type of device or devices configured for the short-term or long-term storage of data such as, for example, memory devices and circuits, memory cards, hard disk drives, solid-state drives, or other data storage devices.

The communication circuitry 38 of the local hub server $22_1$ may include any number of devices and circuitry for enabling communications between the local hub sever $22_1$ and the main server 12 and between the local hub server $22_1$ and the one or more point-of-sale systems $24_1$-$24_M$. In the illustrated embodiment, for example, communication between the local hub server $22_1$ and the main server 12 takes place wirelessly via the network 20, wherein the network 20 may represent, for example, a private local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). In alternative embodiments, the communication path between the local hub server $22_1$ and the main server 12 may be a non-private network and/or may be, in whole or in part, a wired connection. Generally, the communication circuitry 38 may be configured to use any one or more, or combination, of conventional secure and/or unsecure communication protocols to communicate with the main server 12. As such, the network 20 may include any number of additional devices, such as additional computers, routers, and switches, to facilitate communications between the local hub server $22_1$ and the main server 12. Communication between the local hub server $22_1$ and the one or more point-of-sale systems $24_1$-$24_M$, $24_1$-$24_N$ may take place via one or more such wireless communication interfaces and/or via one or more conventional wired interfaces.

In some embodiments, the local hub server $22_1$ may also include one or more peripheral devices 40. Such peripheral devices 40 may include any number of additional input/output devices, interface devices, and/or other peripheral devices. For example, the peripheral devices 40 may include a display, a keyboard, a mouse, audio processing circuitry, and/or other input/output devices.

The local hub server $22_L$ may be substantially similar to the local hub server $22_1$ and include similar components. As such, the description provided above of the components of the local hub server $22_1$ may be equally applicable to such similar components of the local hub server $22_L$ and are not repeated herein so as not to obscure the present disclosure. Of course, it should be appreciated that in some embodiments one or more of the local hub servers $22_1$-$22_L$ and may be dissimilar to others of the local hub servers $22_1$-$22_L$.

Also depicted in FIG. 1 are a number of conventional position identification devices (PIDs) $26_1$-$26_P$ each illustratively coupled to the local hub server 22 in a different one of the brick-and-mortar enterprise locations such that each brick-and-mortar enterprise location includes a plurality of such position identification devices $26_1$-$26_P$. In alternate embodiments, one or more or all of the PIDs $26_1$-$26_P$ may not be coupled to the local hub server 22. In one embodiment, the position identification devices $26_1$-$26_P$ are provided in the form of conventional electronic wireless signal broadcasting devices, e.g., conventional radio frequency broadcasting beacons, for the purpose of broadcasting radio signals carrying information corresponding to the location and/or identity thereof, and will be described in the remainder of this document as such. It will be understood, however, that this disclosure contemplates other embodiments in which one or more of the position identification devices $26_1$-$26_P$ is/are provided in another form. Examples of such other forms will be described at the end of this document.

The wireless signal broadcasting devices $26_1$-$26_P$ will, for purposes of this disclosure, be described as being implemented in the form of such wireless signal broadcasting devices, although it will be understood that one or more of the wireless signal broadcasting devices $26_1$-$26_P$ may alternatively take the form of one or more other conventional wireless signal broadcasting devices operable to broadcast wireless signals carrying information corresponding to the location and/or identity of thereof.

Illustratively, the wireless signal broadcasting devices $26_1$-$26_P$ in each of the plurality of brick-and-mortar enterprise stores or outlets are, for purposes of this disclosure, located or positioned in a customer entry area to the plurality of point-of-sale systems $24_1$-$24_M$, $24_1$-$24_N$ or subset thereof in each of the plurality of brick-and-mortar stores or outlets of the retail enterprise, as will be described in further detail below with respect to an example implementation of the system illustrated in FIG. 5. In some embodiments, for example, each of the wireless signal broadcasting devices $26_1$-$26_P$ is mounted or placed relative to the plurality of point-of-sale systems $24_1$-$24_M$, $24_1$-$24_N$ or subset thereof such that signals broadcast by at least one of the wireless signal broadcasting devices $26_1$-$26_P$ will be detected at any entry point into the customer entry area to the plurality of point-of-sale systems $24_1$-$24_M$, $24_1$-$24_N$ or subset thereof. In any case, each such wireless signal broadcasting device $26_1$-$26_P$ is configured to periodically broadcast one or more unique wireless identification signals, i.e., one or more identification signals that distinguish the particular wireless signal broadcasting device 26 from other wireless signal broadcasting devices $26_1$-$26_P$.

In some embodiments, the wireless signal broadcasting devices $26_1$-$26_P$ are each configured to periodically broadcast wireless identification signals in the radio frequency (RF) range, although any of the one or more wireless signal broadcasting devices $26_1$-$26_P$ may be configured to alternatively broadcast wireless identification signals in one or more other frequency ranges. In any case, the wireless signal broadcasting devices $26_1$-$26_P$ are further each illustratively configured to broadcast wireless identification signals with a predefined broadcast range and/or orientation (i.e., direction).

Illustratively, the unique wireless identification signals broadcast by each wireless signal broadcasting device $26_1$-$26_P$ carry decodable information in the form of a unique identification code (UID). Generally, the UID of each wireless signal broadcasting device $26_1$-$26_P$ uniquely identifies that wireless signal broadcasting device and distinguishes that wireless signal broadcasting device from all other wireless signal broadcasting devices within the retail enterprise 11 or at least those located in any one brick-and-mortar enterprise store or outlet. In some embodiments, the UID may further include, and/or the unique wireless identification signals broadcast by one or more of the wireless signal broadcasting devices $26_1$-$26_P$ may further carry, wireless signal broadcasting device type information in the form of a wireless signal broadcasting device type code (BT). Generally, the wireless signal broadcasting device type code, BT, identifies the general location or use of each of the plurality of wireless signal broadcasting devices $16_1$-$16_J$. Example wireless signal broadcasting device types may include, but should not be limited to, point-of-sale wireless signal broadcasting devices, point-of-sale entrance area wireless signal broadcasting devices, e.g., one or more wireless signal broadcasting devices placed at, in or at least partially about a customer entrance or entry area to the point of-sale systems $24_1$-$24M$, or subset thereof, in any retail enterprise store or outlet, brick-and-mortar location entrance wireless signal broadcasting devices, wireless signal broadcasting devices associated with specific departments or product category locations within the retail enterprise 11, general store location wireless signal broadcasting devices, or the like. The wireless signal broadcasting device type code, BT, of each of the wireless signal broadcasting devices $26_1$-$26_P$ illustrated in FIG. 1, in embodiments in which include such wireless signal broadcasting device type codes, is illustratively a point-of-sale customer entry area wireless signal broadcasting device type, or as used hereinafter a "POS area entry wireless signal broadcasting device" type. Those skilled in the art will recognize additional and/or alternative information that may be included within or appended to the UID, and/or carried by the unique wireless identification signals broadcast by one or more of the wireless signal broadcasting devices $26_1$-$26_P$, and it will be understood that any such additional and/or alternative information is contemplated by this disclosure.

An embodiment of the main server 12 is also illustrated in FIG. 1, and generally includes the same components as the local hub server $22_1$. For example, a processor 50 is coupled to an I/O subsystem 52, and the I/O subsystem 52 is coupled to a memory 54, a data storage unit 56, communication circuitry 58 and one or more peripheral devices 60. In some embodiments, each of the foregoing components may be identical to corresponding components of the local hub server $22_1$ described above, and a detailed explanation of such components will not be repeated here for brevity. In other embodiments, the main server 12 may be configured differently than the local hub server $22_1$ described above. In any case, the communication circuitry 58 of each of the main server 12 facilitates communication with the communication circuitry 38 of the local hub servers 221-22L and vice versa so that information can be shared between the main server 12 and each of the one or more local hub servers $22_1$-$22_L$ via the network 20. Although only one such main server 12 is shown in FIG. 1, it should be appreciated that, in other embodiments, the system 10 may include any number of shopper main servers, and in still other embodiments the main server 12 may be communicatively coupled to one or more remote servers of the retail enterprise, and an example of one such remote enterprise server 28 is shown in FIG. 1. In such embodiments, the one or more remote servers 28 may include any structure or feature illustrated and described herein with respect to the main server 12, and may be configured to execute any one or more functions described with respect to the main server 12 either alternatively to the main server 12 or in addition to the main server 12. In any case, the main server 12 may be embodied as any type of server (e.g., a web server) or similar computing device capable of performing the functions described herein.

The mobile communication devices $16_1$-$16_J$ illustrated in FIG. 1 are intended to depict mobile communication devices that are each separately owned and/or operated by a different shopper. No limit on the total number of such mobile communication devices $16_1$-$16_J$ that may be owned and operated by any one shopper, or on the total number of such mobile communication devices $16_1$-$16_J$ that may communicate with the main server 12, is intended or should be inferred. The mobile communication devices $16_1$-$16_J$ may be or include any mobile electronic device capable of executing one or more software application programs as described herein and of communicating with the main server 12 via the public network 14. Examples of the mobile communication devices $16_1$-$16_J$ include, but should not be limited to, mobile telephones, smart phones, tablet computers, personal data assistants (PDAs), and the like.

The user computing devices $18_1$-$18_K$ illustrated in FIG. 1 are intended to include any of privately owned and accessed computers, such as those residing in shopper's residences, to include semi-privately owned and accessed computers, such as those residing at single or multiple-employee business enterprises, and publicly accessible computers, such as those available at internet cafés and kiosks. The user computing devices $18_1$-$18_K$ may be or include any computer capable of executing one or more software programs and of communicating with the main server 12 via the public network 14. Examples of the user computing devices $18_1$-$18_K$ include, but should not be limited to, personal computers (PCs), laptop computers, notebook computers and the like, whether or not networked with one or more other computing devices.

Figure 2:
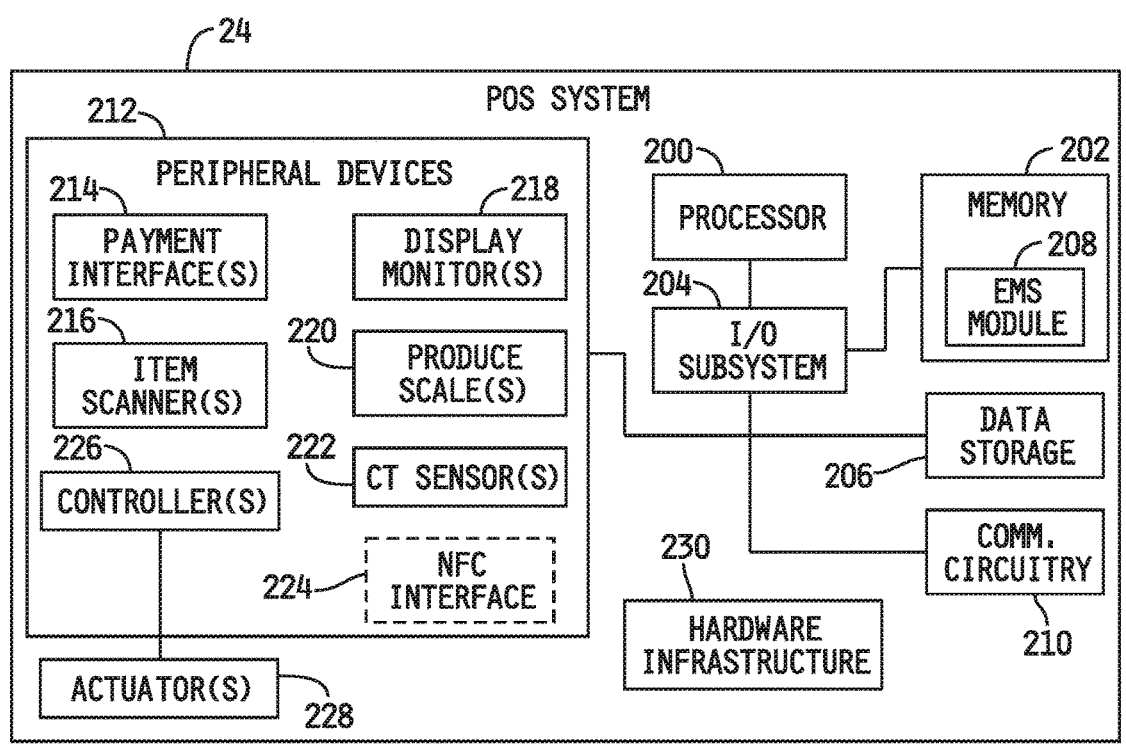
FIG. 2 is a simplified block diagram of an embodiment of one of the point-of-sale systems illustrated in FIG. 1.

Referring now to FIG. 2, an embodiment 24 of one of the one or more point-of-sale systems, $24_1$-$24_M$, $24_1$-$24_N$, is shown which includes components similar to the main server 12 and also to the one or more local hub servers $22_1$-$22_L$, such as a processor 200, an I/O subsystem 204, a memory 202, a data storage device 206, communication circuitry 210 and a number of peripheral devices 212. In some embodiments, each of the foregoing components may be identical to corresponding components of the local hub server $22_1$ described above, and a detailed explanation of such components will not be repeated here for brevity. In other embodiments, any of the one or more point-of-sale systems $24_1$-$24_M$, $24_1$-$24_N$ may be configured differently than the local hub server $22_1$ described above. In the illustrated embodiment, the memory 202 illustratively includes an EMS module 208 in the form of, e.g., instructions executable by the processor 200, to communicate customer-member information relating to the customer's EMS account to and from the main server 12, and to control one or more local peripheral devices to facilitate communications between customer-members of the enterprise membership service (EMS) program and the main server 12 and to facilitate manual customer input of customer-identifying information, e.g., an EMS identifying number and/or code (EMSID).

Additionally, the illustrated point-of-sale system 24 includes one or more actuators 228 and hardware infrastructure 230, examples of which will be described below. It will be appreciated that the point-of-sale system 24 may include other components, sub-components, and devices commonly found in a computer and/or computing device. In any case, the communication circuitry 210 is configured to facilitate communication with a corresponding one of the local hub servers $22_1$-$22_L$ and the point-of-sale system 24 may use any suitable communication protocol to communicate with the corresponding local hub server $22_1$-$22_L$.

In addition to, or alternatively to, the number of peripheral devices 40 of the local hub server $22_1$ described above, the number of peripheral devices 212 of the point-of-sale system 24 may include any number of other peripheral or interface devices. Examples of some of the peripheral devices 212 illustrated in FIG. 2 include, but should not be limited to, one or more conventional payment interfaces 214, one or more conventional item price scanners 216, one or more conventional display monitors 218, one or more conventional produce scales 220, one or more conventional checkout lane traffic sensors 222, and one or more conventional controllers 226 for controlling one or more conventional actuators 228 associated with the operation of the point-of-sale system 24. The one or more payment interfaces 214 are provided, e.g., to facilitate physical receipt of credit/debit card and/or other form of payment from customers (shoppers), and each such interface 214 may illustratively include one or more of a display, a touch screen, a keyboard, a mouse, external speakers, and/or other peripheral devices. One or more of the payment interfaces 214 may further include a produce scale 220, and one or more produce scales 220 may alternatively be coupled to the point-of-sale system 24 separately from the one or more customer payment interfaces 214. The one or more item scanner(s) 216 is/are configured to scan price code labels or other such indicators for items being purchased by customers and to also scan print media coupons.

The one or more display monitor(s) 218 provide item and/or pricing information to customers and/or enterprise employees, and may further provide additional information regarding cost and/or discounts for one or more items being purchased as well as information regarding discounts realized by customers through the use of print media and/or virtual coupons. The display monitor(s) 218 may additionally provide an interface, e.g., touchscreen or a co-located keypad, via which customers may input information such as their EMSID into the system 10.

The peripheral devices 212 of the point-of-sale system 24 further include at least one checkout lane traffic sensor 222. The checkout lane traffic sensor(s) 222 may be mounted to or near the point-of-sale system 24, and is/are configured to monitor customer traffic in and through a checkout lane defined by and between the point-of-sale system 24 and an adjacent point-of-sale system 24, or by and between the point-of-sale system 24 and another structure, and to produce one or more customer traffic signals corresponding thereto. In some embodiments, each point-of-sale system $24_1$-$24_M$, $24_1$-$24_N$ has a single checkout lane traffic sensor 222 associated therewith, i.e., located at or near the point-of-sale system, configured to monitor customer traffic at or through a single section, area or zone of the checkout lane. The single area or zone may be a portion of the checkout lane or the entire checkout lane. In other embodiments, each point-of-sale system $24_1$-$24_M$, $24_1$-$24_N$ has multiple checkout lane traffic sensors 222 associated therewith, and in such embodiments each checkout lane traffic sensor 222 is configured to monitor customer traffic at or through a different section, area or zone of the checkout lane. In any case, each checkout lane traffic sensor 222 is illustratively configured to monitor customer traffic at or through some or all of the checkout lane by detecting the presence of one or more customers, or detecting the presence of each customer, in at least one section, area or zone of the checkout lane and producing one or more signals corresponding thereto.

In one embodiment, the checkout lane traffic sensors 222 are each illustratively implemented in the form of one or more conventional image-capturing or video cameras configured to produce corresponding image or video signals. In such embodiments, the processor 50 of the main server 12 is illustratively operable to process the image or video signals produced by each image-capturing or video camera to determine, in some embodiments, whether any customers presently occupy one or more corresponding checkout lanes, and in other embodiments the processor 50 is operable to determine from the image or video signals how many customers presently occupy one or more of the corresponding checkout lanes and/or to determine or estimate other information relating to the processing of customers through the various point-of-sale systems $24_1$-$24_M$, $24_1$-$24_N$ based on the image or video signals. Such other information that may be determined or estimated by the processor 50 based on the image or video signals produced by the image-capturing or video cameras 222 mounted or placed at or near the point-of-sale systems $24_1$-$24_M$, $24_1$-$24_N$ may include, for example, but is not limited to, average processing times of customers through one or more of the point-of-sale systems $24_1$-$24_M$, $24_1$-$24_N$, quantity of merchandise, e.g., number of items, to be purchased by one or more customers, and the like. Those skilled in the art will recognize other conventional devices and/or systems which could be alternatively or additionally used to implement one or more of the checkout lane traffic sensors 222, and any such other devices and/or systems are contemplated by this disclosure.

The peripheral devices 212 of the point-of-sale system 24 may further optionally include a near-field communication interface 224, as illustrated in dashed-line configuration in FIG. 2, which may be included in embodiments in which one or more of the mobile communication devices $16_1$-$16_J$ also has such a near-field communication device such that customer information, e.g., customer identification information such as EMSIDs, user names, passwords, or the like, and/or customer payment information, e.g., credit/debit card information or the like, can be transferred from such one or more of the mobile communication devices $16_1$-$16_J$ to the point-of-sale system 24 by tapping the two near-field communication devices together or by passing the near-field communication device of a so-equipped mobile communication device $16_1$-$16_J$ sufficiently close to the near-field communication device 222 to effectuate such communication. Illustratively, customers may additionally transfer customer identification information to the point-of-sale system 24 via the payment interface 214, item scanner 216 or other peripheral device(s).

The point-of-sale system 24 further includes hardware infrastructure 230 which forms the structural backbone of the point-of-sale system 24. Examples of structural components that may be included in the hardware infrastructure 230 include, but should not be limited to, one or more purchased item transport units, e.g., one or more purchased item conveyance units or systems, one or more conventional purchased item bagging areas, e.g., one or more conventional item bagging carousals, one or more purchased item support units, and the like. In some embodiments, the customer checkout lane of each point-of-sale system $24_1$-$24_M$, $24_1$-$24_N$ is illustratively defined along such one or more purchased item conveyance systems, and may typically extend along such one or more conveyance systems from an entrance thereof to one or more bagging carousals located at an opposite end thereof. In some embodiments, the customer checkout lane may begin before the entrance to, or beginning of, the one or more conveyance systems. In some embodiments, the customer checkout lane may extend some distance from the beginning of the one or more conveyance systems out into the customer entry area to the point-of-sale systems $24_1$-$24_M$, $24_1$-$24_N$. In any case, the one or more actuators 228 may be or include any actuator that is controllable by at least one of the one or more conventional controllers 226, and which may facilitate operation and/or control of the hardware infrastructure of the point-of-sale system 24. Examples of such one or more actuators may include, but should not be limited to, one or more linear and/or rotational drive motors, one or more electronically controlled switches, and the like.

Figure 3A:
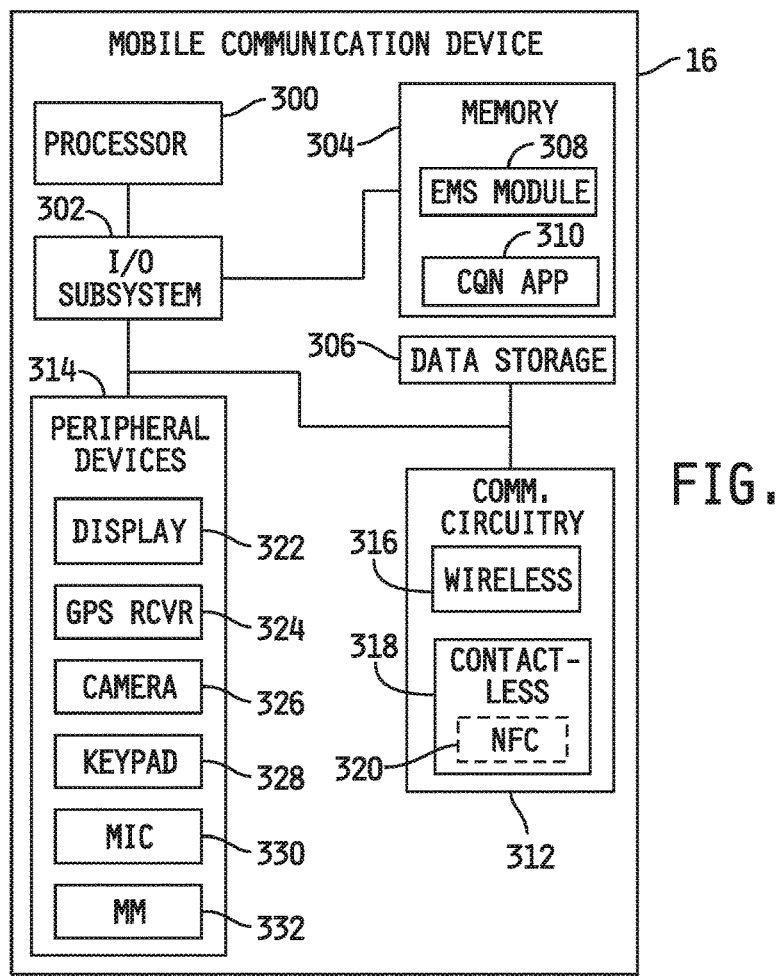
FIG. 3A is a simplified block diagram of an embodiment of one of the mobile communication devices illustrated in FIG. 1.

Referring now to FIG. 3A, an embodiment of one of the mobile communication devices $16_1$-$16_J$ illustrated in FIG. 1 is shown, which includes components similar to the main server 12 and also to the one or more local hub servers $22_1$-$22_L$ and the one or more POS systems $24_1$-$24_M$, $24_1$-$24_N$, such as a processor 300, an I/O subsystem 302, a memory 304 including an EMS module 308, a data storage device 306, communication circuitry 312 and a number of peripheral devices 314. In some embodiments, each of the foregoing components may be identical to corresponding components of the local hub server $22_1$ and/or POS system 24 described above, and a detailed explanation of such components will not be repeated here for brevity. In other embodiments, any of the one or more mobile communication devices $16_1$-$16_J$ may be configured differently than the local hub server $22_1$ described above. It will be appreciated that the mobile communication device 16 may include other components, sub-components, and devices commonly found in a computer and/or computing device.

The memory 304 illustratively includes an EMS module 308 in the form of, e.g., instructions executable by the processor 300 to communicate customer-member information to and from the main server 12, and to control one or more local peripheral devices to facilitate communications between customer-members of the enterprise membership service (EMS) program. The memory 304 further illustratively includes a checkout queue notification (CQN) application 310 in the form of, e.g., instructions executable by the processor 300 to wirelessly receive from the main server 12, and display to the customer, information relating to the customer processing status of one or more of the point-of-sale systems $24_1$-$24_M$. As will be described in greater detail hereinafter, the processor 50 of the main server 12 is illustratively operable to determine the customer processing status, which will also be referred to herein as purchase transaction activity, of one or more of the point-of-sale systems $24_1$-$24_M$, $24_1$-$24_N$, at least in part based on the signals produced by the customer traffic sensors 222, to identify customer-members of the EMS program as they enter the customer entry area of the point-of-sale systems $24_1$-$24_M$, $24_1$-$24_N$ or subset thereof via the customer-member mobile communication devices $16_1$-$16_J$, and to communicate to such customer-members via their mobile communication devices $16_1$-$16_J$ information relating to the availability of one or more of the point-of-sale systems $24_1$-$24_M$, $24_1$-$24_N$ to process the customer-member's purchase transaction. Example embodiments of the CQN application 310 will be described in greater detail hereinafter with respect to FIG. 6.

The communication circuitry 312 illustratively includes conventional wireless communication circuitry 316. In some embodiments, the wireless communication circuitry 316 is configured to conduct and facilitate cellular telephone communications with other cellular and land-based communication devices. In some embodiments, the wireless communication circuitry 316 is configured to conduct and facilitate communication with the main server 12 via the network 14. In some embodiments, the wireless communication circuitry 316 is configured to access the network 14 via at least one hotspot established in any of the brick-and-mortar stores by a corresponding at least one WiFi Access Point 28. In some embodiments, the wireless communication circuitry 316 may further be configured to conduct and facilitate communication with one or more of the position identification devices $26_1$-$26_N$ in any of the brick-and-mortar stores. The wireless communication circuitry 316 may illustratively include conventional communication circuitry for conducting and facilitating any such communication, and examples of such conventional communication circuitry include, but are not limited to, one or more conventional radio frequency (RF) transceivers configured to receive and transmit signals at multiple radio frequencies, one or more conventional modem or other communication circuits configured to access and conduct communications via the Internet, and the like. The mobile communication device 16 may illustratively use any suitable communication protocol via the network 14 or other network to communicate with the main server 12, with other cellular and land-based communication devices and/or with one or more of the position identification devices $26_1$-$26_P$ in any of the brick-and-mortar stores.

The communication circuitry 312 of the mobile communication device 16 may further optionally include conventional contact-less communication circuitry 318, which may include a conventional near-field communication device 320, as illustrated by dashed-line representation in FIG. 3A. The near-field communication device 320 may be included, for example, in embodiments in which one or more of the point-of-sale systems $24_1$-$24_M$, $24_1$-$24_N$ also has/have a near-field communication interface 222 such that customer information, e.g., customer identification information in the form of one or more identification codes (e.g., EMSID), user names, passwords, or the like, and/or customer payment information, e.g., credit/debit card information or the like, can be transferred from the mobile communication device 16 to such one or more point-of-sale systems $24_1$-$24_M$, $24_1$-$24_N$ by tapping the two near-field communication devices together or by passing the near-field communication device 320 of the mobile communication device 16 sufficiently close to the near-field communication interface 222 to effectuate such communication. In addition to, or alternatively to, the number of peripheral devices 40 of the local hub server 22 described above, the number of peripheral devices 310 of the mobile communication device 16 may include any number of other or additional peripheral or interface devices. Examples of such additional peripheral devices illustrated in FIG. 3A include, but should not be limited to, a conventional visual display unit or screen 322, a conventional global positioning system (GPS) receiver 324, a conventional camera 326, a conventional keypad 328, a conventional microphone 330 and a conventional magnetometer 332. The display 322 is configured, in a conventional manner, to be responsive to instructions produced by the processor 300 to display information thereon. The GPS receiver 324 is configured, in a conventional manner, to receive radio-frequency signals transmitted by earth-orbiting satellites and to produce corresponding signals from which geographical coordinates of the receiver 324 are or can be determined. The camera 326 is configured, in a conventional manner, to capture images and/or video and to display the same on the display 322. The keypad 328 is configured, in a conventional manner, to provide signals corresponding to manual selection and activation thereof to the processor 300, and the microphone 330 is configured, in a conventional manner, to capture sound waves and to provide signals corresponding thereto to the processor 300. The magnetometer 332 is configured, in a conventional manner, to detect local geomagnetic fields, to produce magnetic signature signals based thereon and to provide such signals to the processor 300.

Figure 3B:
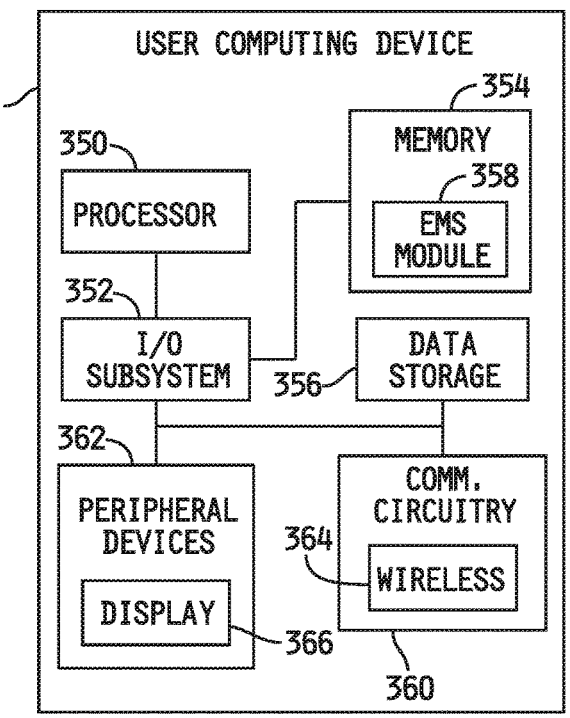
FIG. 3B is a simplified block diagram of an embodiment of one of the user computing devices illustrated in FIG. 1.

Referring now to FIG. 3B, an embodiment of one of the user computing devices 18 illustrated in FIG. 1 is shown, which includes components similar to the main server 12 and also to the one or more local hub servers $22_1$-$22_L$ and the one or more POS systems $24_1$-$24_M$, $24_1$-$24_N$, such as a processor 350, an I/O subsystem 352, a memory 354 including an EMS module 358, a data storage device 356, communication circuitry 360 and a number of peripheral devices 366. In some embodiments, each of the foregoing components may be identical to corresponding components of the local hub server $22_1$ and/or POS system 24 described above, and a detailed explanation of such components will not be repeated here for brevity. In other embodiments, any of the one or more user computing devices $18_1$-$18_K$ may be configured differently than the local hub server $22_1$ described above. It will be appreciated that the user computing device 18 may include other components, sub-components, and devices commonly found in a computer and/or computing device. In any case, the communication circuitry 360 illustratively includes conventional wireless communication circuitry 364 configured to facilitate communication with the main server 12 via the network 14, and the user computing device 18 may use any suitable communication protocol to communicate with the corresponding main server 12. In addition to, or alternatively to, the number of peripheral devices 40 of the local hub server $22_1$ described above, the number of peripheral devices 366 of the user computing device 18 may include any number of other or additional peripheral or interface devices. One example of such an additional peripheral device illustrated in FIG. 3B includes, but should not be limited to, a conventional visual display unit 366.

Figure 4:
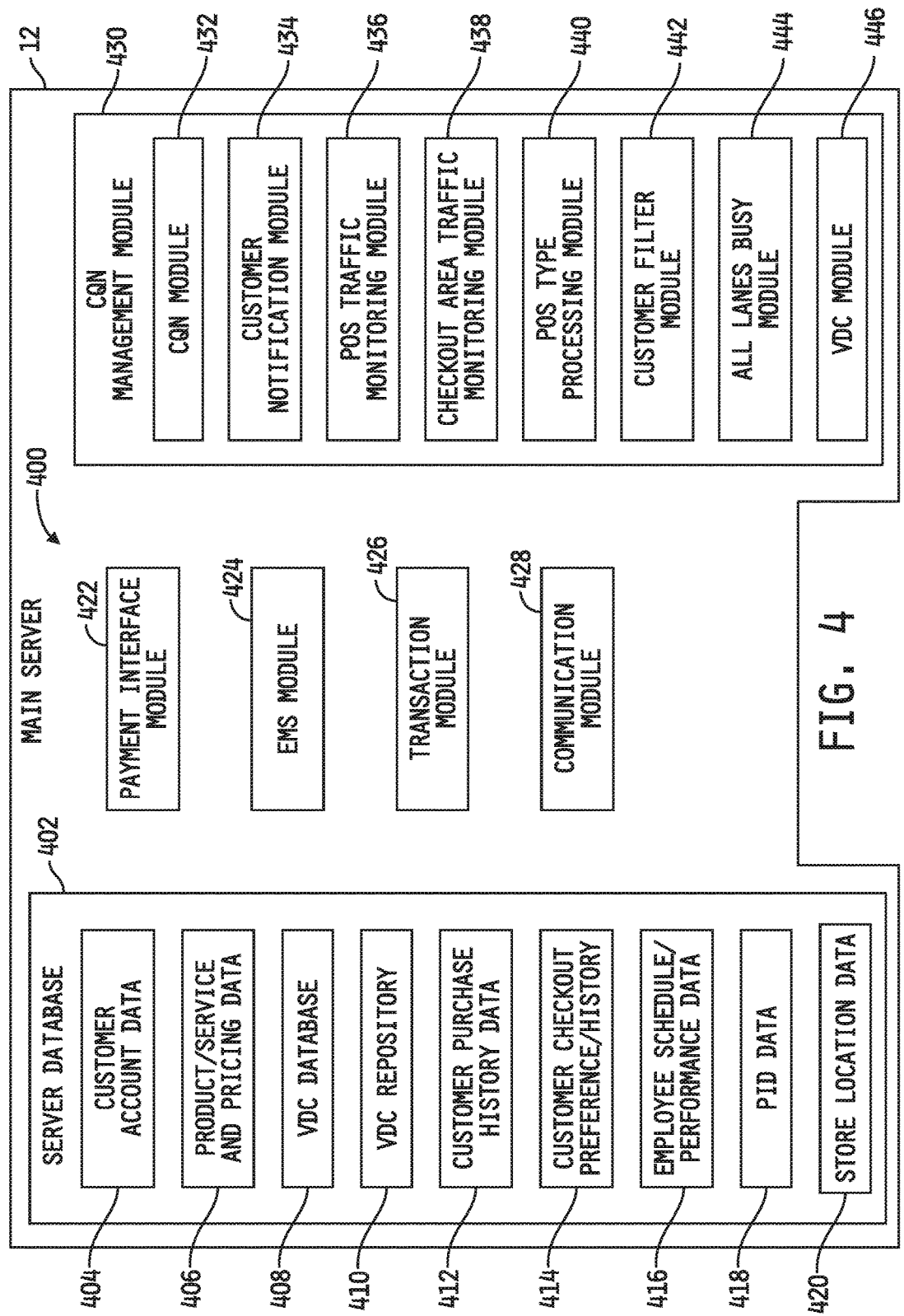
FIG. 4 is a simplified block diagram of an embodiment of an environment of the main server of FIG. 1.

Referring now to FIG. 4, a simplified block diagram is shown of an embodiment of an environment 400 of the main server 12 illustrated in FIG. 1. In the embodiment shown in FIG. 4, the environment 400 includes a server database 402 which illustratively includes customer account data 404, product/service and pricing data 406, a virtual coupon database 408, a virtual coupon repository 410, customer purchase history data 412, customer checkout preference/history database 414, employee schedule/performance database 416, PID data 418 and store location data 420.

Customers may elect to participate in an enterprise membership services (EMS) program offered, managed and maintained by the retail enterprise 11, by establishing a user account (which may be referred to herein as an "EMS account" or "customer account") within the server 12, which user account may in some cases be an individual account accessible only by an individual person, e.g., an individual customer, and in other cases may be a group or "household" account accessible by each of a plurality of members of a predefined group of persons, e.g., members of a family or household, one or more employees of a business enterprise, etc. The terms "shopper," "member," "customer member," "customer" and "household," and variants thereof, are used interchangeably in the following description, and such terms should be understood to refer interchangeably to an individual shopper or a predefined group of individual shoppers (referred to herein as a "household") who shop at and purchase items from a retail enterprise, and who are members of an enterprise membership service (EMS) of the type described herein and provided and managed by the retail enterprise 11.

Illustratively, a software application program is available for download from the main server 12 via the public network 14 for shoppers electing to access the EMS program via their mobile communication device, e.g., one of the mobile communication devices $16_1$-$16_J$. Once downloaded and activated, shoppers can access and manage their EMS account and program features via the software application program executed by their mobile communication device $16_1$-$16_J$. Illustratively, the main server 12 additionally hosts and controls an EMS website accessible via the public network 14, and in such embodiments shoppers can access and manage their EMS accounts and program features by accessing their EMS page(s) of the EMS website hosted by the main server 12 via a computing device $18_1$-$18_L$ and/or via their mobile communication device $16_1$-$16_J$ if the latter is equipped with a web browser.

In the illustrated embodiment, the customer account data 404 of the server database 402 has stored therein information relating to user accounts and profile data for each of the members of the EMS program. As shoppers join the EMS program, the server 12 establishes an EMS account within the customer account data 404 that is unique to the customer, and assigns to the shopper, and/or the shopper selects, a unique, corresponding enterprise membership services identification code, EMSID, as briefly described hereinabove. The EMSID associated with each customer is entered into the server 12 is stored along with the customer's profile data in the customer account data 404, and can be used thereafter to access the customer's EMS account. The customer account data 404 illustratively further includes additional information relating to the various customer-members of the EMS program. Examples of such additional information include, but are not limited to, customer name, customer address, communication information (CI) of a mobile communication device 16 carried by the customer, and the like. In one embodiment, the communication information (CI) may be or include the telephone number of the customer's mobile communication device 16. In other embodiments, the communication information (CI) may be or include a serial number, electronic identification code or other communication identifier associated with the customer's mobile communication device 19. In still other embodiments, the communication information (CI) may be or include, in place of or in addition to a telephone number or communication identifier of the customer's mobile electronic device, one or more other unique mobile electronic device identification codes that identify the specified mobile electronic device 16 for purposes of wireless communication therewith. In any case, all such customer identity information is illustratively associated, i.e., linked or mapped together, in the customer account data 402 such that a search of one customer identity parameter will provide access to the lined customer identity parameters.

In some embodiments, the EMSID may be provided on or as part of one or more of a shopper's ID card, an ID associated with an RFID tag, which RFID tag may be part of the NFC communication circuitry of the mobile communication device $16_1$, a shopper's incentive card, or the like. In other embodiments, the EMSID may not be provided in or as part of any tangible form, and may instead be or include one or more easily remembered sequences of numbers, letters, symbols or other characters. In any case, customer members of the EMS program described herein may scan or otherwise communicate or enter via a keypad or touchscreen their EMSID at one of the point-of-sale terminals $24_1$-$24_M$ (or $24_1$-$24_N$), and it is through the customer's EMSID that the main server 12 makes virtual discount offers available to the customer and/or associates purchases made by the customer with the customer's purchase history to thereby monitor and track purchases made by the customer from the retail enterprise 11 during purchase transactions. All purchase transaction data relating to items purchased by such an identified customer during a purchase transaction carried out via one of the point-of-sale system $24_1$-$24_M$, $24_1$-$24_N$ of the retail enterprise 11 is illustratively stored in the customer purchase history database 414 where it is associated with the identified customer via the customer's EMSID. MPERKS®, a virtual customer coupon collection and redemption program offered to customers by Meijer, Inc. of Grand Rapids, Mich., is an example of one such EMS program of the type described herein, although it will be appreciated that any retail enterprise membership service which offers virtual discount coupons and/or other benefits to shopper members, and/or which tracks items purchased by shopper members during item purchase transactions at point-of-sale systems or terminals may be alternatively be used.

As will be described in greater detail below, the member shopper's EMSID may, in some embodiments, be automatically provided, via the member shopper's mobile communication device 16, to the main server 12 in a manner that is transparent to the member shopper and that does not require the member shopper to perform any manual acts other than to carry the member shopper's mobile communication device 16.

The product/service and pricing data 406 contains information relating to the retail products and services sold by the retail enterprise 11 which the main server 12 serves. Illustratively such information may include, but is not limited to, product/service description information including product/service manufacturer, product/service family or brand, primary product type (e.g., canned tomatoes), secondary product type (e.g., canned diced tomatoes), tertiary product type (e.g., canned diced tomatoes Italian style), etc., product container size (e.g., 12 oz. can, 32 oz. can, 16 oz. package, etc.), product/service pricing information, product/service unit pricing information, current product inventory, ordered product data, product sales history, product/service location within the corresponding retail outlet, and the like. Illustratively, product/service pricing information is linked to product/service identification information via scan codes, e.g., scannable bar codes such as Universal Product Codes (UPC) or the like, such that when items are scanned for purchase, the scan code of each item will identify a particular item at a particular price in the product/service and pricing database 406.

In some embodiments, the main server 12 illustratively provides, as part of the EMS program described herein, discount offers to member shoppers for one or more items purchasable from the business enterprise, e.g., in the form of one or more corresponding virtual discount coupons. In this regard, each member shopper is provided by the main server 12 with access to dedicated portion of a customer virtual coupon repository database in which virtual discount coupons specific to the member shopper or customer are stored and via which the member shopper may access and redeem one or more virtual discount coupons. In one embodiment, the server database 402 includes a plurality of customer virtual coupon repositories; one for each of the plurality of member shoppers. Alternatively, the server database 402 may include a single repository, and each member shopper of the EMS program is provided with access to a dedicated portion of the repository; i.e., which can be accessed by one shopper to the exclusion of all other shopper members. The server database 402 further illustratively includes a clipped virtual coupon repository 410 in which virtual discount coupons "clipped" by shopper members, i.e., selected for redemption, are stored. The server database 402 may include a single such repository 410, and each member shopper of the EMS program may be provided with access to a dedicated portion of the repository 410; i.e., which can be accessed by one shopper to the exclusion of all other shopper members, or a separate repository 410 for each member shopper. The virtual coupon bank 408 illustratively has stored therein virtual discount coupons that are received from an external source and from which the customer virtual coupon repositories may be populated, e.g., periodically, aperiodically and/or on an ad hoc basis.

The environment 400 of the main server 12 further includes a payment interface module 422, an EMS module 424, a transaction module 426 and a communication module 428. In one embodiment, the payment interface module 422 is configured, in a conventional manner, to process tangible forms of electronic payment systems (EPS), e.g., tangible electronic funds transfer instruments such as credit cards, debit cards, etc., used at the point-of-sale systems $24_1$-$24_M$, $24_1$-$24_N$. In an example of such embodiments, the payment interface module 422 illustratively is or includes a conventional magnetic strip reading device configured to read payment information stored in magnetic form on a strip affixed to a conventional credit or debit card. Alternatively or additionally, the payment interface module 422 may be or include the NFC interface 224, and in such embodiments the NFC interface 224 is configured to access, via contact or near-contact with a portable electronic device having a like-configured NFC device 320, electronically readable customer payment system (EPS) information stored on or accessible by the portable electronic device.

The EMS module 424 is configured to control and manage EMS-related activity of shopper members of the EMS program. The communication module 428 is configured, in a conventional manner, to control and manage all communications between the main server 12 and the local hub servers $22_1$-$22_L$ in embodiments that include the local hub servers $22_1$-$22_L$, and to control and manage all communications between the main server 12 and all point-of-sale systems $24_1$-$24_M$, $24_1$-$24_N$ in embodiments that do not include a local hub server $22_1$-$22_L$. The communication module 428 is further configured, in a conventional manner, to control and manage all wireless communications conducted between the main server 12 and the mobile communication devices $16_1$-$16_J$.

The customer payment interface 214 and item scanner 216 of the point-of-sale systems $24_1$-$24_M$, $24_1$-$24_N$, together with the payment interface module 422 of the main server 12, make up a product purchase interface a customer-accessible portion of which is provided in the form of the point-of-sale terminals or systems $24_1$-$24_M$, $24_1 24_N$ physically located at a brick-and-mortar location of the business enterprise. In some embodiments, the payment interface module 422 and the transaction module 426 of the main server 12 are operable to control all purchase transactions made at any of the point-of-sale systems $24_1$-$24_M$, $24_1$-$24_N$, and in such embodiments the processors 200 of the point-of-sale systems $24_1$-$24_M$, $24_1$-$24_N$ are operable to control the various peripheral devices 212 based on instructions from the processor 50 of the main server and to provide information relating to purchase transactions taking place at the point-of-sale systems $24_1$-$24_M$, $24_1$-$24_N$ back to the processor 50. In other embodiments, the processors 200 of the point-of-sale systems $24_1$-$24_M$, $24_1$-$24_N$ may control some or all aspects of the purchase transactions made thereat. In any case, the communication module 428 is configured, in a conventional manner, to control and manage all communications between the main server 12 and the local hub servers $22_1$-$22_L$ via the network 20 (an to thereby control and manage all communications between the main server 12 and the point-of-sale systems $24_1$-$24_M$, $24_1$-$24_N$), to control and manage all communications between the main server 12 and the mobile communication devices $16_1$-$16_J$ via the network 14 and to also control and manage all communications between the main server 12 and the user computing devices $18_1$-$18_K$ via the network 14.

The transaction module 426 is configured to oversee and monitor purchase transactions conducted by customers at any of the point-of-sale systems $24_1$-$24_M$, $24_1$-$24_N$. The transaction module 426 is further operable to monitor purchases of products and services made by customer-members of the EMS program at the point-of-sale systems $24_1$-$24_M$, $24_1$-$24_N$, and to store purchase transaction data associated with such purchases in the customer purchase history database 412. Illustratively, the customer purchase history database 412 is partitioned or otherwise configured to store such purchase transaction data in a manner that provides for the separate tracking and identification of some or all of the shopper purchase history of each shopper (or household) member.

The customer checkout preference/history database 414 illustratively contains customer preferences, i.e., for each EMS customer member, for one or more checkout lanes, POS system types, POS operators or attendants, and the like. In some embodiments, the customer checkout preference/history database 414 also illustratively contains historical information relating the historical use by each EMS customer member of individual POS systems 24 in any one or more of the stores.

The employee schedule/performance data 416 illustratively includes information relating to employee identification information for each employee of the retail enterprise, examples of which may include, but should are not limited to, one or any combination of employee name, one or more digital photographs of the employee, brick-and-mortar location at which the employee is located, work schedule of the employee, the position or function of the employee at the retail enterprise 11, employee work performance evaluations and/or rankings, communication information (CI), of an enterprise mobile communication device 18 assigned to or otherwise carried by the employee, and the like. Any such employee information is illustratively associated, e.g., linked or mapped, in the employee data 416 such that the processor 50 may be configured to search employee records within the employee data 416 according to any employee identifier.

The PID data 418 illustratively has stored therein information from which each position identification device $26_1$-$26_P$ in the retail enterprise 11 can be uniquely identified and/or located. In some embodiments, for example, the PID data 418 may include only PID identity information which identifies each particular PID $26_1$-$26_P$ and/or which identifies some aspect, property or characteristic thereof. In other embodiments, the PID data 418 may illustratively include PID location information which identifies a location or position of each PID $26_1$-$26_P$ geographically and/or relative to one or more references positions. In still other embodiments, the PID data 418 may include a combination of any such PID identity information and PID location information.

The store location data 420 illustratively has stored therein reference location information identifying each of the brick-and-mortar stores of the retail enterprise and a geographic location thereof. In some embodiments, the store location data 420 may include various physical locations within each brick-and-mortar store. In some embodiments, the store location data 420 may alternatively or additionally include physical and/or product location information identifying various merchandise areas, product display areas, shelving units, shelves or other physical locations within the brick-and-mortar stores. In still other embodiments, the store location data 420 may alternatively or additionally include topographical map, planogram or other such data, some or all of which may be in graphical form, corresponding to one or more locations or areas within each of the brick-and-mortar stores.

The environment 400 of the main server 12 further illustratively includes a checkout queue notification (CQN) management module 430 which illustratively includes a checkout queue module 432, a customer notification module 434, a POS traffic monitoring module 436, a checkout area traffic monitoring module 438, a POS type processing module 440, a customer filter module 442, an all lanes busy module 444 and a virtual discount coupon (VDC) module 446. The CQN module 432 is illustratively operable to manage one or more processes for providing customers with notifications as they enter the customer entry area to the plurality of point-of-sale systems $24_1$-$24_M$, $24_1$-$24_N$, or subset thereof, of checkout queue activity, i.e., of customer processing status or purchase transaction activity, of one or more of the point-of-sale systems $24_1$-$24_M$, $24_1$-$24_N$, via wireless transmission by the main server 12 of one or more messages to customer module communication devices $16_1$-$16_J$. As will be described in greater detail hereinafter, the CQN module 432 is generally operable to determine the customer processing status, or purchase transaction activity, of one or more of the point-of-sale systems $24_1$-$24_M$, $24_1$-$24_N$, at least in part based on the signals produced by the customer traffic sensors 222, to identify customer-members of the EMS program as they enter the customer entry area of the point-of-sale systems $24_1$-$24_M$, $24_1$-$24_N$ or subset thereof via the customer-member mobile communication devices $16_1$-$16_J$, and to communicate to such customer-members via their mobile communication devices $16_1$-$16_J$ information relating to the availability of one or more of the point-of-sale systems $24_1$-$24_M$, $24_1$-$24_N$ to process the customer-member's purchase transaction.

The CQN module 432 further illustratively contains information about each of the wireless signal broadcasting devices $26_1$-$26_P$ in each store or outlet of the retail enterprise 11. In some embodiments, such wireless signal broadcasting device information includes unique identification codes (U ID) of each wireless signal broadcasting device $26_1$-$26_P$. In other embodiments, the wireless signal broadcasting device information may additionally include wireless signal broadcasting device type information identifying or associating a wireless signal broadcasting device type, BT, with each wireless signal broadcasting device $26_1$-$26_P$. In some such embodiments, the wireless signal broadcasting device information may be stored, e.g., separately, in the module 432 according to wireless signal broadcasting device type. In some embodiments, the CQN module 432 may include additional information including, for example, but not limited to, positional information corresponding to the coordinates of some or all of the wireless signal broadcasting devices $26_1$-$26_P$ of the retail enterprise 11 and/or of one or more brick-and-mortar stores or outlets thereof, relative to one or more sets of base coordinates. The CQN module 432 is further illustratively operable to process wireless signal broadcasting device-related information transmitted to the main server 12 by customers' mobile communication devices $16_1$-$16_J$, and to control transmission of corresponding and related information back to the customers' mobile communication devices $16_1$-$16_J$.

The customer notification module 434 is illustratively operable to determine manage and control information provided to customer mobile communication devices.

The POS traffic monitoring module 436 is illustratively operable to acquire customer traffic data and/or purchase transaction activity associated with one or more of the point-of-sale systems $24_1$-$24_M$, $24_1$-$24_N$ and determine a wait time therefor and/or an operating status thereof based on the customer traffic data and/or purchase transaction activity.

The all lanes busy module 444 is illustratively operable to determine and wirelessly transmit loyalty rewards to customers, e.g., in the form of one or more virtual discount coupons, in the event that all checkout lanes are busy at the time such customers enter the customer entry area of the point-of-sale systems $24_1$-$24_M$, $24_1$-$24_N$ or subset thereof.

The VDC module 446 is illustratively operable to generate and/or retrieve from the virtual coupon bank 408 one or more virtual discount coupons for wireless transmission to customers when the all lanes busy module 442 determines that all of the checkout lanes of the point-of-sale systems $24_1$-$24_M$, $24_1$-$24_N$, or subset thereof, are busy.

Figure 5:
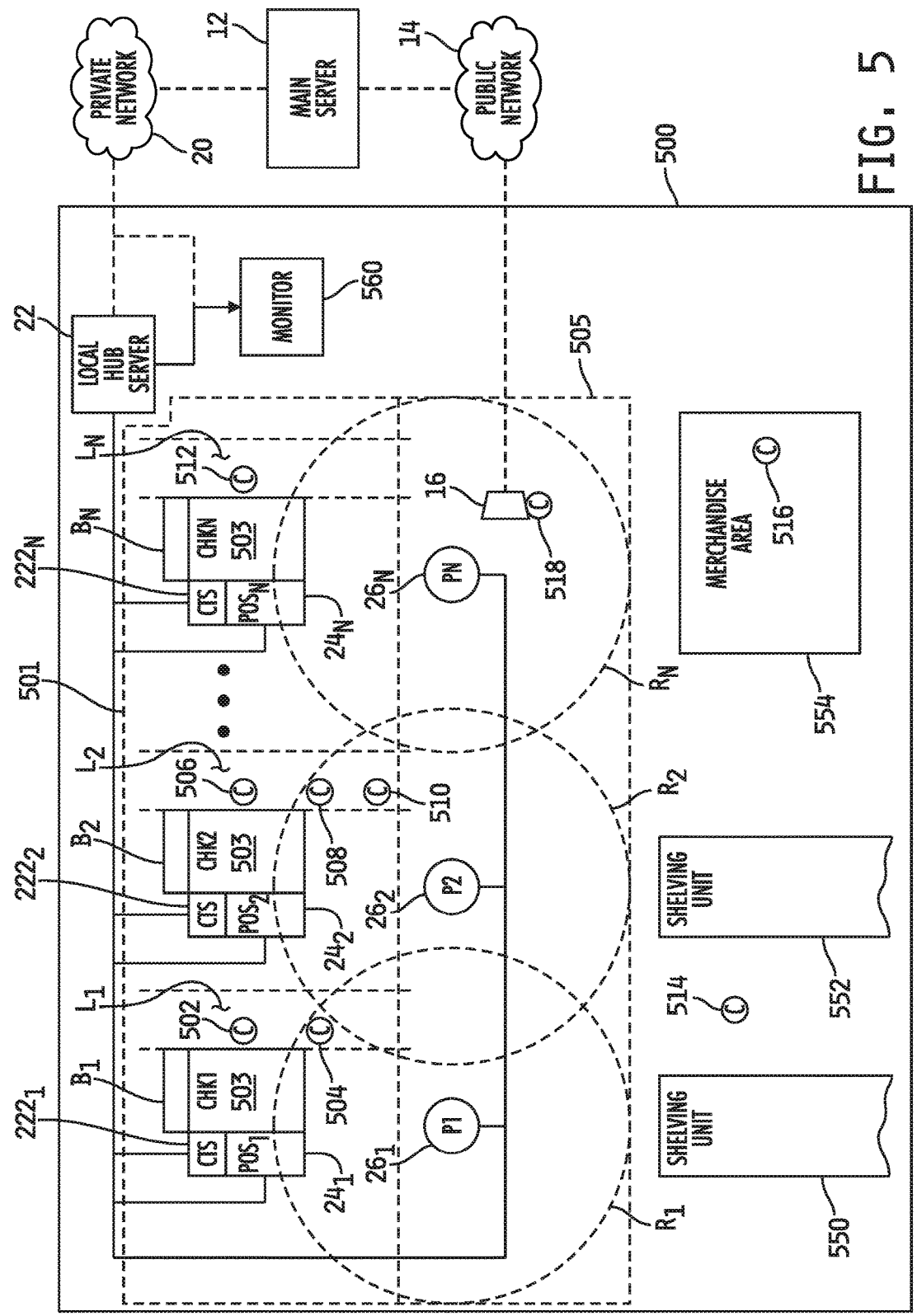
FIG. 5 is a simplified block diagram of an example implementation of the system of FIG. 1 in a brick-and-mortar store of a retail enterprise.

Referring now to FIG. 5, a simplified block diagram is shown of an illustrative example of the system 10 of FIG. 1 implemented a brick-and-mortar store or outlet 500 of the retail enterprise 11. In the illustrate example embodiment, the brick-and-mortar store or outlet 500 includes a plurality of point-of-sale systems $24_1$-$24_N$ grouped together in a customer checkout area 501 of the brick-and-mortar store or outlet 500. It will be understood that the grouped-together point-of-sale systems $24_1$-$24_N$ may illustratively include any number of point-of-sale systems $24_1$-$24_M$, $24_1$ -$24_N$ of the type described hereinabove. It will be further understood that the brick-and-mortar store or outlet 500 may include one or more point-of-sale systems in addition to, but separate from and located elsewhere relative to, the plurality of point-of-sale systems $24_1$-$24_N$ positioned or located in the customer checkout area 501.

In the illustrated embodiment, each point-of-sale system $24_1$-$24_N$ is part of, i.e., one component of, a different one of a corresponding plurality of customer checkout stations CHK1-CHKN. Each customer checkout station CHK1-CHKN further includes a different and dedicated one of a corresponding plurality of customer traffic sensors $222_1$$222_N$ as illustrated in FIG. 5. In the illustrated embodiment, the point-of-sale systems $24_1$-$24_N$ and the customer traffic sensors $222_1$-$222_N$ are all coupled to the local hub server 22, and the local hub server 22 is illustratively coupled to the main server 12 via the private network 20 as illustrated and described with respect to FIG. 1. In some alternate embodiments, one or more of the customer traffic sensors $222_1$-$222_N$ may alternatively or additionally be coupled to a corresponding one of the plurality of point-of-sale systems $24_1$-$24_N$ as illustrated in FIG. 1.

Each customer checkout station CHK1-CHKN illustratively includes one or more conveyance systems and/or stationary counters or shelves 503 upon which customers place items to be purchased or to be processed for purchase. In some embodiments, each of the customer checkout stations CHK1-CHKN is illustratively an attended, i.e., cashier-staffed, customer checkout station, and in such embodiments each checkout station CHK1-CHKN includes one or more conveyance systems 503. In other embodiments, each of the customer checkout stations CHK1-CHKN is illustratively a so-called self-checkout station or self-service checkout station which does not include a dedicated attendee, but may include one or more attendees which oversee operation of the customer checkout stations CHK1-CHKN, and in such embodiments each such checkout station CHK1-CHKN may typically include at least one counter or shelf 503. In still other embodiments, one or more of the customer checkout stations CHK1-CHKN may be a so-called hybrid customer checkout station configured to allow the checkout station to be switched between a cashier-operated checkout station and a self-service checkout station or to allow simultaneous cashier-operated and self-checkout modes of operation, and in such embodiments such one or more customer checkout stations may include one or more conveyor systems and/or counters or shelves 503. In still further embodiments, one or more of the customer checkout stations CHK1-CHKN may include a high-speed price scanning device such that the checkout station can sequentially process a high volume of customer throughput, and in such embodiments such one or more customer checkout stations may include one or multiple conveyor systems and/or counters/shelves 503.

In any case, the customer checkout area 501 further includes a plurality of customer checkout lanes or queues $L_1$-$L_N$ each generally positioned between adjacent ones of the plurality of customer checkout stations CHK1-CHKN, and more specifically each defined adjacent to and along, e.g., parallel with, the one or more conveyor systems and/or counters/shelves 503 of a corresponding one of the customer checkout stations CHK1-CHKN. Each customer checkout station CHK1-CHKN further illustratively defines a bagging area $B_1$-$B_N$ at one end thereof, i.e., at a customer outlet thereof. An opposite end of each customer checkout station CHK1-CHKN illustratively defines a customer inlet to the corresponding checkout station CHK1-CHKN, and each customer checkout lane or queue $L_1$-$L_N$ generally extends between the customer inlet and the bagging area $B_1$-$B_N$.

The brick-and-mortar outlet 500 of the retail enterprise 11 illustratively includes one or more merchandise areas, locations, zones or sections where items to be sold are displayed. In the illustrated example, the brick-and-mortar store or outlet 500 illustratively includes two or more shelving units 550, 552, which illustratively hold items offered for sale by the retail establishment and define conventional shopping aisles therebetween, and a separate merchandise area 554 adjacent to the two or more shelving units 550, 552. Between the customer checkout area 501 and the one or more merchandise areas, the brick-and-mortar store or outlet 500 illustratively defines a customer entry area 505 to the customer checkout area 501. Customers that have completed selection of one or more items for purchase and wish to pay for such items accordingly advance from the one or more merchandise areas to the customer checkout area 501, and in doing so all such customers pass through the customer entry area 505. Within the customer entry area 505 to the customer checkout area 501, as illustrated in FIG. 5, are positioned a number of wireless signal broadcasting devices $26_1$-$26_N$. Generally, the wireless signal broadcasting devices $26_1$-$26_N$ may be located anywhere within, along, above, partially about or about the customer entry area 505. In the embodiment illustrated in FIG. 5, for example, the wireless signal broadcasting devices $26_1$-$26_N$ are shown distributed substantially centrally and equally spaced through the customer entry area 505, although it will be understood that such an arrangement is provided only by way of example and should not be considered to be limiting in any way.

As described hereinabove with respect to FIG. 1, each of the wireless signal broadcasting devices $26_1$-$26_N$ is operable to broadcast wireless identification signals. Such signals may be broadcast continuously, continually or on demand, and may be periodic or non-periodic. In some embodiments, as illustrated by example in FIG. 5, each wireless signal broadcasting device $26_1$-$26_N$ is communicatively coupled directly to the local hub server 22, although in other embodiments one or more of the wireless signal broadcasting devices $26_1$-$26_N$ may be communicatively coupled to one or more of the point-of-sale systems $24_1$-$24_N$, and in still other embodiments one or more of the wireless signal broadcasting devices $26_1$-$26_N$ may not communicatively coupled to the local hub server 22 or to any point-of-sale system $24_1$-$24_N$, or may be coupled to the local hub server 22 or to one or more of the point-of-sale systems $24_1$-$24_N$ only for purposes of diagnostic monitoring thereof.

Each wireless signal broadcasting device $26_1$-$26_N$ is illustratively configured to broadcast wireless identification signals with a predefined orientation (i.e., direction) and broadcast range. In the embodiment illustrated in FIG. 5, for example, each wireless signal broadcasting device $26_1$-$26_N$ is illustratively operable to broadcast wireless identification signals radially thereabout as indicated in FIG. 5 by the dashed-line ring about each such wireless signal broadcasting device $26_1$-$26_N$, and each wireless signal broadcasting device $26_1$-$26_N$ is further illustratively configured to broadcast a wireless identification signal with a corresponding broadcast range represented in FIG. 5 as $R_1$-$R_N$. Generally, the broadcast range of any wireless signal broadcasting device $26_1$-$26_N$ should be understood to be defined by an area relative to that wireless signal broadcasting device 26 within which the signal strength of wireless signals broadcast thereby is sufficient to be detected by the communication circuitry 38 of the customer mobile communication devices $16_1$-$16_J$, and outside of which the signal strength of wireless signals broadcast thereby is undetectable by the communication circuitry 38 carried by the customer mobile communication devices $16_1$-$16_J$. As used in the previous sentence, the term "undetectable" should be understood to mean any of indistinguishable by the communication circuitry 38 of the customer mobile communication devices $16_1$-$16_J$ from background electromagnetic noise, distinguishable by the communication circuitry 38 of the customer mobile communication devices $16_1$-$16_J$ from background electromagnetic noise but not decodable by the communication circuitry 38 of the customer mobile communication devices $16_1$-$16_J$, or distinguishable by the communication circuitry 38 of the customer mobile communication devices $16_1 16_J$ from background electromagnetic noise but not decodable by communication circuitry of any electronic device or system to which the communication circuitry 38 of the customer mobile communication devices $16_1$-$16_J$ may transmit or otherwise relay the wireless broadcast signal(s).

In the embodiment illustrated in FIG. 5, the broadcast ranges $R_1$-$R_N$ are illustratively substantially equal to each other, and the wireless signal broadcasting devices $26_1$-$26_N$ are illustratively placed relative to each other such that the broadcast ranges $R_1$-$R_N$ of adjacent ones of the wireless signal broadcasting devices $26_1$-$26_N$ overlap as shown. The wireless signal broadcasting devices $26_1$-$26_N$ are further illustratively placed relative to the customer entry area 505 of the point-of-sale systems $24_1$-$24_N$ so that the broadcast ranges $R_1$-$R_N$ sufficiently cover the customer entry area 505 such that a customer mobile communication device 16 passing from any of the one or more merchandise areas of the brick-and-mortar store or outlet 500 through the customer entry area 505 to the customer checkout area 501 will detect wireless identification signals broadcast by at least one of the wireless signal broadcasting devices $26_1$-$26_N$. It will thus be understood that the number and arrangement of the wireless signal broadcasting devices $26_1$-$26_N$ as well as the orientations and broadcast ranges $R_1$-$R_N$ illustrated in FIG. 5 are provided only by way of example, and should not be considered to be limiting in any way. It will be further understood that this disclosure contemplates other arrangements which include more or fewer wireless signal broadcasting devices $26_1$-26N placed at more, fewer and/or different locations than that shown in FIG. 5, and in which any such wireless signal broadcasting devices are configured to broadcast wireless identification signals with the same or different broadcast orientations or patters and/or with the same or different broadcast ranges.

Further in the example illustrated in FIG. 5, several customers are shown in various locations within the brick-and-mortar store or outlet 500. For example, two customers 502 and 504 are shown in the customer checkout lane or queue $L_1$, in which the customer 502 is presently engaging in a purchase transaction with the point-of-sale system $24_1$ and the customer 504 is waiting in the checkout lane or queue $L_1$ for the purchase transaction of the customer 502 to conclude so that the customer 504 may likewise engage in a purchase transaction with the point-of-sale system $24_1$. Similarly, three customers 506, 508 and 510 occupy the customer checkout lane or queue $L_2$ with one customer 506 engaging in a purchase transaction with the point-of-sale system $24_2$, and with the customers 508 and 510 each waiting sequentially in the checkout lane or queue $L_2$ for their turn to check out, and a single customer 512 in the customer checkout lane or queue $L_N$ is presently engaging in a purchase transaction with the point-of-sale system $24_N$. As illustrated in FIG. 5, it can be appreciated that the checkout lanes or queues $L_1$-$L_N$ are not necessarily limited by the physical boundaries of the various customer checkout stations CHK1-CHKN, and the length of any checkout lane or queue $L_1$-$L_N$ may vary depending upon the number of customers occupying the lane or queue at any one time and, as illustrated by the checkout lane or queue $L_2$ in FIG. 5, may extend well into the customer entry area 505 of the brick-and-mortar store or outlet 500. In any case, another customer 514 in the example of FIG. 5 is shopping among the shelving units, and yet another customer 516 is shopping in the merchandise area 554. Still another customer 518 has completed shopping and has passed from the merchandise area of the brick-and-mortar store or outlet 500 into the customer entry area 505 in route to the customer checkout area 501. For purposes of this example, the customer 518 is a illustratively a customer-member of the EMS program and is carrying a mobile communication device 16 as illustrated in FIG. 5.

FIG. 5 further illustrates a communications framework for detecting by customer mobile communication devices $16_1$-$16_J$ of wireless signals produced by any of the plurality of wireless signal broadcasting devices $26_1$-$26_N$ and for conducting wireless communications relating thereto between the customer mobile communication devices $16_1$-$16_J$ and the main server 12 of the retail enterprise 11. As described hereinabove with respect to FIG. 1, each of the wireless communication devices $26_1$-$26_N$ is operable to broadcast one or more unique wireless identification signals. In some embodiments, the unique identification signals distinguish each particular wireless communication device 26 from others of the wireless communication devices $26_1$-$26_N$ located at the same brick-and-mortar store or outlet 500, and in other embodiments also from all others of the wireless communication devices $26_1$-$26_N$ within the retail enterprise 11. At some point, while the wireless communication devices $26_1$-$26_N$ are broadcasting one or more unique wireless signals, a customer carrying the customer's the mobile communication device 16 may approach a location at which at one or more of the wireless communication devices $26_1$-$26_N$ are positioned, such as illustrated in FIG. 5.

The customer's mobile electronic device 16 and the main server 12 are each illustratively configured to communicate wirelessly with each other via the public network 14 as shown. In some embodiments, the brick-and-mortar store or outlet 500 may illustratively implement one or more local or wide area networks for the purpose of providing or enhancing wireless communication access by customer mobile communication devices $16_1$-$16_J$ to the public network 14. In any case, as the mobile communication device 16 carried by the customer 518 enters the customer entry area 505 to the customer checkout area 501 as illustrated in FIG. 5, the customer's mobile communication device 16 is within the broadcast range of the wireless signal broadcasting device $26_N$, and when within the broadcast range of the wireless signal broadcasting device $26_N$, the customer's mobile communication device 16 is able to detect the unique identification signals being broadcast thereby. Illustratively, the broadcast ranges of the wireless signal broadcasting devices $26_1$-$26_N$ are sufficiently large, wide and/or oriented so as to be detectable by customers' mobile communication devices $16_1$-$16_J$ during normal entry of customers carrying their mobile communication devices $16_1$-$16_J$ into the customer entry area 505 of the customer checkout area 501 from any merchandise area of the brick-and-mortar store or outlet 500, while at the same time are sufficiently small, narrow and/or oriented so as to provide a desired amount or degree of resolution in determining the location of a customer's mobile communication device 16 relative to one or a subset of the wireless signal broadcasting devices $26_1$-$26_N$. In any case, the general communication framework illustrated in FIG. 5 is used in the process 600 illustrated and described below with reference to FIG. 6 for detecting by customer mobile communication devices $16_1$-$16_J$ of wireless identification signals broadcast by any of the plurality of wireless signal broadcasting devices $26_1$-$26_N$ and for conducting wireless communications between the customer mobile communication devices $16_1$-$16_J$ and the main server 12 of the retail enterprise Referring now to FIG. 6, a simplified flow diagram is shown depicting an embodiment of a process 600 for notifying customers of checkout lane or queue activity. As indicated by the framework of the process 600 illustrated in FIG. 6, a portion of the process 600, i.e., the portion to the left of the left-most vertical line and centered under the heading "MCD," illustratively represents one or more software applications executed by the processor 300 of a customer's mobile communication device 16, i.e., one of the mobile communication devices $16_1$-$16_J$ associated in the customer account data 404 with a customer member of the EMS program. In one embodiment, this portion of the process 600 is or includes the CQN application module 314 stored in the memory 304 (and/or data storage 306) of the customer's mobile communication device 16 (see FIG. 3A) in the form of instructions executable by the processor 300 of the customer's mobile communication device 16. The process steps of this portion of the process 600 will be described below for purposes of this disclosure as being executed by the processor 300 of the customer's mobile communication device 16. In the following description, a customer's mobile communication device 16 may be referred to as "MCD," and will be understood to refer generally to one of the mobile communication devices $16_1$-16J associated in the customer account data 404 with one of the customer members of the EMS program.

Figure 6:
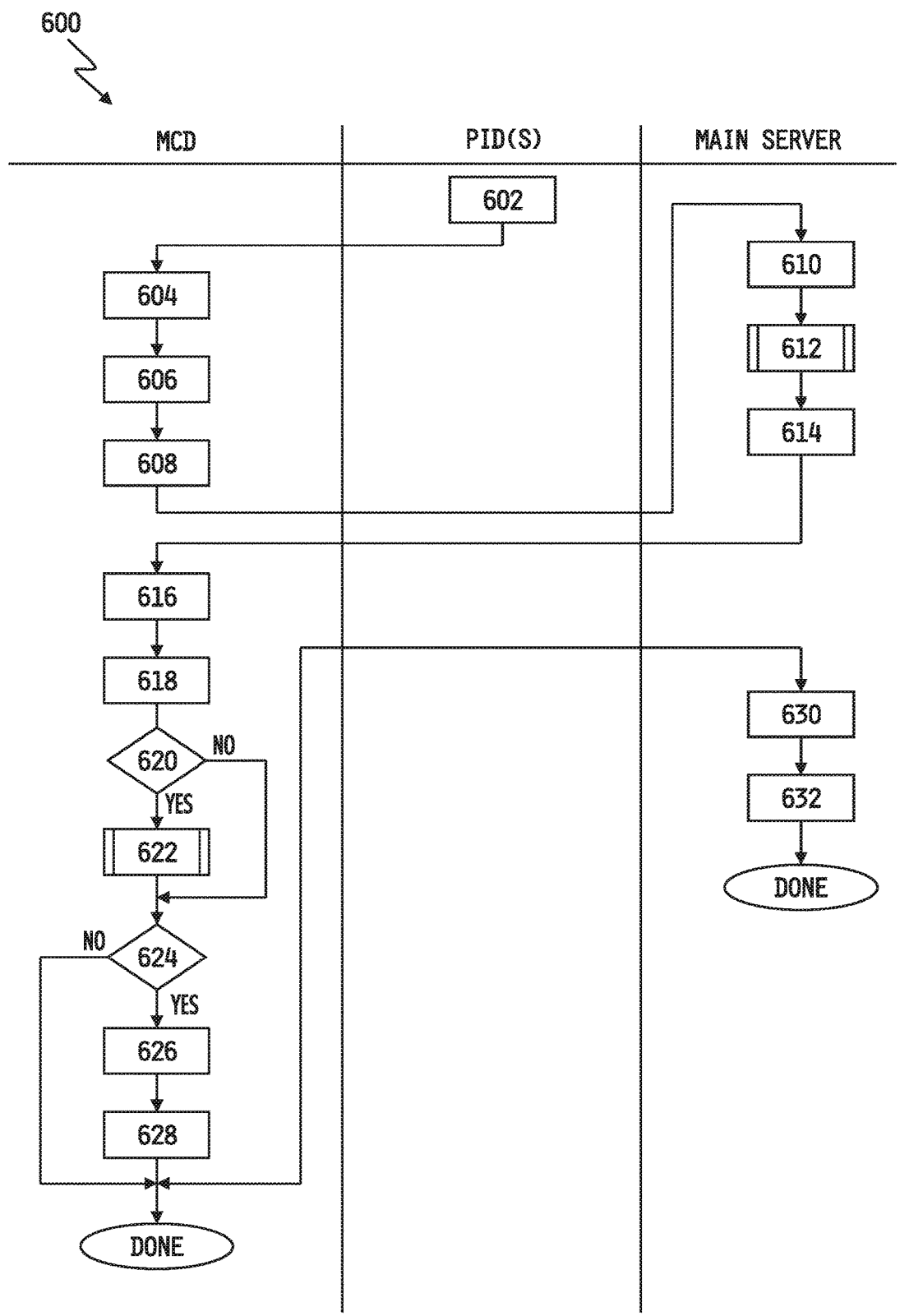
FIG. 6 is a simplified flow diagram of an embodiment of a process for notifying customers of checkout queue activity.

Another portion of the process 600, i.e., the portion between the left-most vertical line and the right-most vertical line in FIG. 6, and centered under the heading "Wireless signal broadcasting device(s)," does not necessarily represent a portion of the process 600 that is stored in a memory of any system or server in the form of instructions executable by a processor, but rather represents operation of the various wireless signal broadcasting devices $26_1$-$26_N$ illustrated and described with respect to FIGS. 1 and 5 as such operation relates to the broadcast of wireless signals as described hereinabove.

Yet another portion of the process 600, i.e., the portion to the right of the right-most vertical line in FIG. 6, and centered under the heading "Main Server," illustratively represents one or more software applications executed by the processor 50 of the main server 12. In one embodiment, this portion of the process 600 is or includes one or more of the CQN module 432, the checkout notification module 438, the POS traffic monitoring module 440, the all lanes busy module 442 and the VDC module 444, all stored in the CQN management module 430 (see FIG. 4) in the form of instructions executable by the processor 50 of the main server 12. The process steps of this portion of the process 600 will be described below for purposes of this disclosure as being executed by the processor 50 of the main server. In some alternate embodiments, e.g., that may or may not include a main server 12, this portion of the process 600 may alternatively be stored in the memory 34 (and/or data storage 36) of one or more of the local servers $22_1$-$22_L$ in the form of instructions executable by the processor 30 of the one or more local servers $22_1$-$22_L$, stored in the memory of one of the point-of-sale systems $24_1$-$24_M$, $24_1$-$24_N$ within one or more of the brick-and-mortar enterprise stores or outlets in the form of instructions executable by a processor 200 associated with any such point-of-sale system $24_1$-$24_M$, $24_1$-$24_N$, and/or stored in a memory and executable by a processor of another system external to or supplemental to the system 10 illustrated FIG. 1.

It will further be understood that portions of the process 600 illustrated as being executed by one processor/device or one processor/server or one processor/system may alternatively be executed by a different processor/device or processor/server or processor/system in the system 10, and/or by two or more such processors in any one or combination of such devices, servers and/or systems, some examples of which are described above.

In the process 600 illustrated in FIG. 6, item 602 identifies action taken by one or more of the plurality of wireless signal broadcasting devices $26_1$-$26_N$ positioned within, along, above and/or at least partially about the customer entry area, e.g., area 505, of the customer checkout area, e.g., area 501, of the brick-and-mortar store or outlet. In some embodiments, each of the plurality of wireless signal broadcasting devices $26_1$-$26_N$ operate to continuously or continually broadcast wireless identification signals, each of which carry decodable information in the form of a unique identification code (UID) as described hereinabove with respect to FIG. 1. In some embodiments, such signals may be periodically or non-periodically broadcast by the wireless signal broadcasting devices $26_1$-$26_N$, and in other embodiments some of the wireless signal broadcasting devices $26_1$-$26_N$ may periodically broadcast wireless signals and others of the wireless signal broadcasting devices $26_1$-$26_N$ may broadcast wireless signals non-periodically. In still other embodiments, one or more of the wireless signal broadcasting devices $26_1$-$26_N$ may sometimes periodically broadcast wireless signals and at other times broadcast wireless signals non-periodically. In any case in embodiments in which the wireless signal broadcasting devices $26_1$-$26_N$ continuously or continually broadcast wireless signals, the process advances to step 604 where the wireless communication circuitry 316 of the MCD 16 is operable to detect any such broadcast wireless signals within the broadcast range of which the MCD 16 is located as described above with respect to FIG. 5.

In some alternative embodiments, one or more of the wireless signal broadcasting devices $26_1$-$26_N$ may be selectively operable to periodically or non-periodically broadcast wireless identification signals. In such embodiments, one or more of the wireless signal broadcasting devices $26_1$-$26_N$ may, for example, be responsive to one or more control signals produced by the processor 50 of the main server, the processor 30 of one of the local hub servers $22_1$-$22_L$, a processor 200 associated with one or more of the point-of-sale systems $24_1$-$24_M$, $24_1$-$24_N$ located in the brick-and-mortar store or outlet and/or other processor(s) associated with the one or more devices $26_1$-$26_N$, to selectively wake up or otherwise activate and begin broadcasting wireless identification signals and to selectively deactivate and cease broadcasting wireless signals. In some embodiments, the brick-and-mortar store or outlet may include a plurality of conventional proximity or motion-detecting sensors, e.g., one or more such sensors at or near one or more of the wireless signal broadcasting devices $26_1$-$26_N$, and production of such control signals may be triggered by proximity or motion signals produced by such sensors. In other embodiments, production of such control signals may, for example, be triggered by the processor 50, e.g., in response to certain operating hours of one or more of the brick-and-mortar stores or outlets of the retail enterprise 11. Those skilled in the art will recognize that any modifications required to implement and integrate one or more steps of any such alternate embodiment into the process 600 would be a mechanical step for a skilled programmer, and that such alternate embodiments therefore fall within the scope of this disclosure.

As used hereinafter, the term "in-range" will be understood to refer to one or more of the wireless signal broadcasting devices $26_1$-$26_N$ within the broadcast range of which a customer's mobile communication device 16 is presently located. Thus, in the example illustrated in FIG. 5 the customer 518 is within the broadcast range of the wireless signal broadcasting device $26_N$ but not within the broadcast range of any others of the wireless signal broadcasting devices $26_1$-$26_N$, and in this example the wireless signal broadcasting device $26_N$ is an in-range wireless signal broadcasting device relative to the customer mobile communication device 16, but none of the others of the wireless signal broadcasting devices $26_1$-$26_N$ are in-range wireless signal broadcasting devices relative to the mobile communication device 16.

Referring again to FIG. 6, the processor 300 is responsive at step 604 to detect the unique identification signals wirelessly broadcast by any in-range ones of the plurality of wireless signal broadcasting devices $26_1$-$26_N$ at the time of execution of step 604. Following step 604, the process 600 advances to step 606 where the processor 600 of the customer's mobile communication device 16 is responsive to detection of wireless identification signals broadcast by any in-range wireless signal broadcasting devices $26_1$-$26_N$ to wake up and activate the CQN application 310 stored in the memory 304 or data storage 306 of the mobile communication device 16. Thereafter at step 608, the processor 300 is operable to transmit one or more wireless signals to the main server 12, e.g., to control the communication circuitry 316 in the device 16 to wirelessly transmit one or more signals to the main server 12 via the public network 14. The one or more wireless signals illustratively contain(s) the unique identification (UID) of each in-range wireless signal broadcasting device $26_1$-$26_N$, and also illustratively contain(s) an identification of the customer's mobile communication device 16. The identification of the customer's mobile communication device 16 may be, for example, the communication information (CI), e.g., cellular telephone number and/or other communication identifier, which identifies the customer's mobile communication device 16 to the main server 12 for the purpose of communicating information from the main server 12 back to the customer's mobile communication device 16.

In one embodiment, the processor 300 of the customer's mobile communication device 16 is operable at step 606 to process the wireless broadcast signal broadcast by each in-range wireless signal broadcasting device $26_1$-$26_N$ to determine therefrom the UID of each such in-range wireless signal broadcasting device $26_1$-$26_N$, and to include each such UID in the one or more wireless signals transmitted by the customer's mobile communication device 16 to the main server 12 at step 606. In other embodiments, the processor 300 may be operable at step 606 to process one or more of the wireless broadcast signals broadcast by in-range ones of the wireless signal broadcasting devices $26_1$-$26_N$ and detected by the customer's mobile communication device 16, and to include in the in the one or more wireless signals transmitted by the customer's mobile communication device 16 to the main server 12 at step 608 only the raw signal content of one or more of the wireless broadcast signals broadcast by in-range ones of the wireless signal broadcasting devices $26_1$-$26_N$. In such embodiments, the processor 50 of the main server 12 may be operable to thereafter process the raw signal content transmitted thereto by the customer's mobile communication device 16 to determine therefrom the UID of each corresponding in-range wireless signal broadcasting device $26_1$-$26_N$.

Following step 608, the main server 12 is operable at step 610 to receive the one or more wireless signals transmitted by the customer's mobile communication device 16 at step 608, and the processor 50 of the main server 12 is thereafter operable at step 612 to process the UIDs contained therein to determine the identities of each of the in-range ones of the wireless signal broadcasting devices $26_1$-$26_N$ whose wirelessly broadcast signals were detected by the customer's mobile communication device 16 at step 604, and to process the resulting wireless signal broadcasting device identity data to determine one or more of the location or identity of the brick-and-mortar store or outlet in which the detected wireless signal broadcasting device(s) $26_1$-$26_N$ is/are located, the type of wireless signal broadcasting device(s) detected, and the location of the customer's mobile communication device 16 within the identified brick-and-mortar location.

As described briefly above with respect to FIG. 4, the CQN module 432 illustratively has stored therein wireless signal broadcasting device identity information for each wireless signal broadcasting device $26_1$-$26_P$ in the retail enterprise 11 as well as additional information from which the processor 50 can determine, for each wireless signal broadcasting device $26_1$-$26_P$, the identity of the brick-and-mortar store or outlet at which each such wireless signal broadcasting device $26_1$-$26_P$ is located as well as the location or position of that wireless signal broadcasting device within the identified brick-and-mortar store or outlet. In one embodiment, for example, the wireless signal broadcasting device identity information stored in the CQN module 432 includes the UIDs for each of the wireless signal broadcasting devices $26_1$-$26_P$ in the retail enterprise, and each such UID includes or is associated with, e.g., linked to, mapped to, or otherwise identified in the CQN module 432 with, a brick-and-mortar store or outlet identifier (BMID), e.g., in the form of a designation number or code, which identifies the corresponding one of the brick-and-mortar enterprise stores or outlets in which the corresponding wireless signal broadcasting device is located, and further includes or is associated in the CQN module 432 with, e.g., linked to, mapped to, or otherwise identified with, a wireless signal broadcasting device location identifier (BID), e.g., in the form of a designation number or code, which identifies the location of the corresponding wireless signal broadcasting device within the brick-and-mortar enterprise store or outlet identified by BMID. In some embodiments, each UID is further associated CQN module 432 with, e.g., linked to, mapped to or otherwise identified with, a wireless signal broadcasting device type identifier (BT), e.g., in the form of a designation code or other identifier which identifies the type of the corresponding wireless signal broadcasting device. In some embodiments, the brick-and-mortar location identifiers, BMID, are illustratively stored in the form of store or outlet numbers or codes, such as store 10 or outlet JS-3. In other embodiments, the brick-and-mortar location identifiers may include additional information such as city, state or country identifier or the like. The wireless signal broadcasting device type identifiers, BT, in embodiments which include wireless signal broadcasting device type identifiers, are illustratively stored in the form of wireless signal broadcasting device identity codes, such as POS for point-of-sale wireless signal broadcasting devices, CE wireless signal broadcasting devices for those wireless signal broadcasting devices $26_1$-$26_N$ located in the customer entry area 505, SE wireless signal broadcasting devices for wireless signal broadcasting devices located at a store entrance, and the like.

In some embodiments, the wireless signal broadcasting device location identifiers, BID, are illustratively stored in the form of location coordinates relative to a base or reference set of coordinates. In some alternate embodiments, the wireless signal broadcasting device location identifiers, BID, may be stored in the form of one or more location codes identifying one or more of an aisle, shelf, section, merchandise area, customer entry area, point-of-sale system and/or other identifier which identifies a particular location within a corresponding one of the plurality of brick-and-mortar stores or outlets. For example, one particular BID may include two location codes CE, 1 which identify the location of the corresponding wireless signal broadcasting device $26_1$ to be customer entry area 505, checkout station CHK1. Other techniques for storing and/or processing wireless signal broadcasting device identity information to determine the relative or precise location of any of the wireless signal broadcasting devices $26_1$-$26_P$ within any of the brick-and-mortar enterprise stores or outlets will occur to those skilled in the art, and it will be understood that any such other techniques are contemplated by this disclosure.

In any of the foregoing embodiments, the processor 50 is illustratively operable at step 610 to process each UID by searching for a matching UID stored in the CQN module 432, identifying the BMID associated in the CQN module 432 or other database with the matched UID and determining from the identified BMID the identity of the corresponding one of the brick-and-mortar enterprise stores or outlets at which the corresponding wireless signal broadcasting device 26 is located. The processor 50 is further illustratively operable at step 610 to identify the BID associated in the CQN module 432 or other database with the matched UID and determining from the identified BID the location of the corresponding wireless signal broadcasting device 26 within the one of the brick-and-mortar enterprise stores or outlets identified by BMID.

The processor 50 is further illustratively operable at step 610 to process the identified brick-and-mortar store or outlet and the wireless signal broadcasting device location information for each UID received at step 612 from the customer's mobile communication device 16 to determine, e.g., estimate, the location of the customer's mobile communication device 16 relative to one or more reference locations within the identified brick-and-mortar store or outlet. The identity of the brick-and-mortar store or outlet is determined from the BMID values associated with each received UID, and the locations of each wireless signal broadcasting device $26_1$-$26_N$ from which a UID was received are determined from the BID values associated with each received UID, and the customer's location can therefore be estimated within the identified brick-and-mortar store or outlet based on the locations of the various wireless signal broadcasting devices $26_1$-$26_N$ from which a UID was received. Thus, in the example illustrated in FIG. 5, a UID would be received only from the wireless signal broadcasting device $26_N$ because the wireless signal broadcasting device $26_B$ is the only in-range ones of the wireless signal broadcasting devices $26_1$-$26_N$ relative to the mobile communication device 16 associated with the customer 518. Accordingly, the processor 50 may be operable at step 610 to estimate the location of the customer 518 to be near the customer checkout station CHKN in the customer entry area 505 of the brick-and-mortar store or outlet 500.

In some embodiments, the processor 50 may be further operable at step 610 to determine the identity of the customer, e.g., the identity of the customer 518, e.g., by processing the communication information (CI) received at step 608, searching the customer account data 404 for a matching CI and identifying the EMSID associated therewith in the customer account data 404. Further illustratively, the processor 50 may be operable at step 610 to determine further information, e.g., name, etc., about the customer via customer identification information associated in the customer account data 404 with the CI and/or EMSID. In some alternative embodiments, the processor 300 of the customer's mobile communication device 16 may, at step 608, wirelessly transmit the customer's EMSID or other customer identifier in addition to or in place of the communication information, CI. In such embodiments, the processor 50 may be operable at step 610 to compare the wirelessly received EMSID or other customer identifier with corresponding information stored in the customer account data 404 to determine the customer's CI and/or further information relating to the identity of the corresponding customer.

Execution of step 610 identifies a customer, e.g., a customer-member of the EMS program, that is carrying an identified mobile communication device 16 located in the customer entry area 505 of, and to, a customer checkout area 501 of an identified brick-and-mortar store or outlet of the retail enterprise 11, and further identifies a location of the customer's mobile communication device 16 relative to one or more of the wireless signal broadcasting devices $26_1$-$26_N$, relative to one or more of the customer checkout stations CHK1-CHKN, relative to one or more of the point-of-sale systems $24_1$-$24_N$ and/or relative to one or more other structures or locations within the brick-and-mortar store or outlet (see, e.g., FIG. 5). The process 600 advances from step 610 to step 612 where the processor 50 is then operable to execute a checkout notification process in which the processor 50 is operable to determine customer notification information (CNI) relating to the availability of one or more of the customer checkout stations CHK1-CHKN, at which corresponding ones of the point-of-sale system $24_1$-$24_M$, $24_1$-$24_N$ are located, to process a purchase transaction, i.e., a transaction for the purchase by the customer of one or more items selected for purchase by the customer from the identified brick-and-mortar outlet of the retail enterprise 11. Following execution of step 612, the processor 50 is operable at step 614 to wirelessly transmit the CNI to the customer's mobile communication device 16, and the customer's mobile communication device 16 is thereafter operable to receive the wirelessly transmitted CNI at step 616 and to process the wirelessly transmitted CNI at step 618 and control the display 322 of the mobile communication device 16 to display the CNI to the customer as will be described in greater detail hereinafter following a description of various embodiments of the checkout notification process executed by the processor 50 of the main server 12.

Figure 7A:
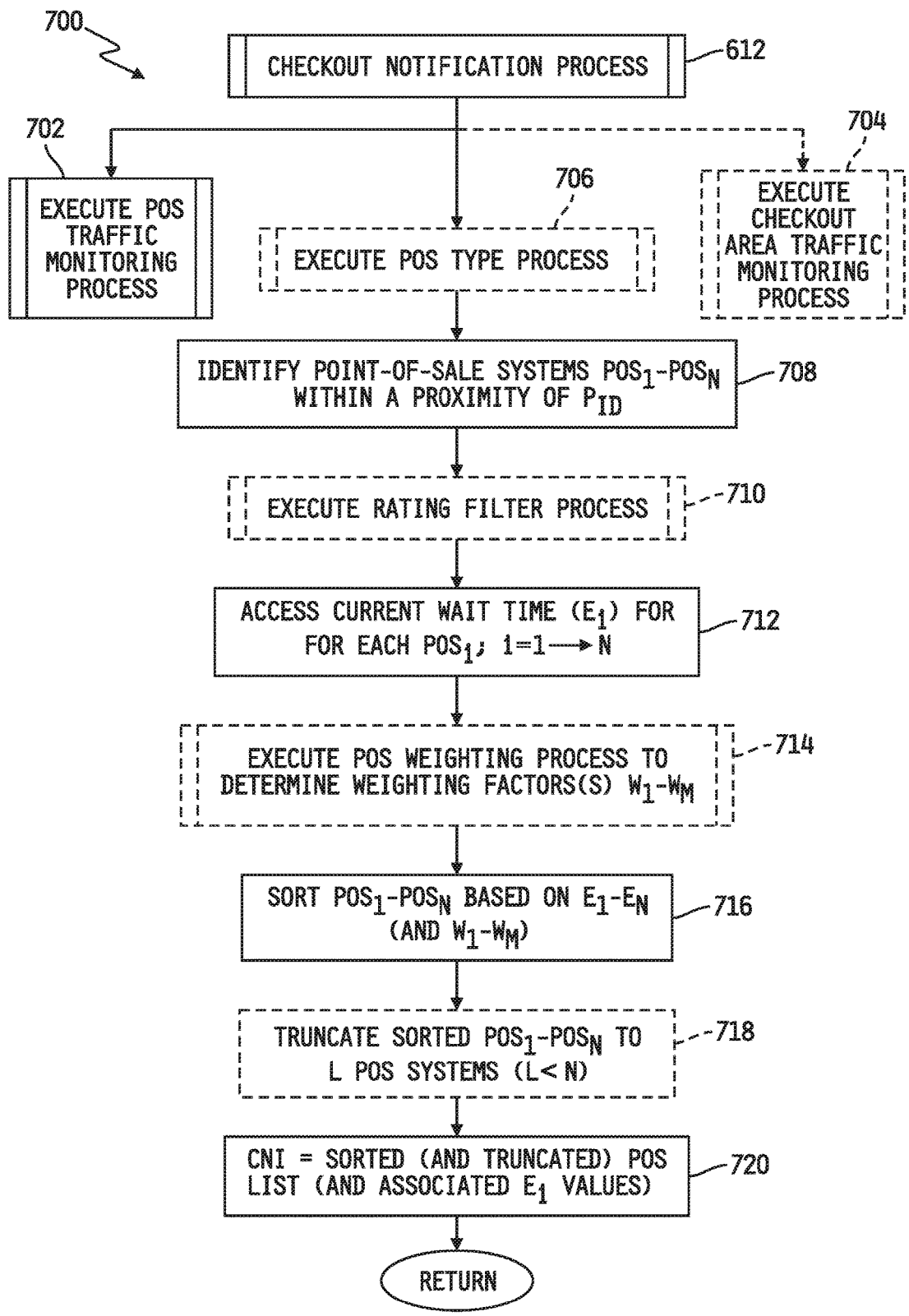
FIG. 7A is a simplified flow diagram of an embodiment of the checkout notification process illustrated in the flow diagram of FIG. 6.

Referring now to FIG. 7A, a simplified flow diagram is shown of an embodiment 700 of the checkout notification process executed by the processor 50 of the main server 12 at step 612 of the process 600. In one embodiment, the process 700 is illustratively stored in the checkout notification module 432 of the CQN management module 430 in the form of instructions executable by the processor 50 of the main server 12, and the steps of the process 700 will be described below for purposes of this disclosure as being executed by the processor 50 of the main server. In some alternate embodiments, e.g., that may or may not include a main server 12, the process 700 may alternatively be stored in the memory 34 (and/or data storage 36) of one or more of the local servers $22_1$-$22_L$ in the form of instructions executable by the processor 30 of the one or more local servers $22_1$-$22_L$, stored in the memory of one of the point-of-sale systems $24_1$-$24_M$, $24_1$-$24_N$ within one or more of the brick-and-mortar enterprise stores or outlets in the form of instructions executable by a processor 200 associated with any such point-of-sale system $24_1$-$24_M$, $24_1$-$24_N$, and/or stored in a memory and executable by a processor of another system external to or supplemental to the system 10 illustrated FIG. 1. It will further be understood that the process 700 illustrated and described as being executed by one processor/device or one processor/server or one processor/system may alternatively be executed by a different processor/device or processor/server or processor/system in the system 10, and/or by two or more such processors in any one or combination of such devices, servers and/or systems, some examples of which are described above.

In some embodiments, the checkout notification process 700 may include step 706, and step 706 is illustrated in FIG. 7A in dashed line representation to indicate that step 706 is optional in some embodiments. In embodiments which include step 706, the processor 50 is operable to execute a POS type preference process. Example processes for executing the POS type preferences process of step 706 are illustrated in FIGS. 10A-10D and will be described in detail below.

In embodiments which do not include step 706, the process 700 begins at step 708 where the processor 50 is operable to identify one or more of the point-of-sale systems $24_1$-$24_M$, $24_1$-$24_N$ within a predefined proximity of the in-range wireless signal broadcasting device or wireless signal broadcasting devices, $B_{ID}$, detected by the customer's mobile communication device 16 at step 604 of the process 600, e.g., the point-of-sale systems $24_1$-$24_N$ located in the customer checkout area 501 of the identified brick-and-mortar store or outlet 500 illustrated in FIG. 5. Illustratively, the processor 50 is operable in one embodiment to execute step 708 by identifying the one or more point-of-sale systems $24_1$-$24_M$, $24_1$-$24_N$ located in the customer checkout area 501 of the brick-and-mortar store or outlet identified at step 610 of the process 600. In some alternative embodiments, the processor 50 is operable to execute step 708 by identifying the one or more point-of-sale systems $24_1$-$24_M$, $24_1$-$24_N$ that are located within a predefined distance of, or are associated in at least one database with, the one or more in-range wireless signal broadcasting devices $26_1$-$26_N$ from which UIDs were received by the customer's mobile communication device 16 and wirelessly transmitted to the main server 12 at step 608 of the process 600. In still other alternative embodiments, the processor 50 is operable to execute step 704 by identifying the one or more point-of-sale systems $24_1$-$24_M$, $24_1$-$24_N$ located in a customer checkout area 501 associated in at least one database with at least one of the one or more in-range wireless signal broadcasting devices $26_1$-$26_N$ from which UIDs were received by the customer's mobile communication device 16 and wirelessly transmitted to the main server 12 at step 608 of the process 600. Those skilled in the art will recognize other techniques for identifying one or more of the point-of-sale systems $24_1$-$24_M$, $24_1$-$24_N$ within a predefined proximity of, or otherwise associated with, the one or more in-range wireless signal broadcasting device or wireless signal broadcasting devices, $B_{ID}$, detected by the customer's mobile communication device 16 at step 604 of the process 600, and such other techniques are intended to fall within the scope of this disclosure.

Figure 8:
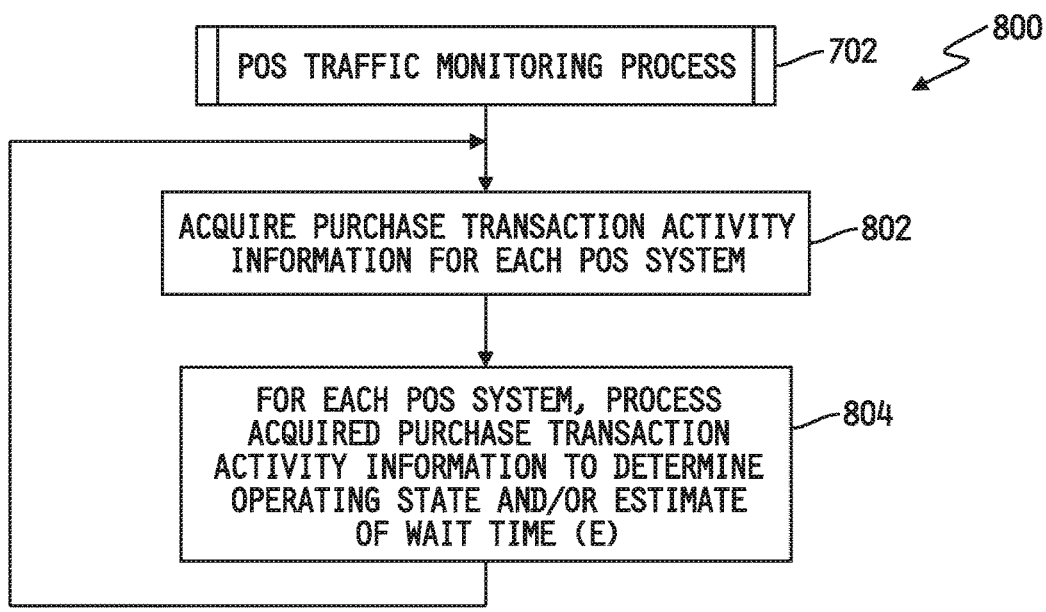
FIG. 8 is a simplified flow diagram of an embodiment of the point-of-sale traffic monitoring process illustrated in the flow diagrams of FIGS. 7A-7C.

Illustratively, the processor 50 is operable to continually or periodically execute a point-of-sale traffic monitoring process 702 in parallel with the process 700, in which the processor 50 is operable to continually or periodically determine the present purchase transaction activity and/or customer traffic at each of the point-of-sale systems $24_1$-$24_M$, $24_1$-$24_N$ in the retail enterprise 11 generally, and as it relates to the brick-and-mortar outlet identified at step 610 of the process 600, at each of the point-of-sale systems, e.g., $24_1$-$24_N$, identified at step 704 of the process 700, and to determine an operational state and/or to estimate a wait time, E, for each such point-of-sale system $24_1$-$24_N$. An embodiment of the point-of-sale traffic monitoring process executed by the processor 50 at step 702 is illustrated in FIG. 8 and will be described in detail hereinafter. As will be described in detail with respect to the process illustrated in FIG. 8, the "wait time" for any of the point-of-sale systems $24_1$-$24_N$ is generally an estimate of an amount of elapsed time between the most recent execution of the process executed at step 702 and subsequent (or current) availability of the point-of-sale system to process a purchase transaction, i.e., a transaction for the purchase by the customer of one or more items selected for purchase by the customer from the identified brick-and-mortar outlet of the retail enterprise 11.

Figure 9:
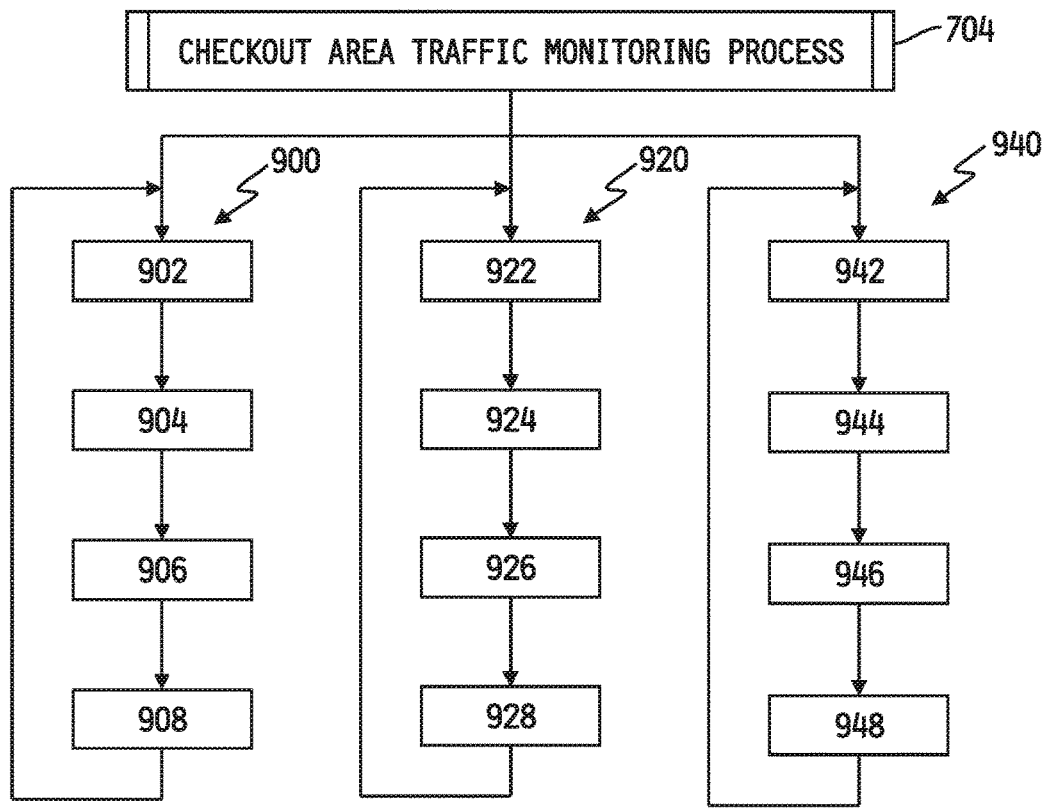
FIG. 9 is a simplified flow diagram of an embodiment of the checkout area traffic monitoring process illustrated in the flow diagrams of FIGS. 7A-7C.

In some embodiments, the processor 50 is operable to continually or periodically execute a checkout area traffic monitoring process 704 in parallel with the process 700, in which the processor 50 is operable to continually or periodically determine the present traffic into and out of the checkout area of the store, e.g., the are 505 illustrated in FIG. 5. An embodiment of the point-of-sale traffic monitoring process executed by the processor 50 at step 704, in embodiments which include step 704, is illustrated in FIG. 9 and will be described in detail hereinafter. Some embodiments may not include step 704, and step 704 is therefore illustrated in FIG. 7A with dashed-line representation to indicate that this step may be optional in some embodiments.

Figure 11:
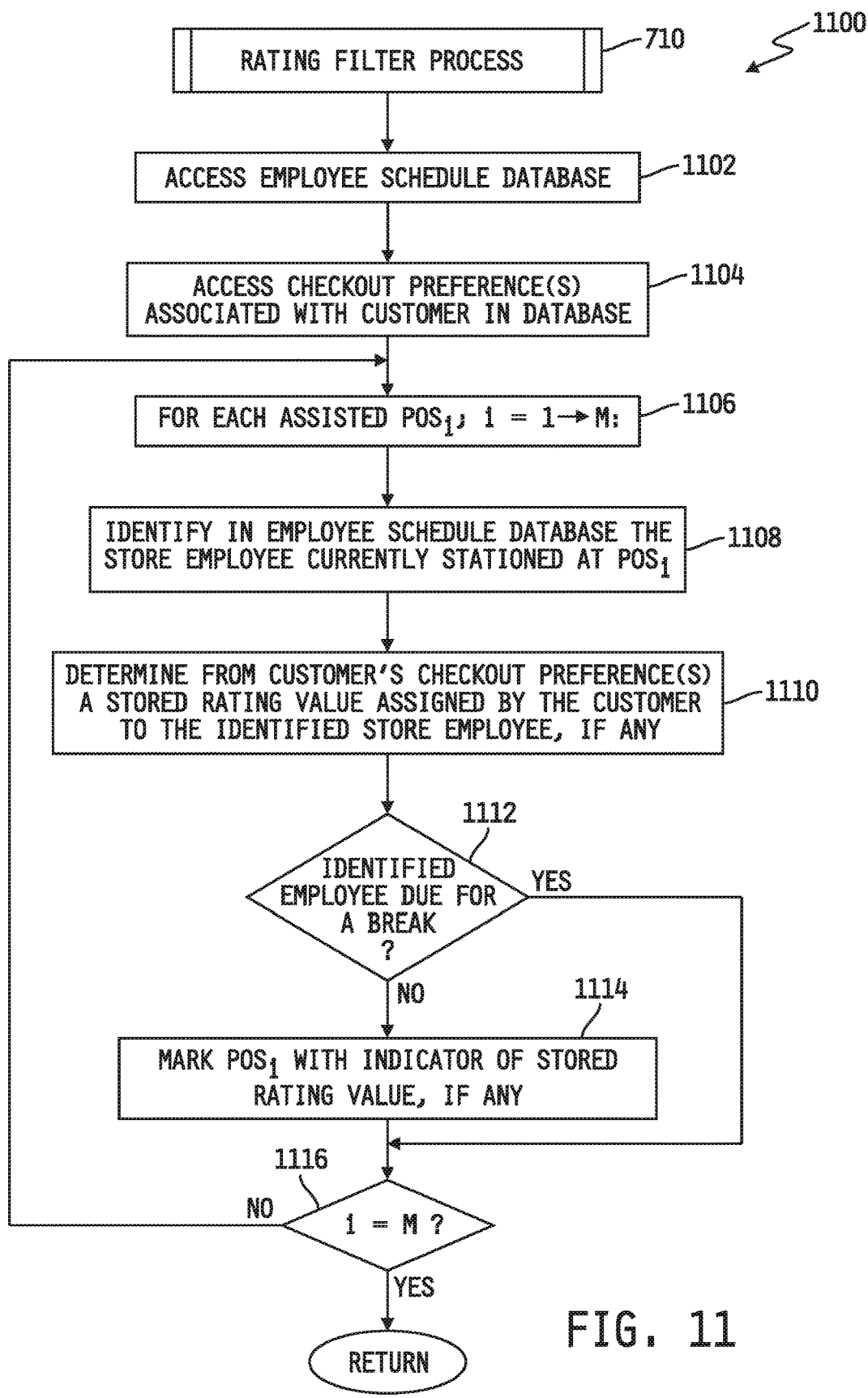
FIG. 11 is a simplified flow diagram of an embodiment of the rating filter process illustrated in the flow diagrams of FIGS. 7A-7C.

Following execution of step 708, the processor 50 is operable, in some embodiments, at step 710 to execute a rating filter process in which the processor 50 is operable to determine, based on customer preferences stored in the customer checkout preference/history database 414, rating values for one or more POS operators currently working at a POS system 24. An embodiment of the rating filter process executed by the processor 50 at step 710, in embodiments which include step 710, is illustrated in FIG. 11 and will be described in detail hereinafter. Some embodiments may not include step 710, and step 710 is therefore illustrated in FIG. 7A with dashed-line representation to indicate that this step may be optional in some embodiments.

In embodiments that include step 710, the process 700 advances from step 710 to step 712 and in embodiments which do not include step 710 the process 700 advances from step 708 to step 712. In any case, at step 712, the processor 50 is operable to access current wait time information, E, for each identified point-of-sale system $24_1$-$24_N$, wherein such current wait time information, E, is illustratively determined and/or estimated by the processor 50 in the point-of-sale traffic monitoring process executed at step 702.

Figure 12:
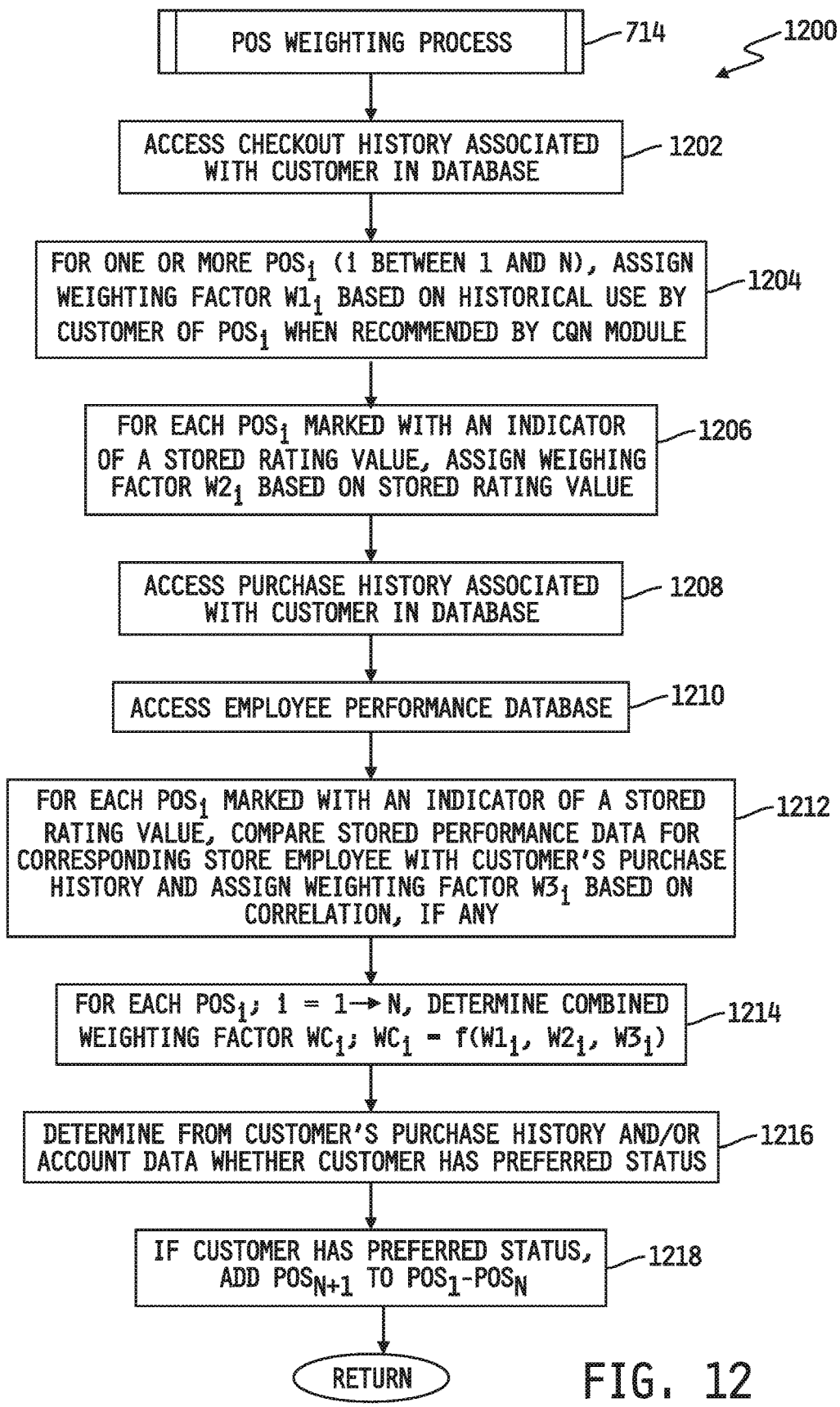
FIG. 12 is a simplified flow diagram of an embodiment of the POS weighting process illustrated in the flow diagrams of FIGS. 7A-7C.

Following execution of step 712, the processor 50 is operable, in some embodiments, at step 714 to execute a POS weighting process in which the processor 50 is operable to determine, based on customer preferences and/or history stored in the customer checkout preference/history database 414, weighting values for one or more POS systems 24, and the processor 50 may be operable in some embodiments to base one or more checkout lane recommendations thereon. An embodiment of the POS weighting process executed by the processor 50 at step 714, in embodiments which include step 714, is illustrated in FIG. 12 and will be described in detail hereinafter. Some embodiments may not include step 714, and step 714 is therefore illustrated in FIG. 7A with dashed-line representation to indicate that this step may be optional in some embodiments.

In embodiments that include step 714, the process 700 advances from step 714 to step 716 and in embodiments which do not include step 714 the process 700 advances from step 702 to step 716. In any case, the processor 50 is operable at step 716 to sort $POS_1$-$POS_N$ by estimated wait time. In one embodiment, the processor 50 is operable to sort the subsets of the point-of-sale systems $24_1$-$24_N$ in ascending order of wait time, e.g., such that the subset with the smallest or least amount of wait time is first and the subset with the largest or greatest amount of wait time is last. In other embodiments, the processor 50 may be alternatively operable to sort the subsets in descending order wait time. In alternate embodiments, the processor 50 may be operable to execute step 714 in accordance with one or more other conventional sorting techniques. In some embodiments, the processor 50 may be operable at step 716 to sort the list of POS systems 24 alternatively or additionally based on rating values determined in accordance with the rating process illustrated in FIG. 11. In some embodiments, the processor 50 may be operable to additionally or alternatively operable at step 716 to sort the list of POS systems 24 based on weighting factors determined in accordance with the weighting process illustrated in FIG. 12.

In some embodiments, the process 700 the process 700 may include a step 718 to which the process 700 advances from step 716. In embodiments which include step 718, the processor 50 is operable to truncate the sorted POS list to some number L, which is less than N, and wherein L may be any positive integer that is less than N. Some embodiments may not include step 718, and step 718 is therefore illustrated in FIG. 7A with dashed-line representation to indicate that this step may be optional in some embodiments. In embodiments which include step 718, the process 700 advances from step 718 to step 720, and in embodiments which do not include step 718 the process 700 advances from step 716 to step 720. In any case, the processor 50 is illustratively operable at step 720 to identify as the customer notification information, CN I, the sorted, and in some embodiments truncated, list of POS systems. Alternatively or additionally, the CNI may be or include the wait time values $E_i$ for each POS system or a subset thereof. Thereafter the process 700 returns to step 612 of the process 600.

Figure 7B:
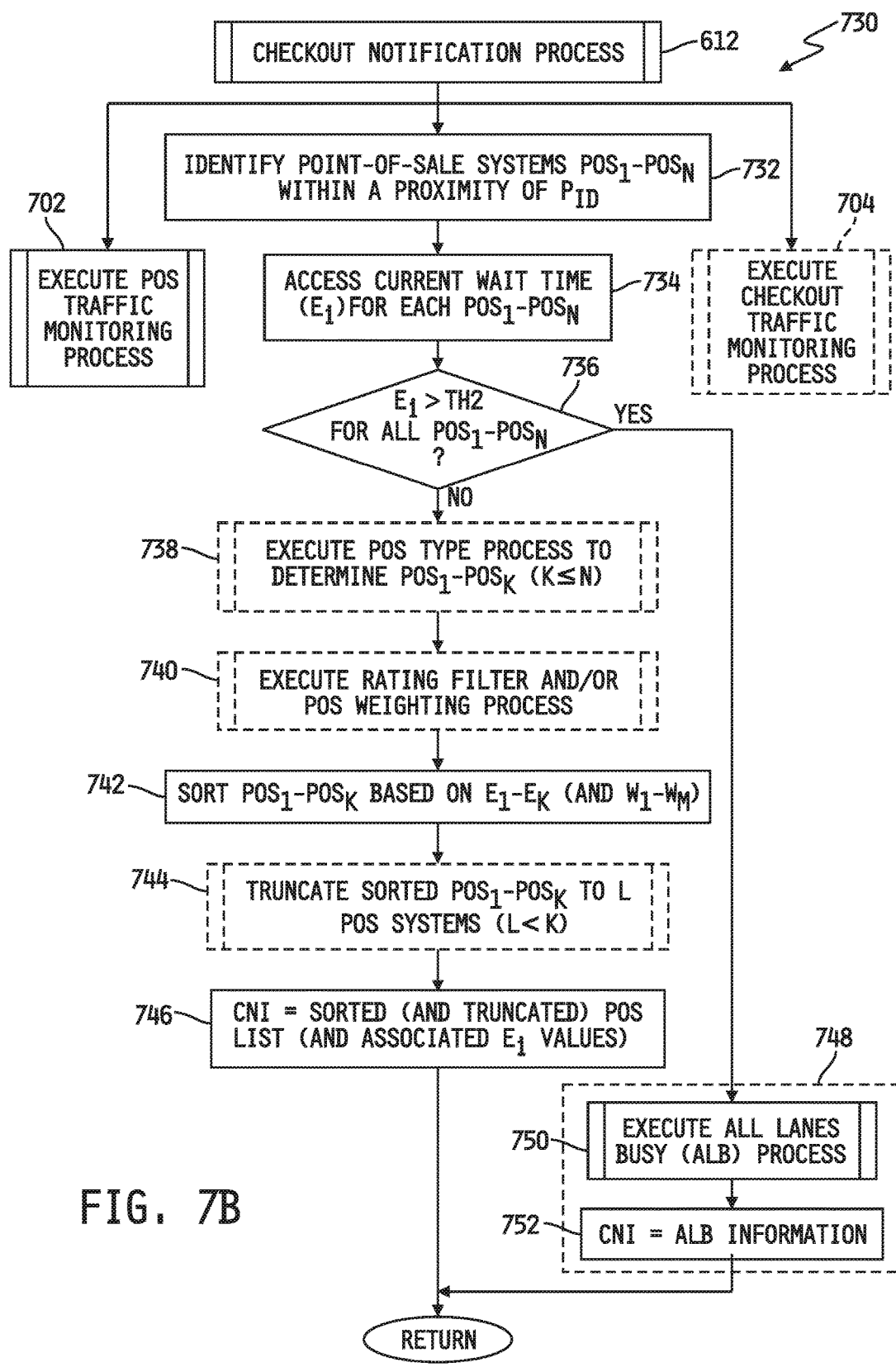
FIG. 7B is a simplified flow diagram of another embodiment of the checkout notification process illustrated in the flow diagram of FIG. 6.

Referring now to FIG. 7B, a simplified flow diagram is shown of another embodiment 730 of the checkout notification process executed by the processor 50 of the main server 12 at step 612 of the process 600. In one embodiment, the process 730 is illustratively stored in the checkout notification module 432 of the CQN management module 430 in the form of instructions executable by the processor 50 of the main server 12, and the steps of the process 730 will be described below for purposes of this disclosure as being executed by the processor 50 of the main server. In some alternate embodiments, e.g., that may or may not include a main server 12, the process 700 may alternatively be stored in the memory 34 (and/or data storage 36) of one or more of the local servers $22_1$-$22_L$ in the form of instructions executable by the processor 30 of the one or more local servers $22_1$-$22_L$, stored in the memory of one of the point-of-sale systems $24_1$-$24_M$, $24_1$-$24_N$ within one or more of the brick-and-mortar enterprise stores or outlets in the form of instructions executable by a processor 200 associated with any such point-of-sale system $24_1$-$24_M$, $24_1$-$24_N$, and/or stored in a memory and executable by a processor of another system external to or supplemental to the system 10 illustrated FIG. 1. It will further be understood that the process 730 illustrated and described as being executed by one processor/device or one processor/server or one processor/system may alternatively be executed by a different processor/device or processor/server or processor/system in the system 10, and/or by two or more such processors in any one or combination of such devices, servers and/or systems, some examples of which are described above.

In the embodiment illustrated in FIG. 7B, the checkout notification process 730 is similar in many respects to the process 700 illustrated and described with respect to FIG. 7A. Many of the steps of the process 730 will thus be self-evident as similar or identical to corresponding steps of the process 700 described in detail above, as will be some of the optional steps illustrated with dashed-line representation. The process 730 includes two additional steps of note; namely, steps 736 and 748. At step 736, the processor 50 is illustratively operable to determine whether the wait times, $E_i$, for all of the POS systems $24_1$-$24_N$ are all greater than a threshold value, TH2, where TH2 is illustratively a time period beyond which the processor 50 will recommend any checkout lanes to which a customer should proceed and wait for checkout. In such embodiments, the process 730 illustratively includes an optional step 748, and in embodiments which include step 748 the processor 50 is operable at step 750 to execute an "all lanes busy" process, and to thereafter identify the CNI as "all lanes busy" (ALB) information produced in accordance with the all lanes busy process. Embodiments of the all lanes busy process are illustrated in FIGS. 13A-13D and will be described in detail hereinafter.

Figure 7C:
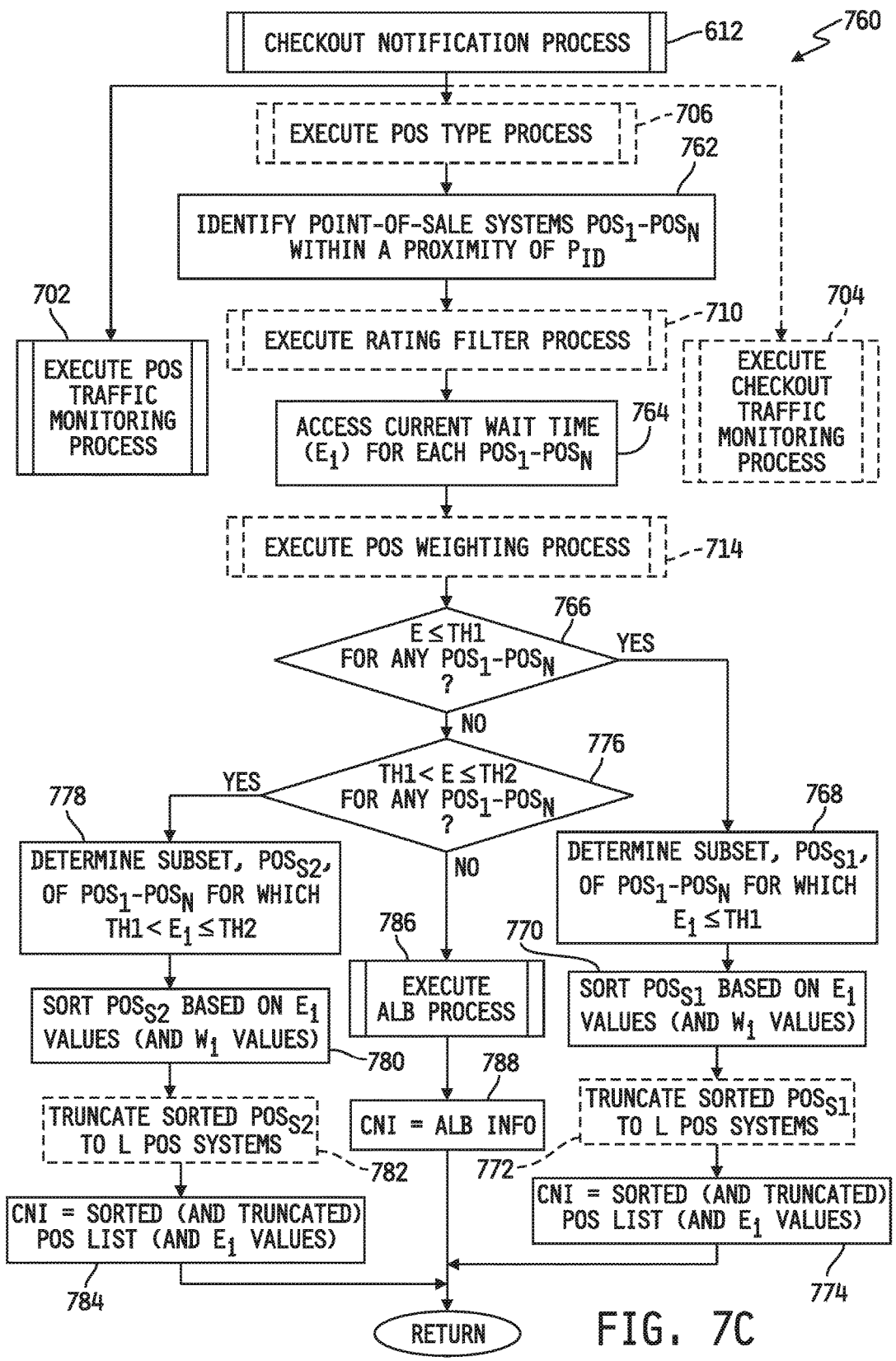
FIG. 7C is a simplified flow diagram of yet another embodiment of the checkout notification process illustrated in the flow diagram of FIG. 6.

Referring now to FIG. 7C, a simplified flow diagram is shown of yet another embodiment 760 of the checkout notification process executed by the processor 50 of the main server 12 at step 612 of the process 600. In one embodiment, the process 760 is illustratively stored in the checkout notification module 432 of the CQN management module 430 in the form of instructions executable by the processor 50 of the main server 12, and the steps of the process 760 will be described below for purposes of this disclosure as being executed by the processor 50 of the main server. In some alternate embodiments, e.g., that may or may not include a main server 12, the process 700 may alternatively be stored in the memory 34 (and/or data storage 36) of one or more of the local servers $22_1$-$22_L$ in the form of instructions executable by the processor 30 of the one or more local servers $22_1$-$22_L$, stored in the memory of one of the point-of-sale systems $24_1$-$24_M$, $24_1$-$24_N$ within one or more of the brick-and-mortar enterprise stores or outlets in the form of instructions executable by a processor 200 associated with any such point-of-sale system $24_1$-$24_M$, $24_1$-$24_N$, and/or stored in a memory and executable by a processor of another system external to or supplemental to the system 10 illustrated FIG. 1. It will further be understood that the process 760 illustrated and described as being executed by one processor/device or one processor/server or one processor/system may alternatively be executed by a different processor/device or processor/server or processor/system in the system 10, and/or by two or more such processors in any one or combination of such devices, servers and/or systems, some examples of which are described above.

In the embodiment illustrated in FIG. 7C, the checkout notification process 760 is similar in many respects to the process 700 illustrated and described with respect to FIG. 7A and to the process 730 illustrated in FIG. 7B. Many of the steps of the process 760 will thus be self-evident as similar or identical to corresponding steps of the process 700 and/or of the process 730 described in detail above, as will be some of the optional steps illustrated with dashed-line representation. The process 760 includes some additional steps which require determinations of subsets of the POS systems $24_1$-$24_N$ based on the wait time threshold TH2 described above and/or on a wait time threshold TH1 which may be an arbitrary time period that is less than TH2.

Referring now to FIG. 8, a simplified flow diagram is shown of an embodiment 800 of the point-of-sale traffic monitoring process executed by the processor 50 of the main server 12 at step 702 of the process 700 (and of the processes 730 and 760 to be described below with respect to FIGS. 7B and 7C respectively). In one embodiment, the process 800 is illustratively stored in the POS traffic monitoring module 440 of the CQN management module 430 in the form of instructions executable by the processor 50 of the main server 12, and the steps of the process 800 will be described below for purposes of this disclosure as being executed by the processor 50 of the main server. In some alternate embodiments, e.g., that may or may not include a main server 12, the process 800 may alternatively be stored in the memory 34 (and/or data storage 36) of one or more of the local servers $22_1$-$22_L$ in the form of instructions executable by the processor 30 of the one or more local servers $22_1$-$22_L$, stored in the memory of one of the point-of-sale systems $24_1$-$24_M$, $24_1$-$24_N$ within one or more of the brick-and-mortar enterprise stores or outlets in the form of instructions executable by a processor 200 associated with any such point-of-sale system $24_1$-$24_M$, $24_1$-$24_N$, and/or stored in a memory and executable by a processor of another system external to or supplemental to the system 10 illustrated FIG. 1. It will further be understood that the process 800 illustrated and described as being executed by one processor/device or one processor/server or one processor/system may alternatively be executed by a different processor/device or processor/server or processor/system in the system 10, and/or by two or more such processors in any one or combination of such devices, servers and/or systems, some examples of which are described above.

The process 800 begins at step 802 where the processor 50 is illustratively operable to acquire purchase transaction activity information for each of the point-of-sale systems $24_1$-$24_M$, $24_1$-$24_N$ in the retail establishment 11. In one embodiment, the processor 50 is illustratively operable to execute step 802 by acquiring customer traffic information for each of the point-of-sale systems $24_1$-$24_M$, $24_1$-$24_N$ in the retail enterprise 11. As shown in the embodiment illustrated in FIG. 1, and also in the example implementation illustrated in FIG. 5, the processor 50 is illustratively operable in such embodiments to acquire the customer traffic information by monitoring the customer traffic signals produced by one or more customer traffic sensors 222 associated with, e.g., located at or near, each of the point-of-sale systems $24_1$-$24_M$, $24_1$-$24_N$. Alternatively or additionally, the processor 50 may be operable at step 802 to acquire purchase transaction activity information for each of the point-of-sale systems $24_1$-$24_M$, $24_1$-$24_N$ by monitoring the purchase transaction state or status of each of the point-of-sale systems $24_1$-$24_M$, $24_1$-$24_N$, e.g., via the transaction module 424 illustrated and described with respect to FIG. 4. As described with respect to FIG. 4, the transaction module 424 is illustratively configured to oversee and monitor purchase transactions conducted by customers at any of the point-of-sale systems $24_1$-$24_M$, $24_1$-$24_N$, and some such embodiments the processor 50 is configured to determine an operating state or status of each such point-of-sale system $24_1$-$24_M$, $24_1$-$24_N$ as one of presently processing a purchase transaction for a customer or presently inactive.

The process 800 advances from step 802 to step 804 where the processor 50 is illustratively operable to process the acquired purchase transaction activity information for each point-of-sale system $24_1$-$24_M$, $24_1$-$24_N$ to determine an operating state thereof and/or an estimated wait time therefor. In embodiments in which the processor 50 is operable to acquire purchase transaction activity at step 802 by acquiring customer traffic information for each of the point-of-sale systems $24_1$-$24_M$, $24_1$-$24_N$, the processor 50 is illustratively operable to estimate a wait time for each point of sale system $24_1$-$24_M$, $24_1$-$24_N$ based on the customer traffic signal(s) produced by the customer traffic sensor(s) associated therewith. In one embodiment, the processor 50 is illustratively operable to estimate the wait time for any of the point-of-sale systems $24_1$-$24_M$, $24_1$-$24_N$ by determining from the corresponding customer traffic signal(s) the total number of customers occupying the customer checkout lane $L_1$-$L_N$ of the customer checkout stations CHK1-CHKN associated with the point-of-sale system and then estimating the wait time as time duration between the present time, i.e., the time of execution of step 804, and a typical or average time required to process the purchase transactions for each customer occupying the associated customer checkout lane $L_1$-$L_N$.

In embodiments in which the processor 50 is operable to acquire purchase transaction activity at step 802 by monitoring the purchase transaction state or status of each of the point-of-sale systems $24_1$-$24_M$, $24_1$-$24_N$, the processor 50 is illustratively operable to determine the operating state or status of each such point-of-sale system $24_1$-$24_M$, $24_1$-$24_N$ as presently processing a purchase transaction or presently inactive. In some embodiments, the processor 50 is operable to determine an estimated wait time and an operating state of each of the point of sale systems $24_1$-$24_M$, $24_1$-$24_N$. In some embodiments of step 804 of the process 800, the processor 50 is illustratively operable to include the operating states of the point-of-sale systems $24_1$-$24_M$, $24_1$-$24_N$ in the estimated wait times therefore. As one illustrative example, the estimated wait time for any point-of-sale system $24_1$-$24_M$, $24_1$-$24_N$ that is presently inactive may be equal to zero or some small positive value if the point-of-sale system is presently inactive, and may be a larger value, based primarily on the customer traffic signal(s) associated with the point-of-sale system, if the point-of-sale system is presently processing a purchase transaction. In any case, from the perspective of the identified client located in the customer entry area to the grouped point-of-sale systems $24_1$-$24_M$, $24_1$-$24_N$, e.g., from the perspective of the client 518 illustrated in FIG. 5, the "wait time" for any of the point-of-sale systems $24_1$-$24_N$ is generally an estimate of an amount of elapsed time or time duration between the most recent execution of the process 800 and subsequent (or current) availability of the point-of-sale system to process a purchase transaction, i.e., a transaction for the purchase by the customer of one or more items selected for purchase by the customer from the identified brick-and-mortar outlet of the retail enterprise 11. Those skilled in the art will recognize other techniques for monitoring purchase transaction activity at one or more of the point-of-sale systems $24_1$-$24_N$ and determining or estimating a wait time and/or operational state or status for one or more of the point-of-sale systems $24_1$-$24_N$ or other indicator of the availability or unavailability of one or more of the point-of-sale systems $24_1$-$24_N$ to process a purchase transaction, i.e., a transaction for the purchase by the customer of one or more items selected for purchase by the customer from the identified brick-and-mortar outlet of the retail enterprise 11, and it will be understood that any such other techniques are intended to fall within the scope of this disclosure.

Referring now to FIG. 9, a simplified flow diagram is shown of embodiments 900, 920 and 940 of the checkout area traffic monitoring process executed at step 704 in some embodiments of one or more of the processes 700, 730 and 760 illustrated in FIGS. 7A, 7B and 7C respectively. In one embodiment, the processes 900, 920 and 940 are each illustratively stored in the checkout area traffic monitoring module 438 of the CQN management module 430 in the form of instructions executable by the processor 50 of the main server 12, and the steps of the processes 900, 920 and 940 will be described below for purposes of this disclosure as being executed by the processor 50 of the main server. In some alternate embodiments, e.g., that may or may not include a main server 12, the processes 900, 920 and 940 may alternatively be stored in the memory 34 (and/or data storage 36) of one or more of the local servers $22_1$-$22_L$ in the form of instructions executable by the processor 30 of the one or more local servers $22_1$-$22_L$, stored in the memory of one of the point-of-sale systems $24_1$-$24_M$, $24_1$-$24_N$ within one or more of the brick-and-mortar enterprise stores or outlets in the form of instructions executable by a processor 200 associated with any such point-of-sale system $24_1$-$24_M$, $24_1$-$24_N$, and/or stored in a memory and executable by a processor of another system external to or supplemental to the system 10 illustrated FIG. 1. It will further be understood that the processes 900, 920 and 940 illustrated and described as being executed by one processor/device or one processor/server or one processor/system may alternatively be executed by a different processor/device or processor/server or processor/system in the system 10, and/or by two or more such processors in any one or combination of such devices, servers and/or systems, some examples of which are described above.

In the illustrated embodiment, the process 900 begins at step 920 where the processor 50 is illustratively operable to determine or estimate a total number of customers awaiting checkout at each of the currently operating POS systems $24_1$-$24_M$. The processor 50 may be operable to execute step 902 by accessing camera data, customer location information provided to the server 12 via the use of one or more of the PIDs $26_1$-$26_P$, by monitoring operation of POS systems $24_1$-$24_M$, and the like, and then processing any such data to determine the number of waiting customers. Thereafter at step 904, the processor 50 is illustratively operable to determine a current rate, e.g., average rate over a recent time period, of purchase transactions through each of the POS systems $24_1$-$24_M$. Illustratively, the processor 50 may be operable to execute step 904 by monitoring the operation of each POS system $24_1$-$24_M$ and computing the rates based on the rate of customer throughput. Thereafter at step 906, the processor 50 is illustratively operable to determine a current checkout demand as a function of the total number of customer awaiting checkout and the average rate of purchase transactions through each presently operating POS system $24_1$-$24_M$. Thereafter at step 908, the processor 50 may, in some embodiments, use the current checkout demand in the estimations of wait times, $E_i$, carried out in one or more of the processes 700, 730, 760. Alternatively or additionally, the processor 50 may use the current checkout demand to automatically request additional checkout attendants and/or to request fewer checkout attendants based on the determined checkout demand. Alternatively or additionally still, the processor 50 may be operable at step 908 to control a display, e.g., a display 560 illustrated in FIG. 5 or other display, to display the current checkout demand to inform store and/or enterprise leadership of the current checkout demand so that such leadership may staff the POS systems $24_1$-$24_M$ accordingly.

In the illustrated embodiment, the process 920 begins at step 922 where the processor 50 is illustratively operable to determine or estimate a total number of customers with mobile communication devices that will enter the checkout area 505 in a next time window, TW. The processor 50 may be operable to execute step 922 by accessing customer location information provided to the server 12 via the use of one or more of the PIDs $26_1$-$26_P$, number and/or rate of customers entering and/or exiting the store, e.g., via one or more PIDs 26 positioned at such store entrances and exits, and the like, and then processing any such data to predict the number and/or rate of customers expected to enter the checkout area 505 in the next time window, TW. Illustratively, TW may typically be hours or minutes, but may be any time value. Thereafter at step 924, the processor 50 is illustratively operable to determine or estimate a total number of customers that will enter the checkout area 505 in a next time window, TW. Illustratively, the processor 50 may be operable to execute step 924 by monitoring camera information, monitoring the operation of each POS system $24_1$-$24_M$ and computing the rates based on the rate of customer throughput, and the like, and then estimating the total number of customers based on such information. In other embodiments, the processor 50 may be operable to execute step 924 by estimating a percentage of customers presently in the store that are carrying mobile communication devices and then computing the total number of customers as a function of the total number of in-store customers carrying mobile communication devices and the estimated percentage value. In any case, the process 920 advances from step 924 to step 926 where the processor 50 is operable to determine or predict the checkout demand in the next time window, TW, as a function of the customer numbers determined or estimated at steps 924 and 926. Thereafter at step 928, the processor 50 may, in some embodiments, use the predicted checkout demand in the estimations of wait times, $E_i$, carried out in one or more of the processes 700, 730, 760. Alternatively or additionally, the processor 50 may use the predicted checkout demand to automatically request additional checkout attendants and/or to request fewer checkout attendants based on the determined checkout demand. Alternatively or additionally still, the processor 50 may be operable at step 908 to control a display, e.g., a display 560 illustrated in FIG. 5 or other display, to display the predicted checkout demand to inform store and/or enterprise leadership of the current checkout demand so that such leadership may staff the POS systems $24_1$-$24_M$ accordingly.

In the illustrated embodiment, the process 940 begins at step 942 where the processor 50 is illustratively operable to determine or estimate a rate of customers entering the store. The processor 50 may be operable to execute step 942 by accessing camera information, accessing customer location information provided to the server 12 via the use of one or more of the PIDs 26 positioned at such store entrances and exits, and the like, and then processing any such data to predict the current rate of customer entry into the store. Thereafter at step 944, the processor 50 is illustratively operable to determine or estimate the rate of customers with mobile communication devices entering each POS system 26, e.g., via location information provided to the server 12 via the use of one or more of the PIDs 26, etc. Thereafter at step 946, the processor 50 is illustratively operable to determine or estimate the total rate, i.e., of all customers, entering each POS system 26, e.g., using any information of the type previously discussed. At step 946, the processor 50 is further operable to determine or predict the current checkout demand or the checkout demand in the next time window, TW, as a function of the information collected at steps 942, 944 and 946. Thereafter at step 928, the processor 50 may, in some embodiments, use the predicted checkout demand in the estimations of wait times, $E_i$, carried out in one or more of the processes 700, 730, 760. Alternatively or additionally, the processor 50 may use the predicted checkout demand to automatically request additional checkout attendants and/or to request fewer checkout attendants based on the determined checkout demand. Alternatively or additionally still, the processor 50 may be operable at step 908 to control a display, e.g., a display 560 illustrated in FIG. 5 or other display, to display the predicted checkout demand to inform store and/or enterprise leadership of the current checkout demand so that such leadership may staff the POS systems $24_1$-$24_M$ accordingly.

Figure 10A:
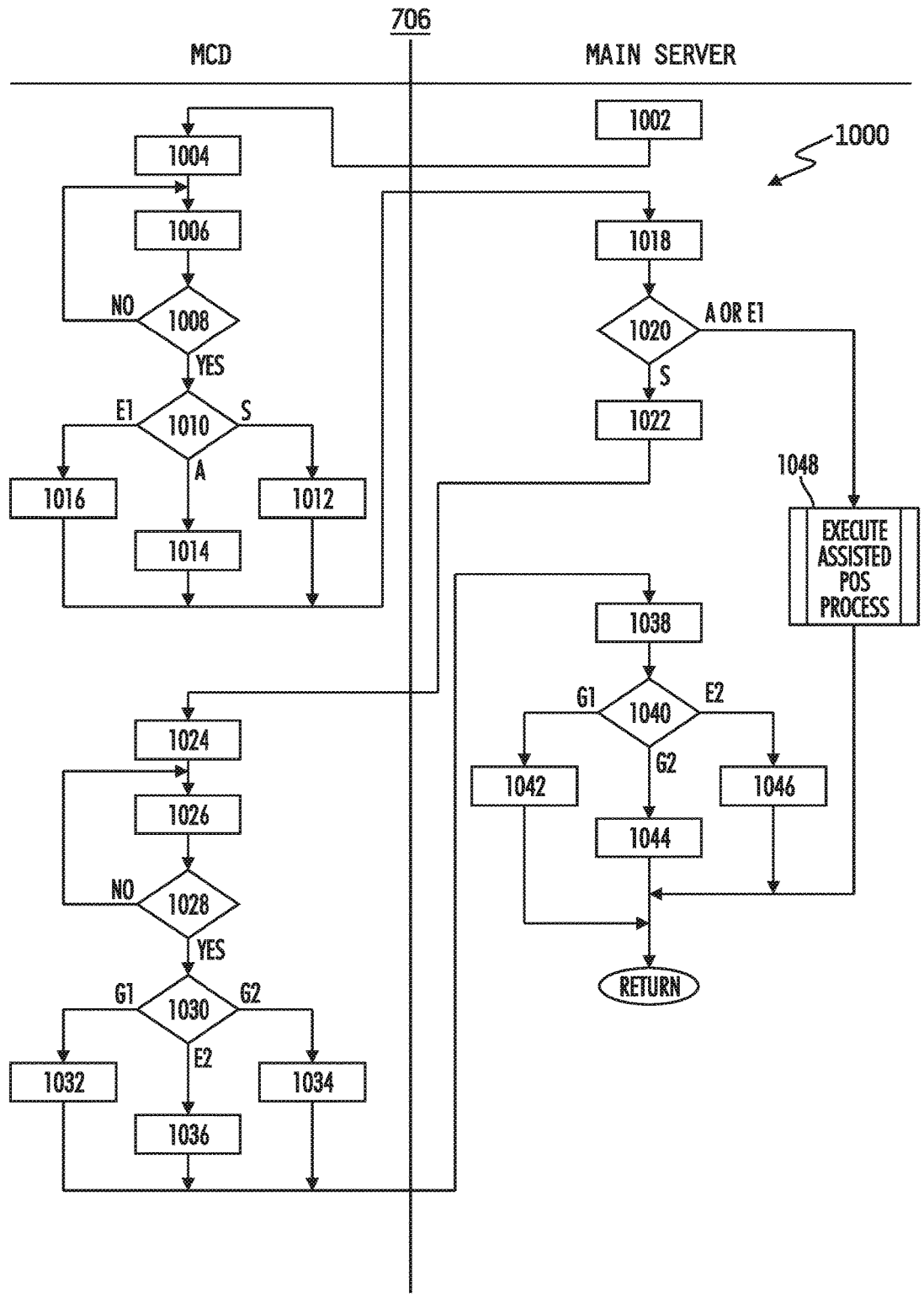
FIG. 10A is a simplified flow diagram of an embodiment of the POS type process illustrated in the flow diagrams of FIGS. 7A-7C.

Referring now to FIG. 10A, a simplified flow diagram is shown of an embodiment 1000 of the POS type process executed by the processor 50 of the main server 12 at step 706 of the process 700, at step 738 of the process 730 and/or at step 706 of the process 760. In one embodiment, the process 1000 is an interactive process executed in part by the processor 300 of a customer's mobile communication device 300 and in part by the processor 50 of the main server 12 and in part by. The former portion is illustratively part of the CQN application 310 stored in the memory 304 of the mobile communication device 16 and the latter portion is illustratively stored in the POS type processing module 440 of the CQN management module 430 in the form of instructions executable by the processor 50 of the main server 12, and the steps of the process 1000 will be described below for purposes of this disclosure as being executed by the processor 50 of the main server. In some alternate embodiments, e.g., that may or may not include a main server 12, the process 1000 may alternatively be stored in the memory 34 (and/or data storage 36) of one or more of the local servers $22_1$-$22_L$ in the form of instructions executable by the processor 30 of the one or more local servers $22_1$-$22_L$, stored in the memory of one of the point-of-sale systems $24_1$-$24_M$, $24_1$-$24_N$ within one or more of the brick-and-mortar enterprise stores or outlets in the form of instructions executable by a processor 200 associated with any such point-of-sale system $24_1$-$24_M$, $24_1$-$24_N$, and/or stored in a memory and executable by a processor of another system external to or supplemental to the system 10 illustrated FIG. 1. It will further be understood that the process 1000 illustrated and described as being executed by one processor/device or one processor/server or one processor/system may alternatively be executed by a different processor/device or processor/server or processor/system in the system 10, and/or by two or more such processors in any one or combination of such devices, servers and/or systems, some examples of which are described above.

Figure 10B:
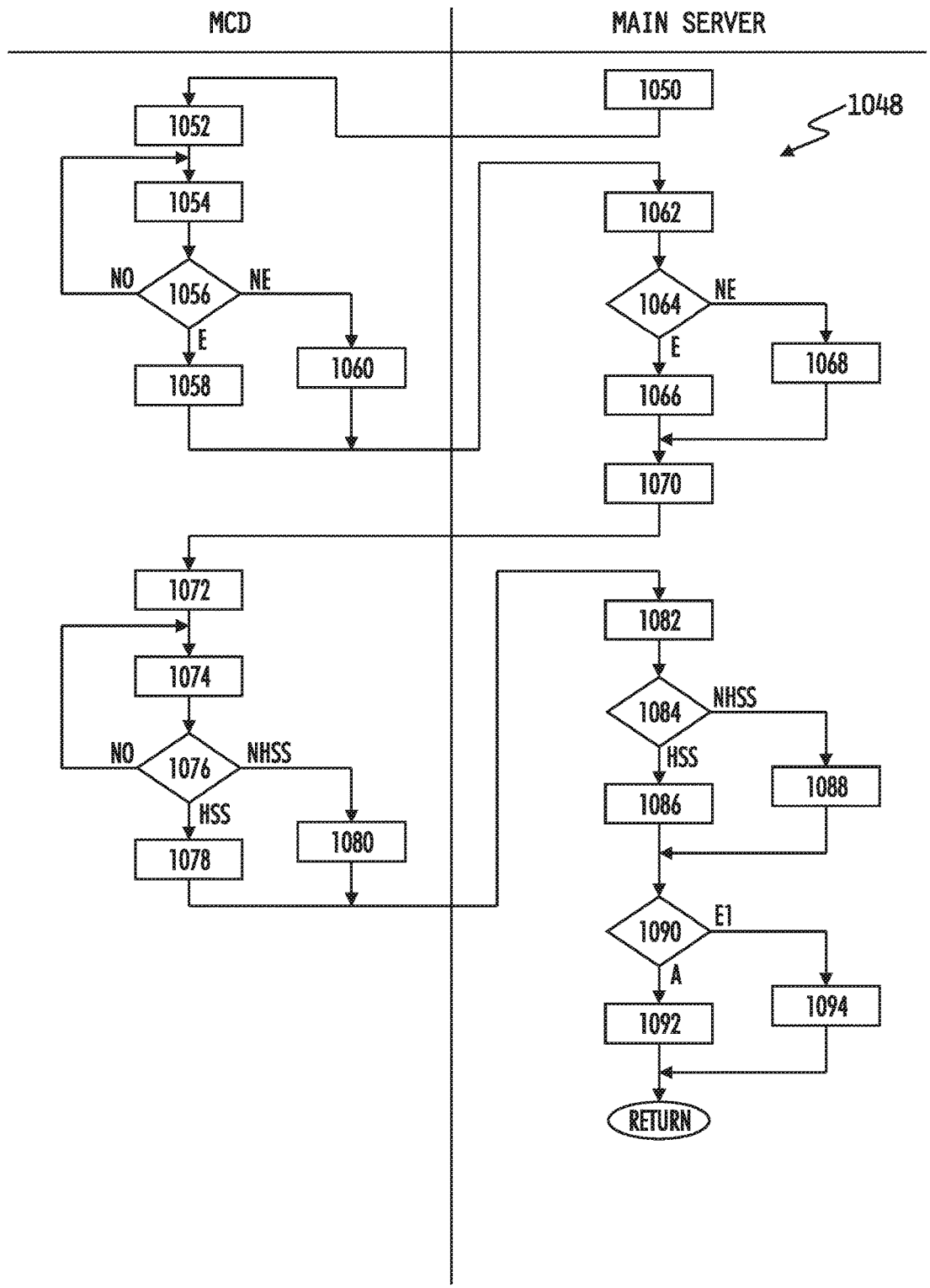
FIG. 10B is a simplified flow diagram of an embodiment of the assisted POS process illustrated in the flow diagram of FIG. 10A.
Figure 10C:
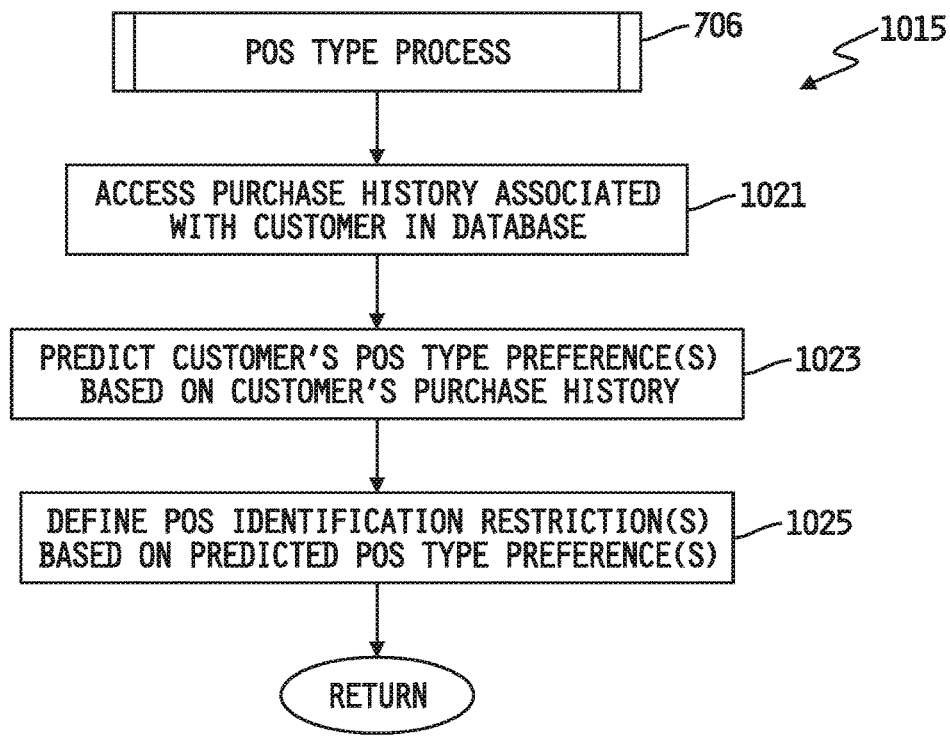
FIG. 10C is a simplified flow diagram of another embodiment of the POS type process illustrated in the flow diagrams of FIGS. 7A-7C.

The process 1000 illustratively begins at step 1002 where the processor 50 of the server 12 is operable to transmit a wireless signal to the mobile communication device 16 including a request for instructions for customer preference for self checkout, assisted checkout, i.e., a POS system staffed with a POS attendant or operator, or either. Thereafter at step 1004, the customer's mobile communication device 16 receives the signal and at step 1006 the processor 300 of the customer's mobile communication device 16 controls the display 322 to display the preference requests. Thereafter at step 1008, the processor 50 awaits selection by the customer, and at step 1010 the processor 300 determines the customer selection to be self checkout (S), assisted checkout (A) or either (E1), and the processor 300 is illustratively operable to control the communication circuitry 312 to wirelessly transmit the customer's selection at steps 1012, 1014 and 1016 respectively. The server 12 receives the customer's selection at step 1018, and if the processor 50 determines the customer selection to be A or E1, the process advances to step 1048 where the processor 50 (and the processor 300 of the mobile communication device) execute an assisted POS process, and example of which is illustrated in FIG. 10B. If, at step 1020 the processor 50 determines the customer selection to be S, the processor 50 is operable at step 1022 to transmit a second request to the customer for instructions for customer preference of self checkout location.

In some embodiments, for example, the POS systems 26 may be arranged such that one or more self checkout POS systems are positioned on either side of a bank of multiple customer assisted checkout POS systems. Those skilled in the art will recognize other such grouping arrangements, and any such alternate grouping arrangements, and or quantity thereof, is contemplated by this disclosure. In the example embodiment illustrated in FIG. 10A, the self checkout POS systems 26 are illustratively arranged in two separate groups, G1 and G2, and the request transmitted at step 1022 therefore illustratively includes a choice of G1, G2 or either. The customer's mobile communication device receives the request at step 1024, and thereafter at step 1026 the processor 300 is operable to control the display to display the self checkout preference choices. The processor 300 awaits the customer selection at step 1028, and at step 1030 the processor 300 determines the customer selection to be group I (G1), group II (G2) or either (E2), and the processor 300 is illustratively operable to control the communication circuitry 312 to wirelessly transmit the customer's selection at steps 1032, 1034 and 1036 respectively.

The main server 12 receives the customer selection at step 1038 and thereafter at step 1040 the processor 50 is operable to determine the customer's selection as G1, G2 or E2. If G1, the processor 50 is illustratively operable at step 1042 to restrict the list of POS systems to recommend to the customer to only the group I self checkout POS systems 26. If G2, the processor 50 is likewise operable at step 1044 to restrict the list of POS systems to recommend to the customer to only the group II self checkout POS systems 26. Finally, if E2, the processor 50 is operable at step 1046 to restrict the list of POS systems to recommend to the customer to only the group I and group II self checkout POS systems 26. Thereafter, and following execution of step 1048, the process 1000 returns to the process 700, 730 or 760.

Referring now to FIG. 10B, a simplified flow diagram is shown of an embodiment 1048 of the assisted POS process executed by the processor 50 of the main server 12 at step 1048 of the process 1000 illustrated in FIG. 10A. In one embodiment, the process 1048 is an interactive process executed in part by the processor 300 of a customer's mobile communication device 300 and in part by the processor 50 of the main server 12 and in part by. The former portion is illustratively part of the CQN application 310 stored in the memory 304 of the mobile communication device 16 and the latter portion is illustratively stored in the POS type processing module 440 of the POS type processing module 440 in the form of instructions executable by the processor 50 of the main server 12, and the steps of the process 1048 will be described below for purposes of this disclosure as being executed by the processor 50 of the main server. In some alternate embodiments, e.g., that may or may not include a main server 12, the process 1048 may alternatively be stored in the memory 34 (and/or data storage 36) of one or more of the local servers $22_1$-$22_L$ in the form of instructions executable by the processor 30 of the one or more local servers $22_1$-$22_L$, stored in the memory of one of the point-of-sale systems $24_1$-$24_M$, $24_1$-$24_N$ within one or more of the brick-and-mortar enterprise stores or outlets in the form of instructions executable by a processor 200 associated with any such point-of-sale system $24_1$-$24_M$, $24_1$-$24_N$, and/or stored in a memory and executable by a processor of another system external to or supplemental to the system 10 illustrated FIG. 1. It will further be understood that the process 1048 illustrated and described as being executed by one processor/device or one processor/server or one processor/system may alternatively be executed by a different processor/device or processor/server or processor/system in the system 10, and/or by two or more such processors in any one or combination of such devices, servers and/or systems, some examples of which are described above.

The process 1048 illustratively begins at step 1050 where the processor 50 of the server 12 is operable to transmit a wireless signal to the mobile communication device 16 including a request for instructions for customer preference for express lane assisted checkout, i.e., a POS system established to process customer purchase of less than or equal to a predefined number of items, non-express lane assisted checkout or either. Thereafter at step 1052, the customer's mobile communication device 16 receives the signal and at step 1054 the processor 300 of the customer's mobile communication device 16 controls the display 322 to display the preference requests. Thereafter at step 1056, the processor 50 awaits selection by the customer, and ultimately determines the customer selection to be express lane assisted checkout (E), non-express lane assisted checkout (NE) or either (E), and the processor 300 is illustratively operable to control the communication circuitry 312 to wirelessly transmit the customer's selection at steps 1058 and 1060 respectively. The server 12 receives the customer's selection at step 1062, and if at step 1064 the processor 50 determines the customer selection to be E the processor 50 is operable to store the customer selection at step 1066 and if NE to store that customer selection at step 1068. Following step 1066 or step 1068, the process 1048 advances to step 1070 where the processor 50 is operable to control the communication circuitry 58 to transmit a second request to the customer for instructions for customer preference of a high-speed scanning POS.

In some embodiments, for example, the POS systems 26 may be include one or more so-called high-speed scanning systems operable to bulk scan items for purchase. In some implementations, such POS systems are staffed by an attendant, and in others they may not be. In any case, the customer's mobile communication device receives the second request at step 1072, and thereafter at step 1074 the processor 300 is operable to control the display to display the self checkout preference choices. The processor 300 awaits the customer selection at step 1076 ultimately determines the customer selection to be high speed scanning systems (HSS), or not high speed scanning system (NHSS), and the processor 300 is illustratively operable to control the communication circuitry 312 to wirelessly transmit the customer's selection at steps 1078 and 1080 respectively.

The main server 12 receives the customer selection at step 1082 and thereafter at step 1084 the processor 50 is operable to determine the customer's selection as HSS or NHSS. If HSS, the processor 50 is illustratively operable at step 1086 to store the HSS selection in memory and at step 1088 to store the NHSS selection in memory. Following steps 1086 and 1088, the process 1048 advances to step 1090 where the processor 50 is operable to determine whether the customer selected E1 or A at step 1010 of the process 1000 illustrated in FIG. 10A. If A, the processor 50 is operable at step 1092 to restrict the list of POS systems to recommend to the customer to E, NE, HSS and/or NHSS depending upon the assisted checkout POS choices made by the customer at steps 1056 and 1076. If El, the processor 50 is operable at step to place no customer preference restrictions on the POS systems to recommend to the customer. The process 1048 illustratively terminates following step 1092 or step 1094, and thereafter returns to step 1048 of the process 1000.

Referring now to FIG. 10O, a simplified flow diagram is shown of another embodiment 1015 of the POS type process executed by the processor 50 of the main server 12 at step 706 of the process 700, at step 738 of the process 730 and/or at step 706 of the process 760. In one embodiment, the process 1015 is stored in the POS type processing module 440 of the POS type processing module 440 in the form of instructions executable by the processor 50 of the main server 12, and the steps of the process 1015 will be described below for purposes of this disclosure as being executed by the processor 50 of the main server. In some alternate embodiments, e.g., that may or may not include a main server 12, the process 1015 may alternatively be stored in the memory 34 (and/or data storage 36) of one or more of the local servers $22_1$-$22_L$ in the form of instructions executable by the processor 30 of the one or more local servers $22_1$-$22_L$, stored in the memory of one of the point-of-sale systems $24_1$-$24_M$, $24_1$-$24_N$ within one or more of the brick-and-mortar enterprise stores or outlets in the form of instructions executable by a processor 200 associated with any such point-of-sale system $24_1$-$24_M$, $24_1$-$24_N$, and/or stored in a memory and executable by a processor of another system external to or supplemental to the system 10 illustrated FIG. 1. It will further be understood that the process 1015 illustrated and described as being executed by one processor/device or one processor/server or one processor/system may alternatively be executed by a different processor/device or processor/server or processor/system in the system 10, and/or by two or more such processors in any one or combination of such devices, servers and/or systems, some examples of which are described above.

The process 1015 begins at step 1021 where the processor 50 is illustratively operable to access the purchase history associated with the customer in the customer purchase history database 412, and thereafter at step 1023 the processor 50 is operable to predict the customer's POS preference(s) based on the customer's historical POS choice(s). Thereafter at step 1025, the processor 50 is operable to define the POS identification restriction(s) based on the POS prediction(s) made at step 1023.

Figure 10D:
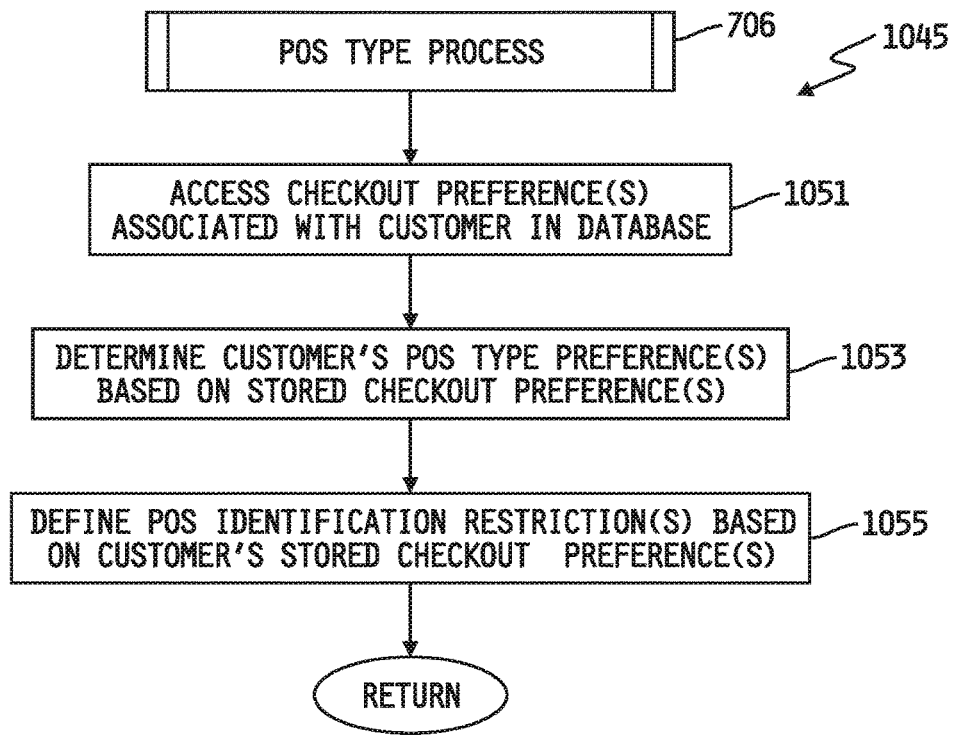
FIG. 10D is a simplified flow diagram of yet another embodiment of the POS type process illustrated in the flow diagrams of FIGS. 7A-7C.

Referring now to FIG. 10D, a simplified flow diagram is shown of yet another embodiment 1045 of the POS type process executed by the processor 50 of the main server 12 at step 706 of the process 700, at step 738 of the process 730 and/or at step 706 of the process 760. In one embodiment, the process 1045 is stored in the POS type processing module 440 of the POS type processing module 440 in the form of instructions executable by the processor 50 of the main server 12, and the steps of the process 1045 will be described below for purposes of this disclosure as being executed by the processor 50 of the main server. In some alternate embodiments, e.g., that may or may not include a main server 12, the process 1045 may alternatively be stored in the memory 34 (and/or data storage 36) of one or more of the local servers $22_1$-$22_L$ in the form of instructions executable by the processor 30 of the one or more local servers $22_1$-$22_L$, stored in the memory of one of the point-of-sale systems $24_1$-$24_M$, $24_1$-$24_N$ within one or more of the brick-and-mortar enterprise stores or outlets in the form of instructions executable by a processor 200 associated with any such point-of-sale system $24_1$-$24_M$, $24_1$-$24_N$, and/or stored in a memory and executable by a processor of another system external to or supplemental to the system 10 illustrated FIG. 1. It will further be understood that the process 1045 illustrated and described as being executed by one processor/device or one processor/server or one processor/system may alternatively be executed by a different processor/device or processor/server or processor/system in the system 10, and/or by two or more such processors in any one or combination of such devices, servers and/or systems, some examples of which are described above.

In some embodiments, the database 402 may include in the customer checkout preference/history database 414 stored preferences previously selected by one or more customers, e.g., via the customer EMS page or other such mechanism, such that the database 414 includes customer-selected checkout preferences of one or more EMS customer members. In such embodiments, the process 1045 begins at step 1051 where the processor 50 is illustratively operable to access the checkout preference(s) associated with the identified customer in the customer checkout/preference history database 414, and thereafter at step 1053 the processor 50 is operable to predict the customer's POS preference(s) based on the customer's stored POS choice(s). Thereafter at step 1055, the processor 50 is operable to define the POS identification restriction(s) based on the customer's stored POS choice(s).

Referring now to FIG. 11, an embodiment 1100 is shown of the rating filter process executed at step 710 of the process 700, at step 740 of the process 730 and/or at step 710 of the process 760. Illustratively, the process 1100 is stored in the customer filter module 442 of the MCA module 440 in the form of instructions executable by the processor 50 of the main server 12. The process 1100 illustratively begins at step 1102 where the processor 50 is operable to access the employee schedule database 416, and thereafter at step 1104 the processor 50 is operable to access the checkout preference(s)/history database 414. The processor 50 is operable at step 1106 and 1108 to determine therefrom each employee currently working at one of the assisted checkout POS systems 26 POS$_i$ where i=1, M and M is any positive integer. In accordance with step 1106, the customer may establish ratings for store employees which have operated an assisted POS previously used by the customer, and such customer assigned ratings may be stored in the database 414. In such embodiments, a rating value is stored in the database 414 and linked to the customer's EMSID so that the processor 50 may use the customer rating values to inform the choice of one or more POS systems to recommend to the customer. In this regard, the processor 50 is illustratively operable at steps 1108 and 1110 to determine for each employee currently working at a POS a stored rating value, i.e., a rating value, if any, previously assigned by the customer to that employee based on the customer's previous experience with the employee. At steps 1112 and 1114, the processor 50 is operable to mark with an indicator of the customer's corresponding stored rating value each identified employee that is not on a scheduled break or due for one in the next several minutes. At step 1116, the process 1100 ensures that each of the M current POS attendants or operators are processed with rating values, if any.

Referring now to FIG. 12, a simplified flow diagram is shown of an embodiment 1200 of the POS weighting process executed at step 714 of the process 700, at step 740 of the process 730 and/or at step 714 of the process 760. Illustratively, the process 1200 is stored in the customer filter module 442 of the MCA module 440 in the form of instructions executable by the processor 50 of the main server 12. The process 1200 illustratively begins at step 1202 where the processor 50 is operable to access the checkout history associated with the customer in the preference(s)/history database 414. At step 1206, the processor 50 is illustratively operable to assign a weighting factor, W1$_i$, to each POS$_i$ marked at step 1204 with a stored rating value based on historical use by the customer when recommended by the server 12.

Thereafter at step 1208 the processor 50 is operable to access the purchase history associated with the customer in the purchase history database 412. At step 1212, the processor 50 is illustratively operable to assign a weighting factor, W2$_i$, to each POS$_i$ marked with a stored rating value. Illustratively, each weighting value W2$_i$ is based on a correlation, if any, between stored performance data for the employee working at the identified POS and the customer's purchase history. The weighting factors $W2_i$ are illustratively higher for employees whose performance rates are higher with items typically purchased by the customer. In any case, the processor may be operable at step 1214 to select POS systems 26 to recommend based on one or both sets of weighting values and, in some embodiments, the processor 50 may be operable at steps 1216-1218 to recommend one or more additional checkout lanes, e.g. "no waiting" or other checkout lane(s), for customers identified as having preferred status.

Figure 13A:
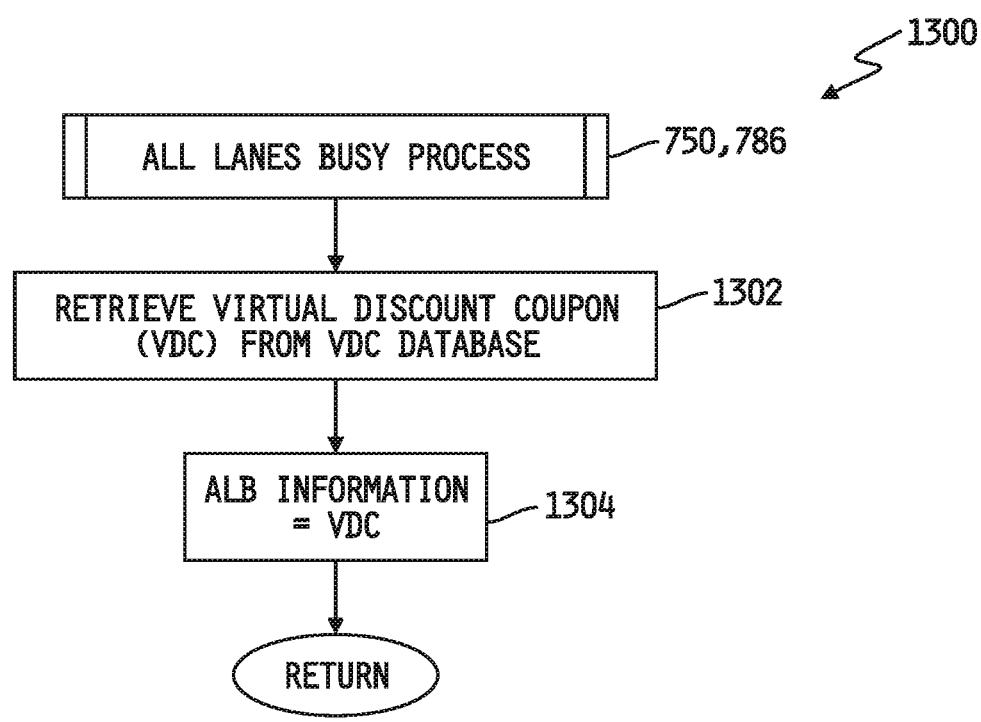
FIG. 13A is a simplified flow diagram of an embodiment of the all lanes busy process illustrated in the flow diagrams of FIGS. 7B and 7C.

Referring now to FIG. 13A a simplified flow diagram is shown of an embodiment 1300 of the all lanes busy (ALB) process executed by the processor 50 of the main server 12 at step 748 in some embodiments of the process 730 and/or at step 786 in some embodiments of the process 760. In one embodiment, the process 1300 is illustratively stored in the all lanes busy module 444 of the CQN management module 430 in the form of instructions executable by the processor 50 of the main server 12, and the steps of the process 1300 will be described below for purposes of this disclosure as being executed by the processor 50 of the main server. In some alternate embodiments, e.g., that may or may not include a main server 12, the process 1300 may alternatively be stored in the memory 34 (and/or data storage 36) of one or more of the local servers $22_1$-$22_L$ in the form of instructions executable by the processor 30 of the one or more local servers $22_1$-$22_L$, stored in the memory of one of the point-of-sale systems $24_1$-$24_M$, $24_1$-$24_N$ within one or more of the brick-and-mortar enterprise stores or outlets in the form of instructions executable by a processor 200 associated with any such point-of-sale system $24_1$-$24_M$, $24_1$-$24_N$, and/or stored in a memory and executable by a processor of another system external to or supplemental to the system 10 illustrated FIG. 1. It will further be understood that the process 1300 illustrated and described as being executed by one processor/device or one processor/server or one processor/system may alternatively be executed by a different processor/device or processor/server or processor/system in the system 10, and/or by two or more such processors in any one or combination of such devices, servers and/or systems, some examples of which are described above.

The process 1300 begins at step 1302 where the processor 50 is operable to retrieve one or more virtual discount coupons (VDC) from the virtual coupon database 408, and thereafter at step 1304 the processor 50 is operable to identify as, or as part of, the all lanes busy (ALB) information the retrieved one or more virtual discount coupons. The process 1300 thereafter returns to the process 730 or 760 with the ALB information. The process 1300 thus produces at least part of the ALB information that gets returned to the process 600 by the process 730 or 760. In some embodiments, the ALB information, in the form of VDC, is returned by the process 1300 to the process 730 or the process 760, and the processor 50 is thereafter operable to forward the received ALB information to the process 600. In some alternative embodiments, the processor 50 is illustratively operable to add one or more messages to the ALB information received from the all lanes busy process 1300.

Figure 13B:
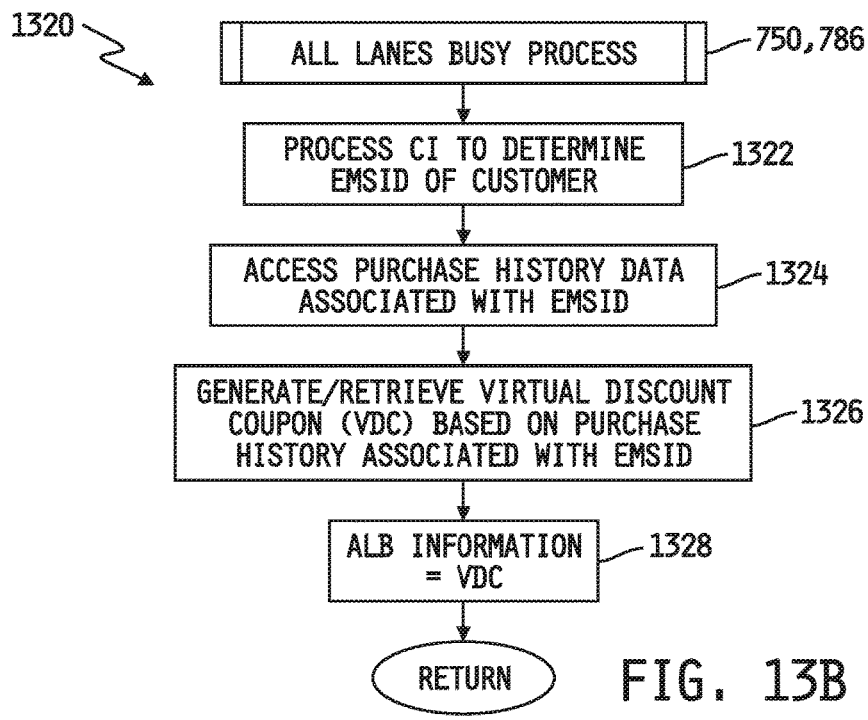
FIG. 13B is a simplified flow diagram of another embodiment of the all lanes busy process illustrated in the flow diagrams of FIGS. 7B and 7C.

Referring now to FIG. 13B a simplified flow diagram is shown of an alternate embodiment 1320 of the all lanes busy (ALB) process executed by the processor 50 of the main server 12 at step 748 in some embodiments of the process 730 and/or at step 786 in some embodiments of the process 760. In one embodiment, the process 1320 is illustratively stored in the all lanes busy module 444 of the CQN management module 430 in the form of instructions executable by the processor 50 of the main server 12, and the steps of the process 1320 will be described below for purposes of this disclosure as being executed by the processor 50 of the main server. In some alternate embodiments, e.g., that may or may not include a main server 12, the process 1320 may alternatively be stored in the memory 34 (and/or data storage 36) of one or more of the local servers $22_1$-$22_L$ in the form of instructions executable by the processor 30 of the one or more local servers $22_1$-$22_L$, stored in the memory of one of the point-of-sale systems $24_1$-$24_M$, $24_1$-$24_N$ within one or more of the brick-and-mortar enterprise stores or outlets in the form of instructions executable by a processor 200 associated with any such point-of-sale system $24_1$-$24_M$, $24_1$-$24_N$, and/or stored in a memory and executable by a processor of another system external to or supplemental to the system 10 illustrated FIG. 1. It will further be understood that the process 1320 illustrated and described as being executed by one processor/device or one processor/server or one processor/system may alternatively be executed by a different processor/device or processor/server or processor/system in the system 10, and/or by two or more such processors in any one or combination of such devices, servers and/or systems, some examples of which are described above.

The process 1320 begins at step 1322 where the processor 50 is illustratively operable to process the communication information (CI) received by the processor 50 from the customer's mobile communication device 16 at step 610 of the process 600 to determine the EMSID or other identifier associated in the customer account data 404 with the communication information, CI. In alternate embodiments in which the customer's EMSID is wirelessly transmitted by the customer's mobile communication device 16 at step 608 of the process 600 as described above, step 1322 of the process 1320 may be omitted or skipped. At step 1324, the processor 50 is then illustratively operable to access the customer's purchase history in the customer purchase history database 412, i.e., to access the purchase history associated in the customer purchase history database 412 with the EMSID determined at step 1322 or received from the customer's mobile communication device 16 at step 610 of the process 600. Thereafter at step 1326, the processor 50 is illustratively operable to generate one or more virtual discount coupons (VDC) or retrieve one or more virtual discount coupons (VDC) based on the purchase history associated in the customer purchase history database 412 with the EMSID. In some embodiments, for example, the processor 50 may be operable at step 1326 to generate or retrieve one or more virtual discount coupons (VDC) that match one or more items identified in the customer's purchase history as having been previously purchased by the customer. Those skilled in the art will recognize other conventional techniques and/or other considerations for generating or retrieving one or more virtual discount coupons (VDC) based on the customer's purchase history, and any such other techniques and/or considerations are contemplated by this disclosure.

Following step 1326, the processor 50 is illustratively operable at step 1328 to identify as, or as part of, the all lanes busy (ALB) information the generated or retrieved one or more virtual discount coupons (VDC). The process 1320 thereafter returns to the process 730 or 760 with the ALB information. As described above with respect to step 1304 of the process 1300, the process 1320 thus likewise produces at least part of the ALB information that gets returned to the process 600 by the process 730 or 760.

Figure 13C:
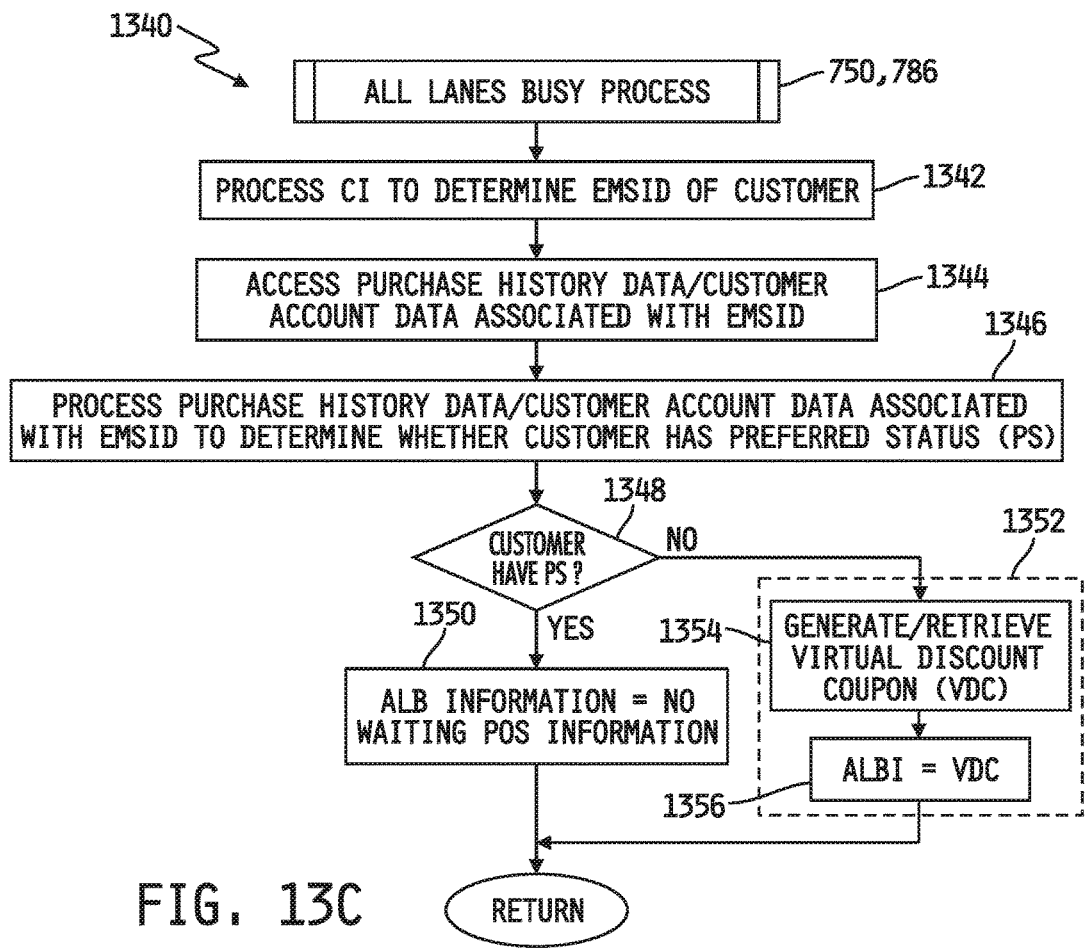
FIG. 13C is a simplified flow diagram of yet another embodiment of the all lanes busy process illustrated in the flow diagrams of FIGS. 7B and 7C.
Figure 13D:
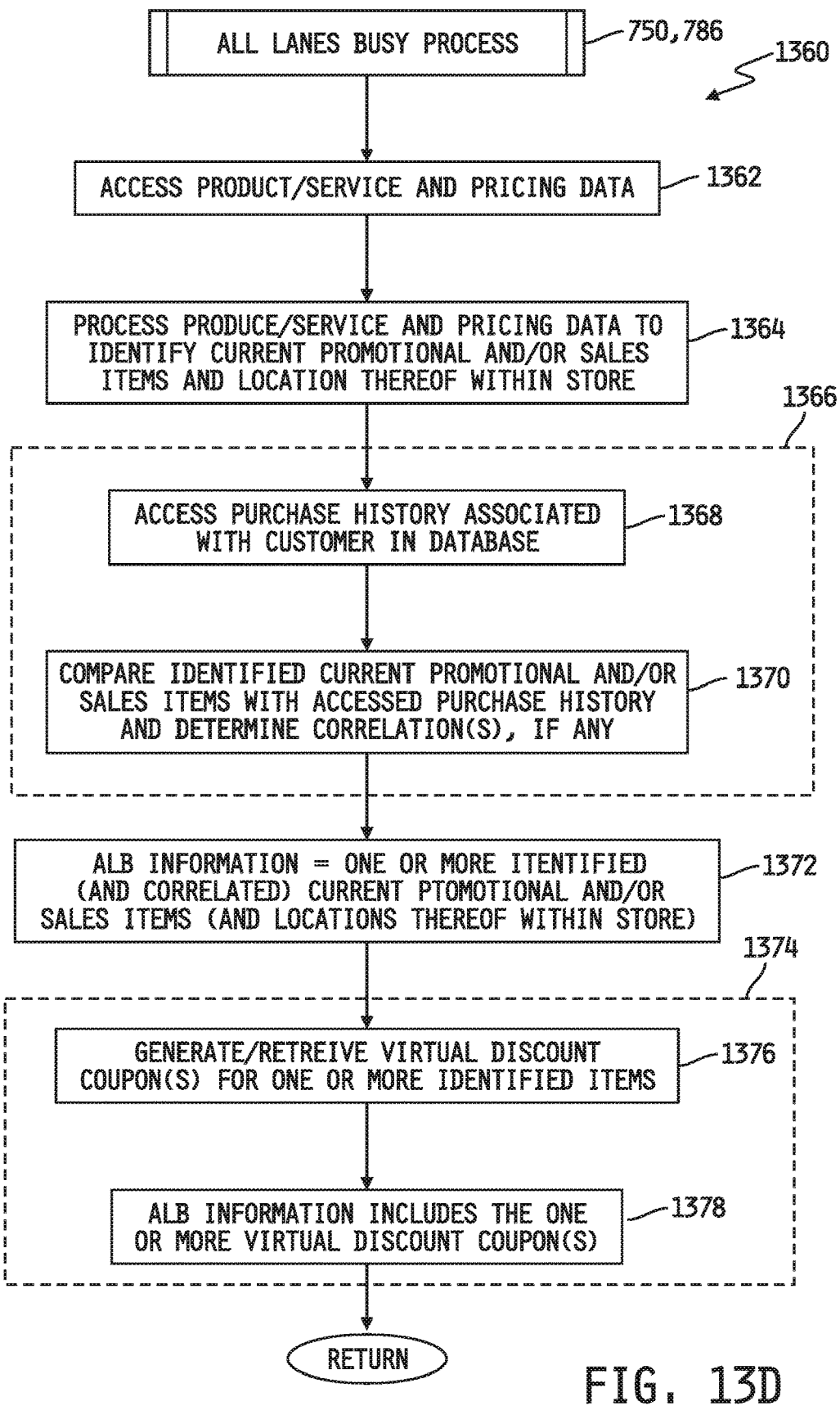
FIG. 13D is a simplified flow diagram of still another embodiment of the all lanes busy process illustrated in the flow diagrams of FIGS. 7B and 7C.

Referring now to FIG. 13C, a simplified flow diagram is shown of an alternate embodiment 1340 of the all lanes busy (ALB) process executed by the processor 50 of the main server 12 at step 748 in some embodiments of the process 730 and/or at step 786 in some embodiments of the process 760. In one embodiment, the process 1340 is illustratively stored in the all lanes busy module 444 of the CQN management module 430 in the form of instructions executable by the processor 50 of the main server 12, and the steps of the process 1340 will be described below for purposes of this disclosure as being executed by the processor 50 of the main server. In some alternate embodiments, e.g., that may or may not include a main server 12, the process 1340 may alternatively be stored in the memory 34 (and/or data storage 36) of one or more of the local servers 22$_1$-22L in the form of instructions executable by the processor 30 of the one or more local servers 22$_1$-22$_L$, stored in the memory of one of the point-of-sale systems 24$_1$-24$_N$ within one or more of the brick-and-mortar enterprise stores or outlets in the form of instructions executable by a processor 200 associated with any such point-of-sale system 24$_1$-24$_M$, 24$_1$-24$_N$, and/or stored in a memory and executable by a processor of another system external to or supplemental to the system 10 illustrated FIG. 1. It will further be understood that the process 1340 illustrated and described as being executed by one processor/device or one processor/server or one processor/system may alternatively be executed by a different processor/device or processor/server or processor/system in the system 10, and/or by two or more such processors in any one or combination of such devices, servers and/or systems, some examples of which are described above.

The process 1340 begins at step 1342 where the processor 50 is illustratively operable to process the communication information (CI) received by the processor 50 from the customer's mobile communication device 16 at step 610 of the process 600 to determine the EMSID or other identifier associated in the customer account data 404 with the communication information, CI. In alternate embodiments in which the customer's EMSID is wirelessly transmitted by the customer's mobile communication device 16 at step 608 of the process 600 as described above, step 1342 of the process 1340 may be omitted or skipped. At step 1344, the processor 50 is then illustratively operable to access the customer's purchase history in the customer purchase history database 412, i.e., to access the purchase history associated in the customer purchase history database 412 with the EMSID determined at step 1342 or received from the customer's mobile communication device 16 at step 610 of the process 600. Thereafter at step 1346, the processor 50 is illustratively operable to process the customer account data 404 associated with the EMSID and/or the purchase history associated with the EMSID to determine whether the customer associated with the EMSID has preferred status, PS. In some embodiments, for example, customers may earn preferred status, PS, by spending at least a threshold dollar amount per specified time period, e.g., week, month, year, etc., and in other embodiments the retail enterprise 11 may periodically or on an ad hoc basis run one or more promotions in which customer's may earn preferred status by spending a threshold dollar amount on specified goods, categories of goods, or the like, and/or in which customers may be awarded with preferred status, e.g., randomly or as part of lottery. In any case, the customer account data 404 may, in some embodiments, include a preferred status indicator associate in the data 404 with the EMSIDs of customers having such preferred status, and in other embodiments the customer's purchase history may include such a preferred status indicator. In still other embodiments, neither database 404 or 412 location includes such a preferred status indicator, and the processor 50 is instead operable at step 1346 to make a determination of whether any particular customer has preferred status, PS, based on the customer's purchase history. Those skilled in the art will recognize other techniques for determining whether any customer is deserving of a preferred status, and any such other techniques are contemplated by this disclosure.

Following step 1346, the processor 50 is operable to determine whether the identified customer has preferred status, PS. If not, the processor 50 is operable in one embodiment to execute step 1352, which may include steps 1354 and 1356 that are illustratively identical to steps 1326 and 1328 respectively of the process 1320 illustrated in FIG. 13B. In other embodiments, step 1352 may include only step 1356 in which the all lanes busy (ALB) information may be or include an indicator that the identified customer does not have preferred status, PS.

If, at step 1348, the processor 950 determines that the customer does have preferred status, the process 1340 advances to step 1350 where the processor 50 is illustratively operable to identify as, or as part of, the all lanes busy (ALB) information one or more messages or other indicators indicating or otherwise identifying the customer for a "no waiting" point-of-sale system. In this embodiment, at least one of the point-of-sale systems 24$_1$-24$_N$ or an additional point-of-sale system separate from the point-of-sale systems 24$_1$-24$_N$ is illustratively designated at a "no waiting" point-of-sale system reserved only for customers having preferred status, PS. In such embodiments, the checkout notification information, CNI, produced by the checkout notification process 730 or 760 will include one or more messages that will direct the customer 16 to the "no waiting" point-of-sale system, or to one of the "no waiting" point-of-sales systems in embodiments that include more than one such "no waiting" point-of-sale system. In any case, the process 1340 returns following step 1350 or 962 to the process 730 or 760 with the ALB information. As described above with respect to the processes 1300 and 1320, the process 1340 likewise produces at least part of the ALB information that gets returned to the process 600 by the process 730 or 760.

Referring once again to FIG. 6, the checkout notification process executed at step 612 of the process 600 returns with customer notification information (CNI) relating to the availability of one or more of the customer checkout stations CHK1-CHKN, at which corresponding ones of the point-of-sale system 24$_1$-24$_M$, 24$_1$-24$_N$ are located, to process a purchase transaction, i.e., a transaction for the purchase by the customer of one or more items selected for purchase by the customer from the identified brick-and-mortar outlet of the retail enterprise 11. In embodiments in which the process executed at step 612 is the process 700 illustrated in FIG. 7A, for example, CNI is or includes the sorted subsets POS$_{S1}$, POS$_{S2}$ and POS$_{S3}$ of the identified point-of-sale systems 24$_1$-24$_N$. In embodiments in which the process executed at step 612 is the process 730 illustrated in FIG. 7B, in contrast, CNI is or includes the sorted subsets POS$_{S1}$, POS$_{S2}$ and POS$_{S3}$ of the identified point-of-sale systems 24$_1$-24$_N$ if the estimated wait times for all of the point-of-sale systems 24$_1$-24$_N$ are not all greater than TH2, and otherwise is or includes the "all lanes busy" (ALB) information produced by one of the ALB processes of FIGS. 13A-13C or information indicating that all lanes are currently busy. Such "all lanes busy" (ALB) information may be or include one or more virtual discount coupons or "no waiting" point-of-sale system identification information.

Alternatively still, in embodiments in which the process executed at step 612 is the process 760 illustrated in FIG. 7C, CNI is or includes the sorted subset $POS_{S1}$ of all of the identified point-of-sale system $24_1$-$24_N$ for which the estimated wait time, E, is less than or equal to TH1 if the estimate wait time, E, is less than or equal to TH1 for at least one of the identified point-of-sale systems $24_1$-$24_N$, or if none of the estimated wait times, E, is less than or equal to TH1 but at least one estimated wait time, E, is less than or equal to TH2, CNI is or includes the sorted subset $POS_{S2}$ of all of the identified point-of-sale system $24_1$$24_N$ for which the estimated wait time, E, is greater than TH1 but less than or equal to TH2, or further still if none of the estimated wait times, E, is less than or equal to TH2, CNI is or includes the "all lanes busy" (ALB) information produced by one of the ALB processes of FIGS. 13A-13C or information indicating that all lanes are currently busy.

Following execution of step 612, the processor 50 is operable at step 614 to wirelessly transmit the CNI to the customer's mobile communication device 16, and the customer's mobile communication device 16 is thereafter operable to receive the wirelessly transmitted CNI at step 616, and the processor 300 of the customer' mobile communication device 16 is thereafter operable at step 618 to process the wirelessly transmitted CNI and to control the display 322 of the mobile communication device 16 to display the CNI to the customer. In embodiments in which CNI is or includes one or more sorted lists of one or more subsets of the identified point-of-sale systems $24_1$-$24_N$, the processor 300 is illustratively operable to control the display 322 to display such sorted lists. In embodiments in which the checkout notification process execute at step 612 is the process 700 illustrated in FIG. 7A, for example, the processor 300 is illustratively operable to display the sorted subsets of the identified point-of-sale systems $24_1$-$24_N$ in accordance with an order thereof specified by the processor 50. As one example, the specified order may be all point-of-sale systems $24_1$-$24_N$ having an estimated wait time, E, less than or equal to TH1, i.e., those in subset $POS_{S1}$, followed by all point-of-sale systems $24_1$-$24_N$ having an estimated wait time, E, less than or equal to TH2, i.e., those in subset $POS_{S2}$, followed by all point-of-sale systems $24_1$-$24_N$ having an estimated wait time, E, greater than TH2, i.e., those in subset $POS_{S3}$. The customer may then proceed to one of the point-of-sale systems $24_1$-$24_N$ of the customer's choosing; presumably one identified as having an estimated wait time, E, less than or equal to TH1. In some embodiments, the processor 50 may further arrange the point-of-sale systems $24_1$-$24_N$ in any such subset $POS_{S1}$, $POS_{S2}$, $POS_{S3}$ according to the proximity or location of the determined location of the identified customer relative to the locations of the point-of-sale systems in the subset, e.g., such that all point-of-sale systems $24_1$-$24_N$ in one or more of the POS subsets are arranged in order of closest to the identified customer's location to furthest from the identified customer's location.

In embodiments in which the checkout notification process execute at step 612 is the process 730 illustrated in FIG. 7B, the processor 300 of the customer's mobile communication device 16 may illustratively be operable at step 618 of the process 600 to control the display 322 to display the sorted subsets of the identified point-of-sale systems $24_1$-$24_N$ in accordance with any of the techniques just described in the previous paragraph if the estimated wait time, E, for any of the point-of-sale systems $24_1$-$24_N$ is less than TH2. If all of the estimated wait times, E, are greater than TH2, the processor 300 is illustratively operable at step 618 to control the display 322 to display the "all lanes busy" (ALB) information produced by any of the processes illustrated in FIGS. 9A-9C, or to produce one or more "all lanes busy" messages wirelessly transmitted thereto by the main server 12 in embodiments that do not include an "all lanes busy" process. In some embodiments of the former case, the process 600 may further illustratively include a step 620 following step 618 in which the processor 300 of the customer's mobile communication device 16 is operable to determine whether the customer notification information CNI received at step 616 includes one or more virtual discount coupons. If so, the process 600 illustratively advances to step 622 where the processor 300 of the customer's mobile communication device 16 is operable to execute a conventional process to control the display 322 to display the one or more virtual discount coupons and to be responsive to the customer selection thereof to store the one or more virtual discounts in the memory 304 or data storage 306, or in one or more storage locations external to the device 16. If, at step 620, the processor 300 determines that the CNI does not include one or more virtual discount coupons, the process bypasses step 622. In embodiments of the process 730 which include the "all lanes busy" process 1340 illustrated in FIG. 13C and if, in such embodiments, CNI includes a "no waiting" identifier, the processor 300 is illustratively operable at step 618 to control the display 322 to display an identification of the "no waiting" point-of-sale system along with instructions or an invitation to proceed to the "no waiting" point-of-sale system.

In embodiments in which the checkout notification process execute at step 612 is the process 750 illustrated in FIG. 7C, the processor 300 of the customer's mobile communication device 16 may illustratively be operable at step 618 of the process 600 to control the display 322 to display only the sorted subset $POS_{S1}$, or the sorted subset $POS_{S2}$ or the "all lanes busy" (ALB) information produced by any of the processes illustrated in FIGS. 13A-13C (or to produce one or more "all lanes busy" messages wirelessly transmitted thereto by the main server 12 in embodiments that do not include an "all lanes busy" process). In some embodiments, the process 600 may further illustratively include steps 620 and 622 as described above, and in embodiments of the process 750 which include the "all lanes busy" process 950 illustrated in FIG. 9C and CNI includes a "no waiting" identifier, the processor 300 is illustratively operable at step 618 to control the display 322 to display an identification of the "no waiting" point-of-sale system along with instructions or an invitation to proceed to the "no waiting" point-of-sale system.

Those skilled in the art will recognize other techniques and processes for displaying available and/or unavailable point-of-sale systems to the identified customer 16, and it will be understood that any such other techniques and/or processes are intended to fall within the scope of this disclosure.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected. Moreover, it will be understood that while several process steps in various sequences have been illustrated and described herein with respect to the processes 600, 700, 730, 760, 800, 900, 920, 940, 1000, 1048, 1015, 1045, 1100, 1200, 1300, 1320, 1340 and 1360, any one or more such processes 600, 700, 730, 760, 800, 900, 920, 940, 1000,

1048, 1015, 1045, 1100, 1200, 1300, 1320, 1340 and 1360 may alternatively include more, fewer and/or different steps, and that any such steps may be executed in different sequences from those illustrated and described, without departing from the scope of the concepts and techniques described herein. As another example, it will be further understood that while the customer traffic sensors 222 associated with the various point-of-sale systems $24_1$-$24_M$, $24_1$-$24_N$ have been illustrated and described herein as being implemented in the form of video and/or photographic cameras, in some alternative embodiments one or more of the customer traffic sensors 222 may be replaced or augmented by one or more wireless signal broadcasting devices such as one or more wireless signal broadcasting devices 24. In such embodiments, the process 800 illustrated in FIG. 8 may be modified to include some of the steps of the process 600, e.g., at least steps 602-610, whereby the mobile communication device of a customer in one of the customer checkout lanes $L_1$-$L_N$ wirelessly transmits the UID(s) of such one or more wireless signal broadcasting devices to the main server 12, and may further include one or more steps by which the processor 50 of the main server 12 identifies such customers as occupying a corresponding one of the customer checkout lanes $L_1$-$L_N$. The process 800 may further include one or more additional steps by which the processor 50 may be operable to process the CI or EMSID information wirelessly transmitted thereto by a customer's mobile communication device to access that customer's purchase history in the customer purchase history database 412 to estimate an average or typical quantity of items purchased by the customer and to use such information in the determination by the processor 50 of the wait time, E, for the corresponding point-of-sale system $24_1$-$24_N$. Those skilled in the art will recognize that any such modifications required to implement any such alternate embodiment in the process 800 would be a mechanical step for a skilled programmer.

In the embodiments described herein, the position identification devise 261-26N have been described as being implemented as wireless signal broadcasting devices, e.g., conventional radio frequency broadcasting beacons, configured to broadcast wireless signals each containing UID. In some alternate embodiments, one or more of the PIDs may be implemented as wireless signal transceivers configured to can broadcast and receive wireless signals and/or as wireless signal receivers configured to receive broadcast wireless signals, e.g., broadcast by a mobile communication device or other device and, in some cases, to communicate directly (wired and/or wirelessly) with the main server 12, one or more of the local hub servers 22 and/or one or more of the POS systems 24. In some such embodiments, one or more of the wireless signal transceivers and/or receivers may include one or more conventional processors and one or more memory devices having instructions stored therein executable by the one or more processors to execute one or more of steps for determining an identity of an individual carrying a mobile communication device within and/or near a store 25.

In other alternate embodiments, one or more PIDs 26 may be implemented in the form of a combination of conventional Global Positioning System (GPS) satellites and a GPS receiver on-board a mobile communication device.

In other alternate embodiments, one or more PIDs 26 may be implemented in the form of one or more in-store WiFi Access Points which establish one or more in-store or store-wide hotspot having a unique internet access ID (HotSpotID) accessible by a mobile communication device. In such embodiments, the server 12 may determine a location of a mobile communication device in accordance with the unique internet access ID used by the mobile communication device to communicate with the mobile communication device.

In other alternate embodiments, one or more PIDs 26 may be implemented in the form of a combination of the earth's Geomagnetic Field and a magnetometer on-board a mobile communication device. In such embodiments, the server 12 may determine the location of a mobile communication device in accordance with the unique magnetic field signature captured by the magnetometer and wirelessly transmitted to the server 12 by the mobile communication device. In such embodiments, the server database may have one or more maps, tables, lists or the like mapping magnetic signature profiles within one or more of the stores to locations or positions within one or more of the stores, and the server 12 may be operable in such embodiments to determine the in-store location or position of a mobile communication device by comparing the unique magnetic field signature wirelessly transmitted by the mobile communication device to the stored magnetic signature profiles.

In other alternate embodiments, one or more of the PIDs may be implemented in the form of a combination of a camera on-board a mobile communication device and a product label affixed to product or product location within a store. In such embodiments, the camera may be operated to capture an image of the product label and wirelessly transmit the image to the server. The server may then compare the image to stored product data to determine the in-store location thereof.

In other alternate embodiments, one or more of the PIDs may be implemented in the form of a combination of a mobile communication device with a keypad and a customer/employee application operating on the mobile communication device. In such embodiments, the customer/employee application may display one or more manually selectable GUI elements for manually entering the location of the mobile communication device, and the mobile communication device may then wirelessly transmit the location information to the server.

In other alternate embodiments, one or more of the PIDs may be implemented in the form of a wireless signal transmission device, e.g., RFID Tag, NFC device, etc., attached to customer-selected product. In such embodiments, the wireless signal transmission device may be configured to wirelessly transmit product information (e.g., brand, size, etc.) and/or location (e.g., department, aisle, shelf position, etc.) to a mobile communication device which then wirelessly transmits the information to the server.

In other alternate embodiments, one or more of the PIDs may be implemented in the form of a combination of one or more in-store Cameras and a server-based facial and/or product recognition application. In some such embodiments, the server may process camera images and/or video and compare facial images with stored customer images to identify customers. In other embodiments, the server may process the camera images and/or video and compare product images, e.g., in customer's possession (basket, hand-carried, etc.) with stored product images, and then predict the customer's identity based on information contained in customer shopping histories.

In other alternate embodiments, one or more PIDs may be implemented in the form of a combination of one or more electromagnetic radiation (EMR) generators positioned within a store 25 and a mobile communication device with a camera and/or microphone. In such embodiments, the EMR may be generated in one or more spectral ranges, and be made to vary locally from store-to-store and throughout each store in one or more detectable EMR properties or characteristics, and/or EMR having different properties or characteristics may be generated in each store and in different areas of each store, such that in any case different stores, and different areas within each store, will be subject to different generated EMR properties or characteristics. The different EMR properties and/or characteristics generated in each store and in each area of each store may be stored in an EMR database, and local EMR properties/characteristics may be detected by a mobile communication device and wirelessly transmitted to the server which may then compare such received information to the EMR database to determine the location of the mobile communication device. Examples of such EMR generators and corresponding EMR detectors include, but are not limited to, one or more visible Light Generators and a camera on-board a mobile communication device, one or more audible frequency Generators and a microphone on-board a mobile communication device, one or more radio frequency generators and a radio frequency generator on board a mobile communication device, and the like.

In other alternate embodiments, one or more PIDs may be implemented in the form of one or more mobile communication devices of one or more in-store customers or in-store Employees. In such embodiments, in-store mobile communication devices may be configured to periodically broadcast signals detected by a customer's mobile communication device and/or transmitted directly to the server. Such broadcast signals be or include "location information" signals based on one or more "hard events" such as a recently received unique identification signal transmitted by an in-store wireless signal broadcasting device, a recently scanned or imaged product code, detected product device data, recently received GPS data, recently used HotSpotID data, recently detected EMR data, and/or the like. Alternatively or additionally, the one or more broadcast signals may be or include location information signals based on one or more "soft events" such as locally detected sounds (generated or not), locally detected light (generated or not), locally detected RF signals, and/or the like.

In any of the foregoing embodiments, information may be transmitted, receive and/or processed by any one or combination of any system or device disclosed herein.

What is claimed is:

1. A method of notifying customers of a retail enterprise of checkout queue activity, the method comprising:
   with a processor, storing in a database a plurality of customer codes each identifying a different one of a plurality of customers of the retail enterprise,
   with the processor, associating in the database each of the plurality of customer codes with communication information identifying a mobile communication device associated with a respective one of the plurality of customers,
   monitoring, with the processor, purchase transaction activity at each of a plurality of point-of-sale systems of the retail enterprise, each of the plurality of point-of-sale systems grouped together in a single customer checkout area of a brick-and-mortar store of the retail enterprise,
   determining, with the processor, an operating state of each of the plurality of point-of-sale systems based on the monitored purchase transaction activity thereof,
   with the processor, determining that one of the plurality of customers has entered a customer entry area to the customer checkout area of the brick-and-mortar store based on a detected presence in the customer entry area of a mobile communication device identified by the communication information associated in the database with the one of the plurality of customer codes, and
   in response to determining that the one of the plurality of customers has entered the customer entry area to the customer checkout area of the brick-and-mortar store, wirelessly transmitting, under control of the processor, a notification message to the mobile communication device identified by the communication information associated in the database with the one of the plurality of customer codes associated in the database with the entering one of the plurality of customers, the notification message including information identifying the operating state of one or more of the plurality of point-of-sale systems.

2. The method of claim 1, wherein determining the operating state of each of the plurality of point-of-sale systems comprises identifying, with the processor, each of the plurality of point-of-sale systems not presently processing a purchase transaction,
   wherein the information in the notification message identifying the operating state of one or more of the plurality of point-of-sale systems includes information identifying one or more of the plurality of point-of-sale systems not presently processing a purchase transaction as available to process a purchase transaction.

3. The method of claim 2, further comprising determining, with the processor, the one of the plurality of point-of-sale systems not presently processing a purchase transaction that is closest in proximity to the customer entry area of the customer checkout area,
   wherein the information in the notification message identifying one or more of the plurality of point-of-sale systems not presently processing a purchase transaction as available to process a purchase transaction includes the one or more of the plurality of point-of-sale systems not presently processing a purchase transaction that is closest in proximity to the customer entry area of the customer checkout area.

4. The method of claim 1, wherein determining the operating state of each of the plurality of point-of-sale systems comprises identifying, with the processor, each of the plurality of point-of-sale systems presently processing a purchase transaction,
   wherein the information in the notification message identifying the operating state of one or more of the plurality of point-of-sale systems includes information identifying one or more of the plurality of point-of-sale systems presently processing a purchase transaction.

5. The method of claim 1, wherein determining the operating state of each of the plurality of point-of-sale systems comprises identifying, with the processor, each of the plurality of point-of-sale systems not presently processing a purchase transaction, and identifying, with the processor, each of the plurality of point-of-sale systems presently processing a purchase transaction,
   and wherein the information in the notification message identifying the operating state of one or more of the plurality of point-of-sale systems includes information identifying one or more of the plurality of point-of-sale systems presently processing a purchase transaction and one or more of the plurality of point-of-sale systems not presently processing a purchase transaction.

6. The method of claim 1, wherein determining the operating state of each of the plurality of point-of-sale systems comprises identifying, with the processor, each of the plurality of point-of-sale systems presently processing a purchase transaction,
and wherein the information in the notification message identifying the operating state of one or more of the plurality of point-of-sale systems includes information indicating that all of the plurality of point-of-sale systems are busy if each of the plurality of point-of-sale systems is presently processing a purchase transaction.

7. The method of claim 6, further comprising, if each of the plurality of point-of-sale systems is presently processing a purchase transaction:
generating or retrieving from a database, with the processor, at least one virtual discount coupon, and
including the at least one virtual discount coupon in or with the notification message transmitted, under control of the processor, to the mobile communication device identified by the communication information associated in the database with the one of the plurality of customer codes associated in the database with the entering one of the plurality of customers.

8. The method of claim 7, further comprising:
with the processor, associating in the database each of the plurality of customer codes with a different one of a plurality of purchase histories, each of the plurality of purchase histories including information relating to prior purchases made from the retail enterprise by a corresponding one of the plurality of customers of the retail enterprise,
with the processor, accessing the one of the plurality of purchase histories associated in the database with the one of the plurality of customer codes associated in the database with the entering one of the plurality of customers, and
generating or retrieving from a database the at least one virtual discount coupon based on one or more of the prior purchases included in the accessed one of the plurality of purchase histories.

9. The method of claim 6, further comprising:
with the processor, associating in the database one or more of the plurality of customer codes with a preferred status indicator, and
if each of the plurality of point-of-sale systems is presently processing a purchase transaction,
including in the notification message information identifying one of the plurality of point-of-sale systems pre-designated as no waiting if the one of the plurality of customer codes associated in the database with the entering one of the plurality of customers is also associated in the database with a preferred status indicator.

10. The method of claim 9, further comprising, if each of the plurality of point-of-sale systems is presently processing a purchase transaction and the one of the plurality of customer codes associated in the database with the entering one of the plurality of customers is not also associated in the database a preferred status indicator:
generating or retrieving from a database, with the processor, at least one virtual discount coupon, and
including the at least one virtual discount coupon in or with the notification message transmitted, under control of the processor, to the mobile communication device identified by the communication information associated in the database with the one of the plurality of customer codes associated in the database with the entering one of the plurality of customers.

11. The method of claim 10, further comprising:
with the processor, associating in the database each of the plurality of customer codes with a different one of a plurality of purchase histories, each of the plurality of purchase histories including information relating to prior purchases made from the retail enterprise by a corresponding one of the plurality of customers of the retail enterprise,
accessing, with the processor, the one of the plurality of purchase histories associated in the first or second database with the one of the plurality of customer codes associated in the database with the entering one of the plurality of customers, and
generating or retrieving from a database the at least one virtual discount coupon based on one or more of the prior purchases included in the accessed one of the plurality of purchase histories.

12. The method of claim 1 wherein each of the plurality of point-of-sale systems defines a customer checkout lane through which customers pass during purchase transactions processed by the point-of-sale system,
and wherein monitoring the purchase transaction activity at each of the plurality of point-of-sale systems comprises at least one of monitoring, with the processor, a purchase transaction state of each of the plurality of point-of-sale systems and monitoring, with the processor, customer traffic in each of the plurality of checkout lanes, the purchase transaction state of each of the plurality of point-of-sale systems being one of presently processing a purchase transaction and not presently processing a purchase transaction,
and wherein the method further comprises:
estimating, with the processor, a plurality of wait times each for a different one the plurality of point-of-sale systems based on the monitored purchase transaction activity at the different one of the plurality of point-of-sale systems, each of the plurality of wait times defining an estimated amount of time from the present that the corresponding one of the plurality of point-of-sale systems will be available to conduct a purchase transaction for a customer that presently enters the customer checkout lane, and
determining, with the processor, the operating state of each of the plurality of point-of-sale systems based on at least one of the purchase transaction state and the wait time thereof.

13. The method of claim 12, wherein determining the operating state of each of the plurality of point-of-sale systems comprises determining, with the processor, as available to process a purchase transaction each of the plurality of point-of-sale systems having a purchase transaction state corresponding to not presently processing a purchase transaction.

14. The method of claim 12, wherein determining an operating state of each of the plurality of point-of-sale systems comprises determining, with the processor, as presently processing a purchase transaction each of the plurality of point-of-sale systems having an associated wait time greater than a first threshold wait time and less than or equal to a second threshold wait time.

15. The method of claim 12, wherein determining an operating state of each of the plurality of point-of-sale systems comprises determining, with the processor, as presently busy each of the plurality of point-of-sale systems having an associated wait time greater than the second threshold wait time.

16. The method of claim 15 further comprising, if the operating state of each of the plurality of point-of-sale systems is presently busy:
   generating or retrieving from a database, with the processor, at least one virtual discount coupon, and
   including the at least one virtual discount coupon in or with the notification message transmitted, under control of the processor, to the mobile communication device identified by the communication information associated in the database with the one of the plurality of customer codes associated in the database with the entering one of the plurality of customers.

17. The method of claim 16, further comprising:
   with the processor, associating in the database each of the plurality of customer codes with a different one of a plurality of purchase histories, each of the plurality of purchase histories including information relating to prior purchases made from the retail enterprise by a corresponding one of the plurality of customers of the retail enterprise,
   accessing, with the processor, the one of the plurality of purchase histories associated in the first or second database with the one of the plurality of customer codes associated in the database with the entering one of the plurality of customers, and
   generating or retrieving from a database the at least one virtual discount coupon based on one or more of the prior purchases included in the accessed one of the plurality of purchase histories.

18. The method of claim 16, further comprising:
   with the processor, associating in the database one or more of the plurality of customer codes with a preferred status indicator, and
   if the operating state of each of the plurality of point-of-sale systems is presently busy,
   including in the notification message information identifying one of the plurality of point-of-sale systems pre-designated as no waiting if the one of the plurality of customer codes associated in the database with the entering one of the plurality of customers is also associated in the database with a preferred status indicator.

19. The method of claim 12, wherein estimating the plurality of wait times for each of the plurality of point-of-sale systems comprises:
   determining, with the processor, the purchase transaction state of each of the plurality of point-of-sale systems,
   for each of the plurality of point-of-sale systems having a purchase transaction state of not currently processing a purchase transaction, determining the wait time to be less than or equal to the first threshold wait time, and
   for each of the plurality of point-of-sale systems having a purchase transaction state of currently processing a purchase transaction, estimating the wait time as a function of the monitored customer traffic in the checkout lane thereof,
   wherein the information in the notification message identifying the operating state of any of the plurality of point-of-sale systems for which the wait time is less than or equal to a first threshold wait time identifies the operating state as available to process a purchase transaction.

\* \* \* \* \*